(12) United States Patent
Kim et al.

(10) Patent No.: US 12,652,717 B2
(45) Date of Patent: Jun. 9, 2026

---

(54) WIRELESS COMMUNICATION METHOD USING MULTI-LINK, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR);
Geonjung Ko, Gyeonggi-do (KR);
Juhyung Son, Gyeonggi-do (KR);
Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 294 days.

(21) Appl. No.: 18/513,509

(22) Filed: Nov. 18, 2023

(65) Prior Publication Data

US 2024/0163948 A1 May 16, 2024

Related U.S. Application Data

(63) Continuation of application No. PCT/KR2022/007143, filed on May 18, 2022.

(30) Foreign Application Priority Data

| | | |
|---|---|---|
| May 18, 2021 | (KR) | 10-2021-0064178 |
| Jun. 23, 2021 | (KR) | 10-2021-0081938 |

(51) Int. Cl.
*H04W 76/15* (2018.01)
*H04W 8/22* (2009.01)
(Continued)

(52) U.S. Cl.
CPC ............. *H04W 76/15* (2018.02); *H04W 8/24* (2013.01)

(58) Field of Classification Search
None
See application file for complete search history.

(56) References Cited

U.S. PATENT DOCUMENTS 11,503,539 B2 * 11/2022 Kim .................. H04W 52/0229
12,144,044 B2 * 11/2024 Fang ................. H04W 52/0229
(Continued)

FOREIGN PATENT DOCUMENTS

WO 2022/245140 11/2022

OTHER PUBLICATIONS

International Search Report for PCT/KR2022/007143 mailed on Aug. 24, 2022 and its English translation from WIPO (now published as WO 2022/245140).

(Continued)

*Primary Examiner* — Duc T Duong
(74) *Attorney, Agent, or Firm* — EIP US LLP

(57) ABSTRACT

Disclosed are: a method by which a first multi-link device (MLD) comprising a plurality of stations operating in a plurality of links, respectively, transmits and receives a frame in a wireless communication system; and a device. Particularly, the first MLD according to the present invention can transmit a request frame to a second station from among a plurality of second stations included in a second MLD operating in at least one link, respectively, through a first station from among the plurality of first stations included in the first multi-link device, and receive a response frame as a response to the request frame from the second station through the first station. At this time, the request frame can comprise information about other stations included in the first MLD, and the response frame can (Continued)

(a) Inter-link collision
(simultaneous Tx on AP1 &STA2 )

(b) Inter-link collision
(non-simultaneous Tx on AP1 &STA2 )

comprise information about other stations included in the second MLD.

20 Claims, 33 Drawing Sheets

(51) Int. Cl.
    *H04W 8/24*         (2009.01)
    *H04W 74/00*      (2009.01)

(56) References Cited

U.S. PATENT DOCUMENTS

| | | | |
|---|---|---|---|
| 2022/0287121 A1* | 9/2022 | Hwang | H04W 76/15 |
| 2023/0007572 A1 | 1/2023 | Patil et al. | |
| 2023/0050803 A1* | 2/2023 | Gan | H04W 76/19 |
| 2023/0164634 A1* | 5/2023 | Jang | H04W 28/20 |
| | | | 370/329 |
| 2023/0164831 A1* | 5/2023 | Kim | H04W 74/0808 |
| | | | 370/329 |
| 2023/0180321 A1* | 6/2023 | Dong | H04W 76/15 |
| | | | 370/329 |
| 2023/0308869 A1* | 9/2023 | Dong | H04W 76/15 |
| 2023/0319928 A1* | 10/2023 | Guo | H04W 76/11 |
| | | | 370/328 |
| 2023/0345349 A1* | 10/2023 | Kim | H04W 48/20 |
| 2023/0422026 A1* | 12/2023 | Jang | H04L 45/66 |
| 2024/0015780 A1* | 1/2024 | Dong | H04W 74/002 |
| 2024/0107345 A1* | 3/2024 | Lopez | H04W 24/08 |

OTHER PUBLICATIONS

Written Opinion of the International Searching Authority for PCT/KR2022/007143 mailed on Aug. 24, 2022 and its English translation by Google Translate (now published as WO 2022/245140).

Huang, Guogang et al.: "Discussion on Multi-link Setup", doc.: IEEE 802.11-20/1534r8, Jan. 26, 2021, slides 1-15.

Kwon, Young Hoon et al.: "MLD Discovery follow up", doc.: IEEE 802.11-20/0898r3, Oct. 20, 2020, slides 1-14.

Das, Dibakar et al.: "CR for CIDs related to NSTR Capability signaling", doc.: IEEE 802.11-21/0222r15, May 10, 2021, pp. 1-6.

Li, Yunbo et al.: "Proposed Draft Text for MLO Multi-Link Channel Access: Capability Signaling", doc.: IEEE 802.11-20/1320r9, Sep. 28, 2020, pp.

Chitrakar, Rojan et al.: "Multi-link Element format", doc.: IEEE 802.11-20/0772r5, Oct. 22, 2020, slides 1-11.

Office Action dated Sep. 30, 2024 for Japanese Patent Application No. 2023-572009 and its English translation provided by Applicant's foreign counsel.

* cited by examiner

User Interface
Unit

Display Unit

Memory

Processor

Communication
Unit

Communication Unit

Processor

Memory

220

260

(a) EHT SU PPDU (b) EHT TB PPDU (c) EHT MU PPDU (d) EHT ER SU PPDU

Freq. high

Narrow frequency interval

Freq. low

Link 1

Link 2

MLD#1

STA1-1 (Link1)

STR (week interference)

STA1-2 (Link2)

MLD#2

STA2-1 (Link1)

Non-STR (strong interference)

STA2-2 (Link2)

STR : Simultaneous Transmission and Reception

FIG.14
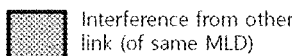
Interference from other
link (of same MLD)
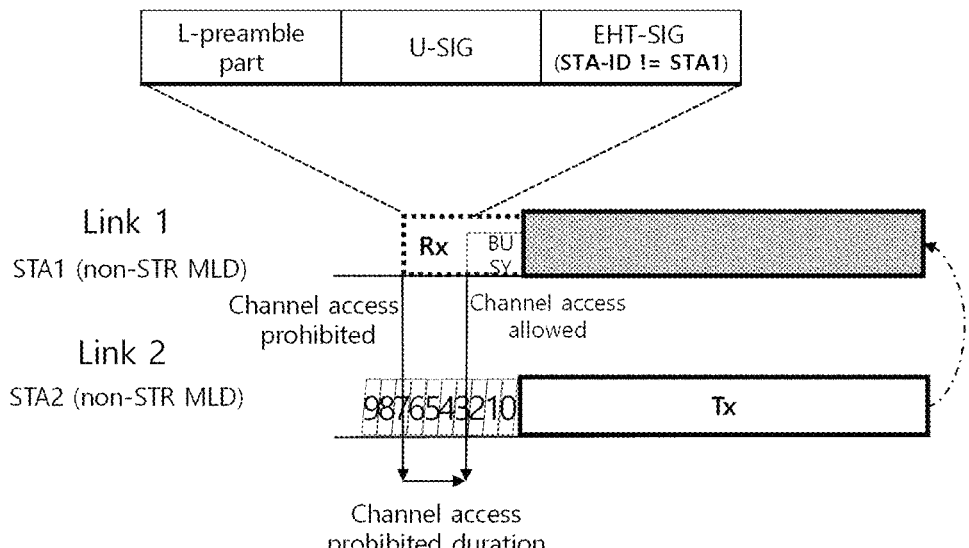
(a) Continuous backoff
counting
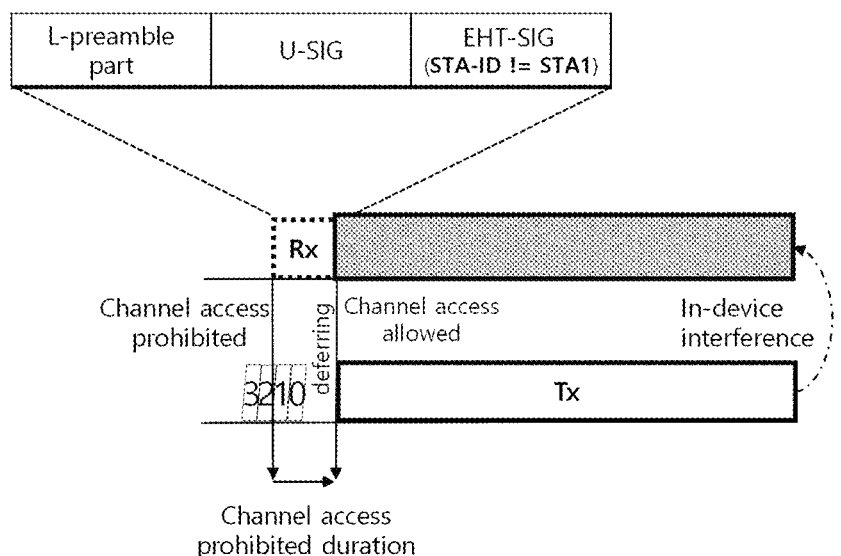
(b) Continuous backoff
counting + Tx deferring (a) Mandatory RTS / CTS exchange (b) Short Tx of initial deferred Tx FIG.17
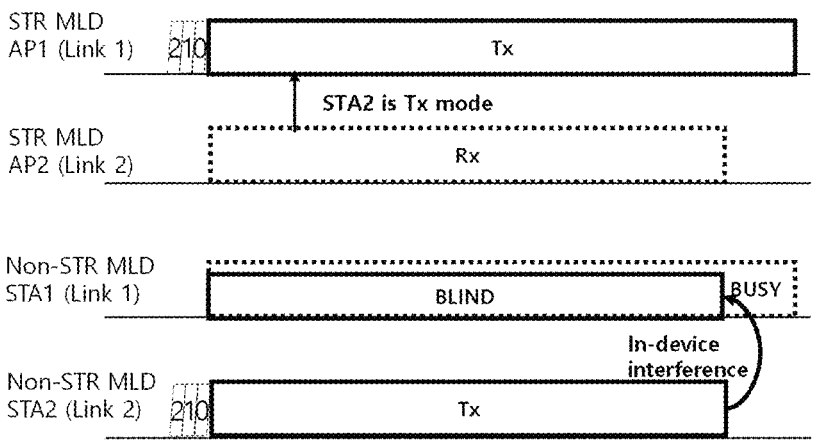
(a) Inter-link collision
(simultaneous Tx on AP1 &STA2 )
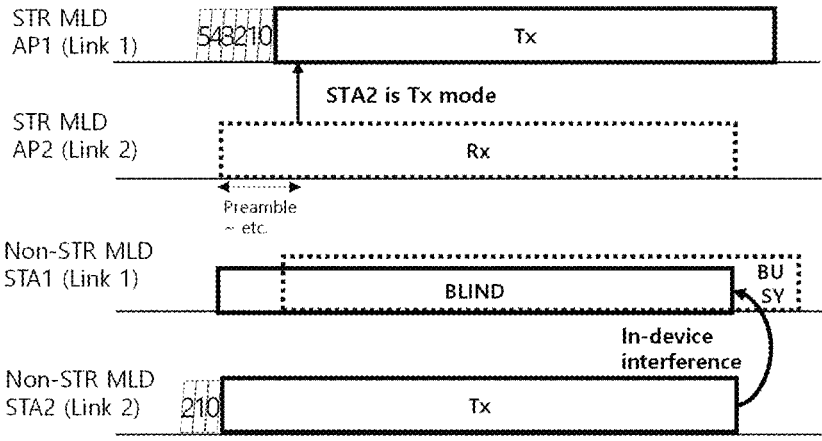
(b) Inter-link collision
(non-simultaneous Tx on AP1 &STA2 )

(a)

(b)

FIG.19
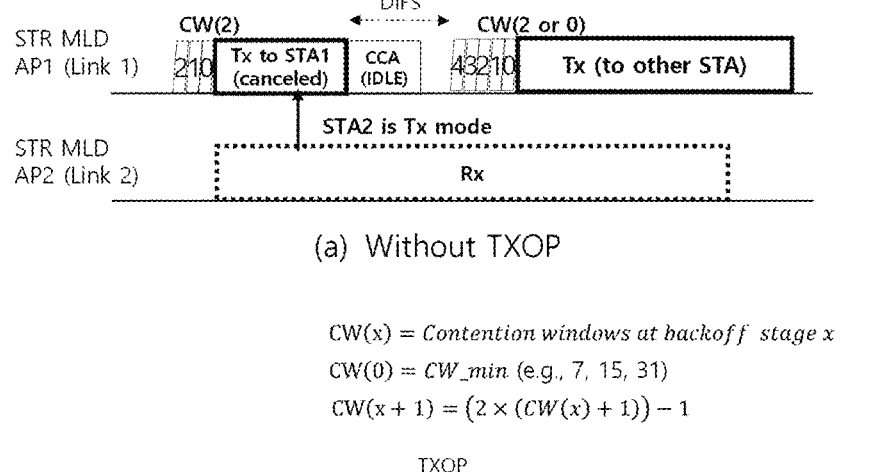
(a)  Without TXOP
$$\mathrm{CW}(x) = \textit{Contention windows at backoff stage } x$$
$$\mathrm{CW}(0) = \mathit{CW\_min}\ (\text{e.g., } 7,\ 15,\ 31)$$
$$\mathrm{CW}(x+1) = \big(2 \times (\mathit{CW}(x) + 1)\big) - 1$$
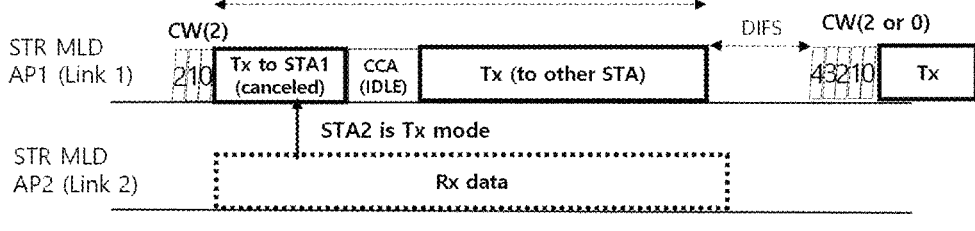
(b)  With TXOP

FIG.21

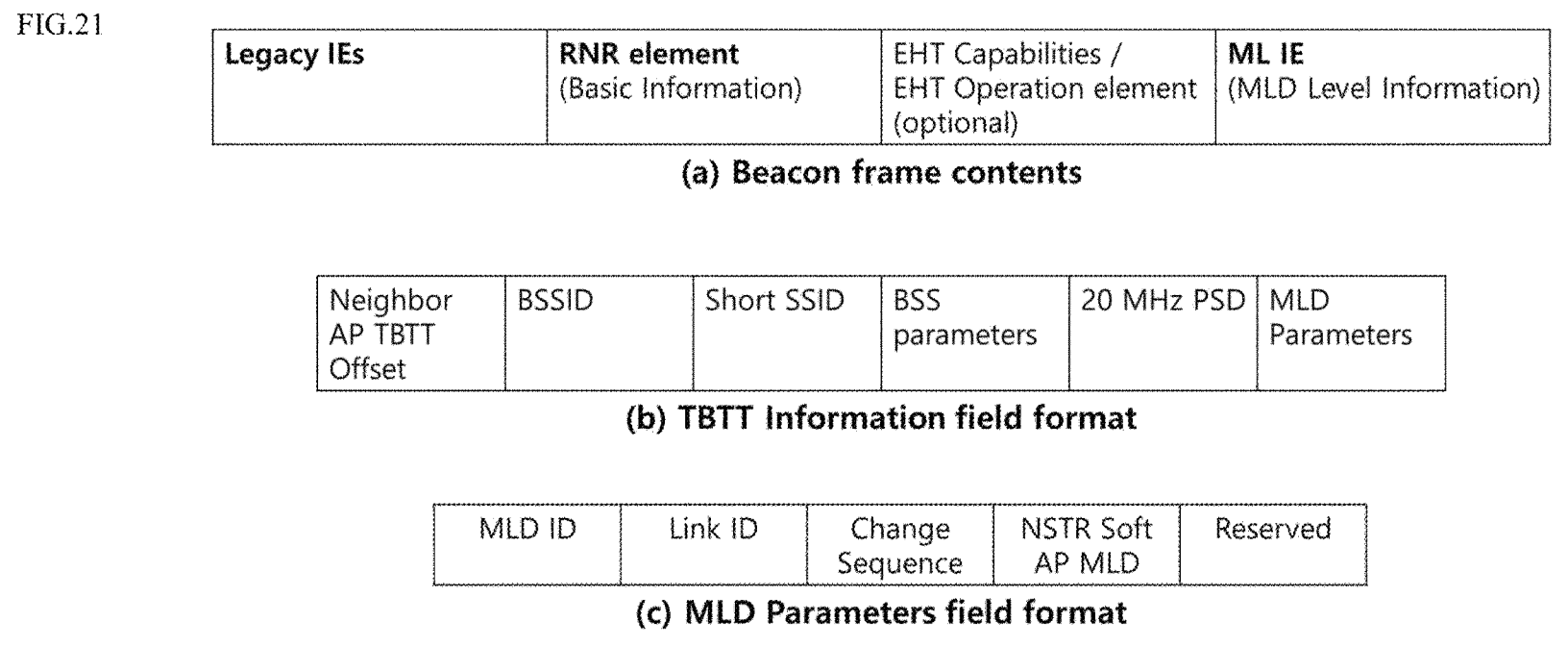

| Legacy IEs | RNR element (Basic Information) | EHT Capabilities / EHT Operation element (optional) | ML IE (MLD Level Information) |
|---|---|---|---|

(a) Beacon frame contents

| Neighbor AP TBTT Offset | BSSID | Short SSID | BSS parameters | 20 MHz PSD | MLD Parameters |
|---|---|---|---|---|---|

(b) TBTT Information field format

| MLD ID | Link ID | Change Sequence | NSTR Soft AP MLD | Reserved |
|---|---|---|---|---|

(c) MLD Parameters field format

FIG.22

| Neighbor AP TBTT Offset | BSSID | Short SSID | BSS parameters | 20 MHz PSD | MLD Parameters | MLD AP TBTT Offset |
|---|---|---|---|---|---|---|
| Octets:          1 | 0 or 6 | 0 or 4 | 0 or 1 | 0 or 1 | 0 or 3 | 0 or 2 |

TBTT Information field format

FIG.23

| TBTT Information Length subfield value | TBTT Information field contents |
|---|---|
| ... | ... |
| 14 | The Neighbor AP TBTT Offset subfield, the BSS ID subfield, the Short-SSID subfield, the BSS Parameters subfield and MLD AP TBTT Offset subfield |
| 15 | The Neighbor AP TBTT Offset subfield, the BSSID subfield, the Short-SSID subfield, the BSS Parameters subfield, the 20 MHz PSD subfield and MLD AP TBTT Offset subfield |
| 17 | MLD AP TBTT Offset subfield, the BSSID subfield, the Short-SSID subfield, the BSS Parameters subfield, the 20 MHz PSD subfield and the MLD Parameters subfield |
| 18 | The Neighbor AP TBTT Offset subfield, the BSSID subfield, the Short-SSID subfield, the BSS Parameters subfield, the 20 MHz PSD subfield, the MLD Parameters subfield and MLD AP TBTT Offset subfield |
| ... | ... |

TBTT Information field contents (Table)

FIG.24

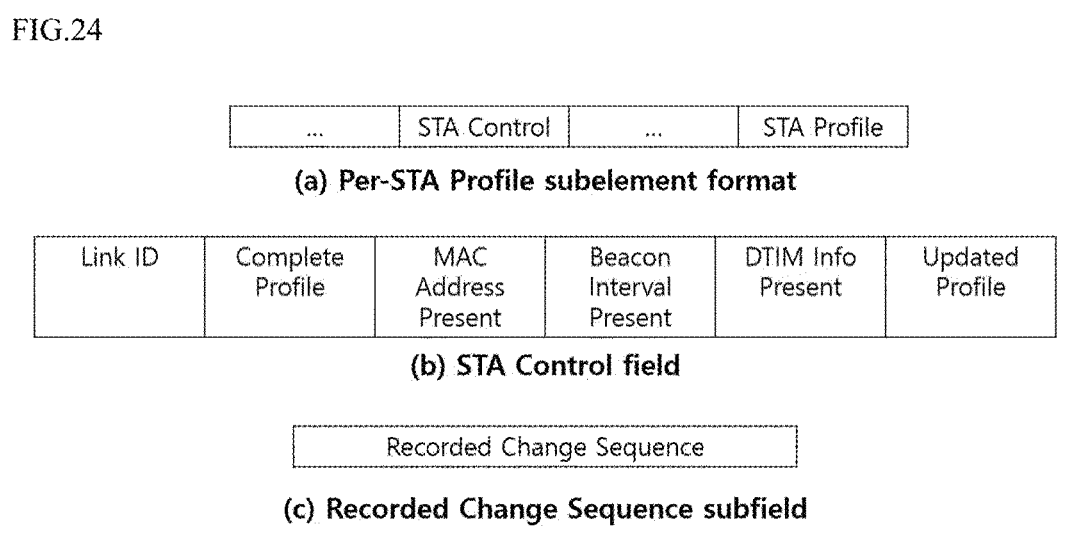

| ... | STA Control | ... | STA Profile |
|---|---|---|---|

(a) Per-STA Profile subelement format

| Link ID | Complete Profile | MAC Address Present | Beacon Interval Present | DTIM Info Present | Updated Profile |
|---|---|---|---|---|---|

(b) STA Control field

| Recorded Change Sequence |
|---|

(c) Recorded Change Sequence subfield

Receive beacon frame of primary link

Identify change sequence of non-primary link

Transmit ML probe request frame through primary link

Update non-primary link parameter after receiving ML probe response frame

1

WIRELESS COMMUNICATION METHOD USING MULTI-LINK, AND WIRELESS COMMUNICATION TERMINAL USING SAME

CROSS-REFERENCE TO RELATED APPLICATIONS

This application is a continuation of International Patent Application No. PCT/KR2022/007143 filed on May 18, 2022, which claims the priority to Korean Patent Application No. 10-2021-0064178 filed in the Korean Intellectual Property Office on May 18, 2021, and Korean Patent Application No. 10-2021-0081938 filed in the Korean Intellectual Property Office on Jun. 23, 2021, the entire contents of which are incorporated herein by reference.

TECHNICAL FIELD

The present invention relates to a wireless communication method using multiple links and a wireless communication terminal using same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An aspect of an embodiment of the present invention is to provide a wireless communication method using multiple links and a wireless communication terminal using same.

The technical tasks to be achieved by the present specification is not limited to those mentioned above, and other technical tasks that are not mentioned above may be clearly understood to a person having common knowledge in the technical field to which the present disclosure belongs based on the description provided below.

Solution to Problem

A first multi-link device (MLD) including a plurality of stations operating on a plurality of links, respectively, according to the present invention includes a processor, wherein the processor is configured to: transmit a request frame to a second station among a second plurality of stations included in a second MLD, which operate one or more links, respectively, via a first station among the first plurality of stations included in the first multi-link device, the first station and the second station operating in a particular band; and receive a response frame from the second station via the first station as a response for the request frame, wherein the second station transmits the response frame after including, in the response frame, a capability element and an operation element of the second station for the particular band, except for a capability element and/or an operation element of the second station in a particular legacy format for other bands, and the response frame includes multi-link information for associating first one or more stations remaining after excluding the first station from the first plurality of stations with a second at least one station remaining after excluding the second station from the second plurality of stations.

In addition, in the present invention, the multi-link information includes respective capability elements and/or operation elements of the second at least one station, the elements having a legacy format and corresponding to the other bands, respectively.

In addition, in the present invention, each of the respective capability elements and/or operation elements of the second at least one station is at least one of a high throughput (HT) capability element, a very high throughput (VHT) capability element, an HT operation element, a VHT operation element, or a high efficiency (HE) operation element including VHT operation information.

In addition, in the present invention, the particular band is 6 GHz, and the other bands are 2.4 GHz and/or 5 GHz.

In addition, in the present invention, the processor is configured to, include, in the request frame, a multi-link element including per-STA profile subelements corresponding to the second at least one station, respectively, and include, in each of the per-STA profile subelements, a complete profile subfield indicating whether all pieces of information on a corresponding station among the second at least one station are requested.

In addition, in the present invention, when the complete profile subfield indicates a request for all the pieces of information, the multi-link information of the response frame includes a capability element and/or an operation element of a station, among the second at least one station, corresponding to the complete profile subfield indicating the request for all the pieces of information.

In addition, in the present invention, the processor is configured to, based on the multi-link information, perform a multi-link configuration procedure for configuring a link between the second MLD, the first one or more stations, and the second at least one station.

In addition, in the present invention, the request frame includes a multi-link element including one or more per-STA profile subelements corresponding to the first one or more stations, respectively, and each of the one or more per-STA profile subelements of the multi-link element includes a capability element and/or an operation element in a legacy format for a corresponding particular station among the first one or more stations.

In addition, in the present invention, the particular station is a station operating in at least one band among the other bands, and the first station transmits the request frame after including, in the request frame, a capability element and an operation element of the first station for the particular band, except for a capability element and/or an operation element of the first station in a particular legacy format for the other bands.

In addition, in the present invention, the response frame is one of an association request frame, an association response frame, and a multi-link (ML) probe response frame.

In addition, the present invention provides a method including: transmitting a request frame to a second station among a second plurality of stations included in a second MLD, which operate one or more links, respectively, via a first station among the first plurality of stations included in the first multi-link device, the first station and the second station operating in a particular frequency band; and receiving a response frame from the second station via the first station as a response for the request frame, wherein the second station transmits the radio frame after including, in the radio frame, a capability element and an operation element of the second station for the particular band, except for a capability element and/or an operation element of the second station for other bands, and the radio frame includes multi-link information for associating first one or more stations remaining after excluding the first station from the first plurality of stations with second at least one station remaining after excluding the second station from the second plurality of stations.

Advantageous Effects of Invention

An embodiment of the present invention provides a wireless communication method efficiently using multiple links and a wireless communication terminal using same.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 2 illustrates a wireless LAN system according to another embodiment of the present invention.

FIG. 3 illustrates a configuration of a station according to an embodiment of the present invention.

FIG. 4 illustrates a configuration of an access point according to an embodiment of the present invention.

FIG. 14 show a station performing channel access after channel access prohibition is released according to an embodiment of the present invention;

FIG. 17 show a situation in which interference or collision between links may occur;

FIG. 19 show an STR multi-link device processing a CW value when recognizing transmission collision between links according to an embodiment of the present invention;

FIG. 21 illustrate an example of the contents of a beacon frame transmitted by an AP of an AP MLD, and a target beacon transmission time (TBTT) information field format included in a reduced neighbor report (RNR) element according to an embodiment of the present invention;

FIG. 22 illustrates another example of a TBTT information field format according to an embodiment of the present invention;

FIG. 23 illustrates an example of a TBTT information length subfield indicating a TBTT information field including an MLD AP TBTT offset subfield according to an embodiment of the present invention;

FIG. 24 illustrate an example of an STA-specific profile subelement (per-STA profile subelement) format according to an embodiment of the present invention;

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
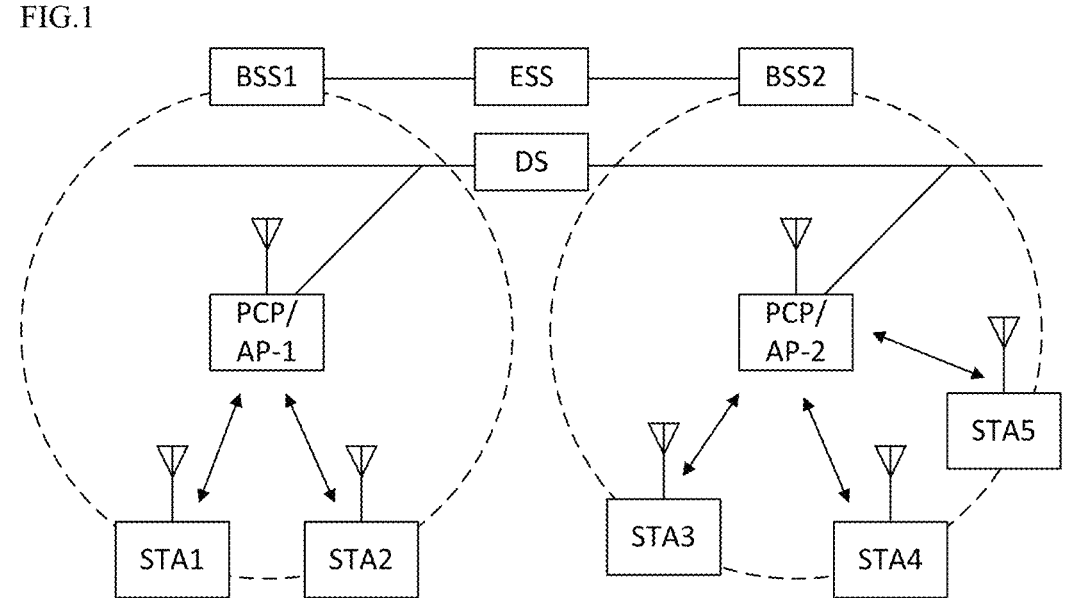
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
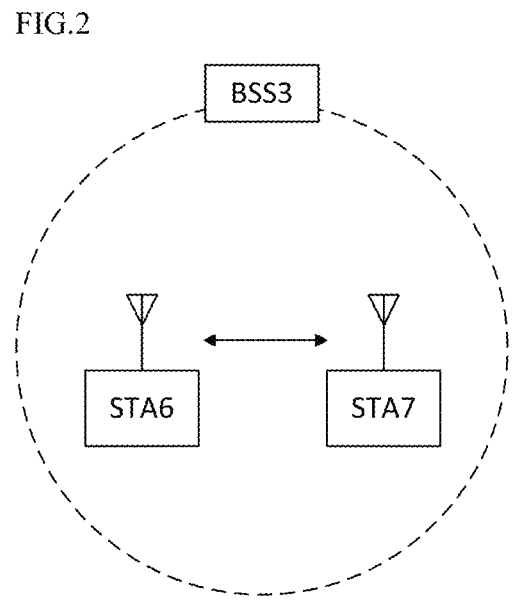

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
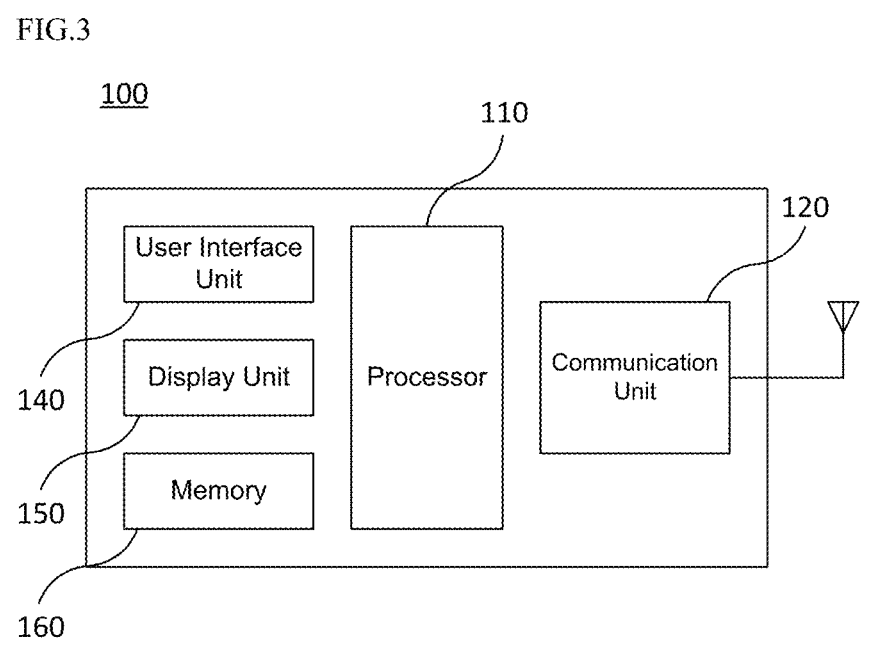

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
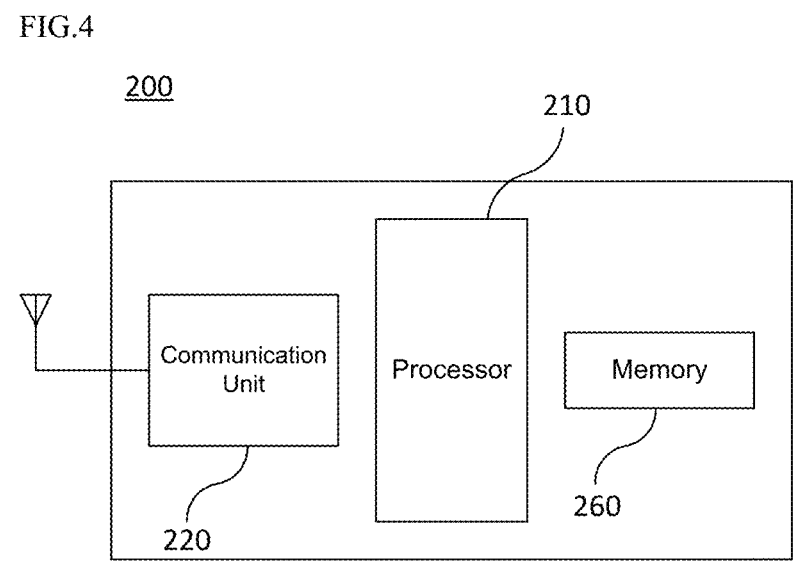

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
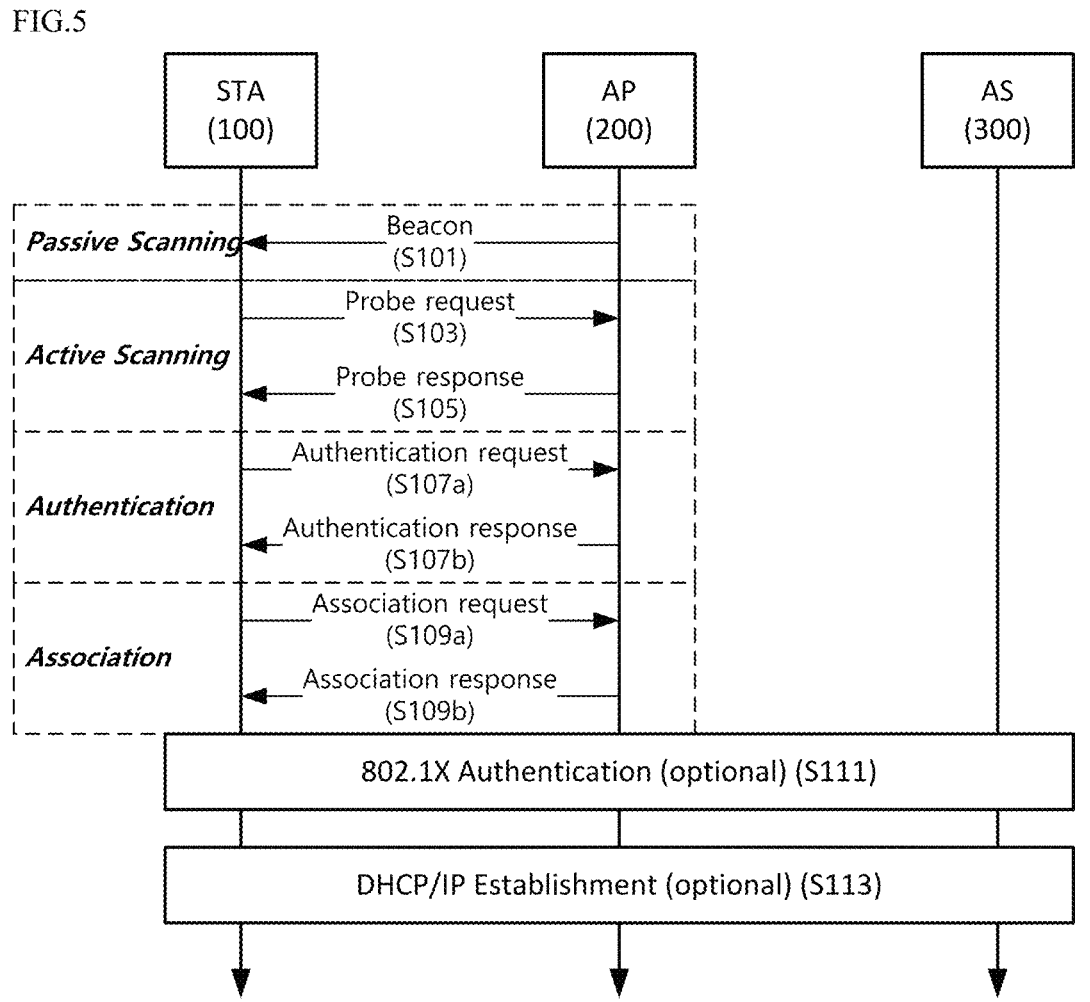
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
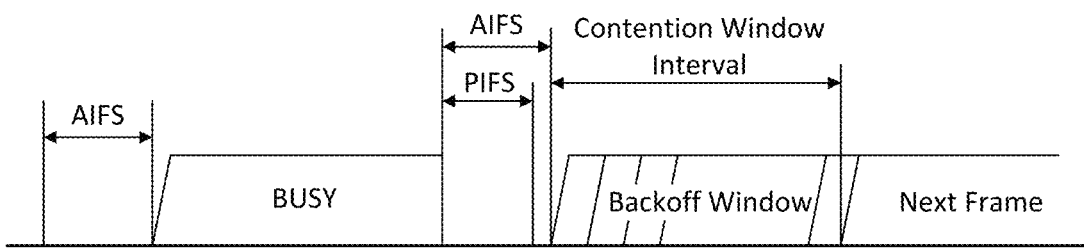
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal performing wireless LAN communication performs carrier sensing before transmitting data, to check whether a channel is busy. If a wireless signal having a particular strength or greater is detected, the channel is determined as being busy, and the terminal delays to access the channel. This process is called clear channel assessment (CCA), and a level for determining whether a corresponding signal is detected is called a CCA threshold. If a receiver of a wireless signal having a CCA threshold or greater received by a terminal is the terminal, the terminal processes the received wireless signal. Meanwhile, if a wireless signal is not detected in the channel, or a wireless signal having a strength smaller than the CCA threshold is detected, the channel is determined as being idle.

If a channel is determined as being idle, each terminal having data to transmit performs a backoff procedure after a time of an interframe space (IFS) corresponding to a situation of each terminal, that is, an arbitration IFS (AIFS) or a PCF IFS (PIFS). According to an embodiment, the AIFS may be used instead of an existing DCF IFS (DIFS). Each terminal may stand by while reducing slot times corresponding a random number determined in the terminal during an idle interval of the channel, and a terminal having exhausted all the slot times attempts to access the channel. As described above, an interval for which each terminal performs a backoff procedure is called a contention window interval. The random number may be called a backoff counter. That is, an initial value of a backoff counter is configured by an integer number that is a random number obtained by a terminal. When a channel being idle during a slot time is detected by a terminal, the terminal may reduce a backoff counter by 1. In addition, when the backoff counter reaches 0, the terminal may be allowed to perform channel access in the channel. Therefore, when a channel is idle for an AIFS time and slot times of a backoff counter, transmission by a terminal may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
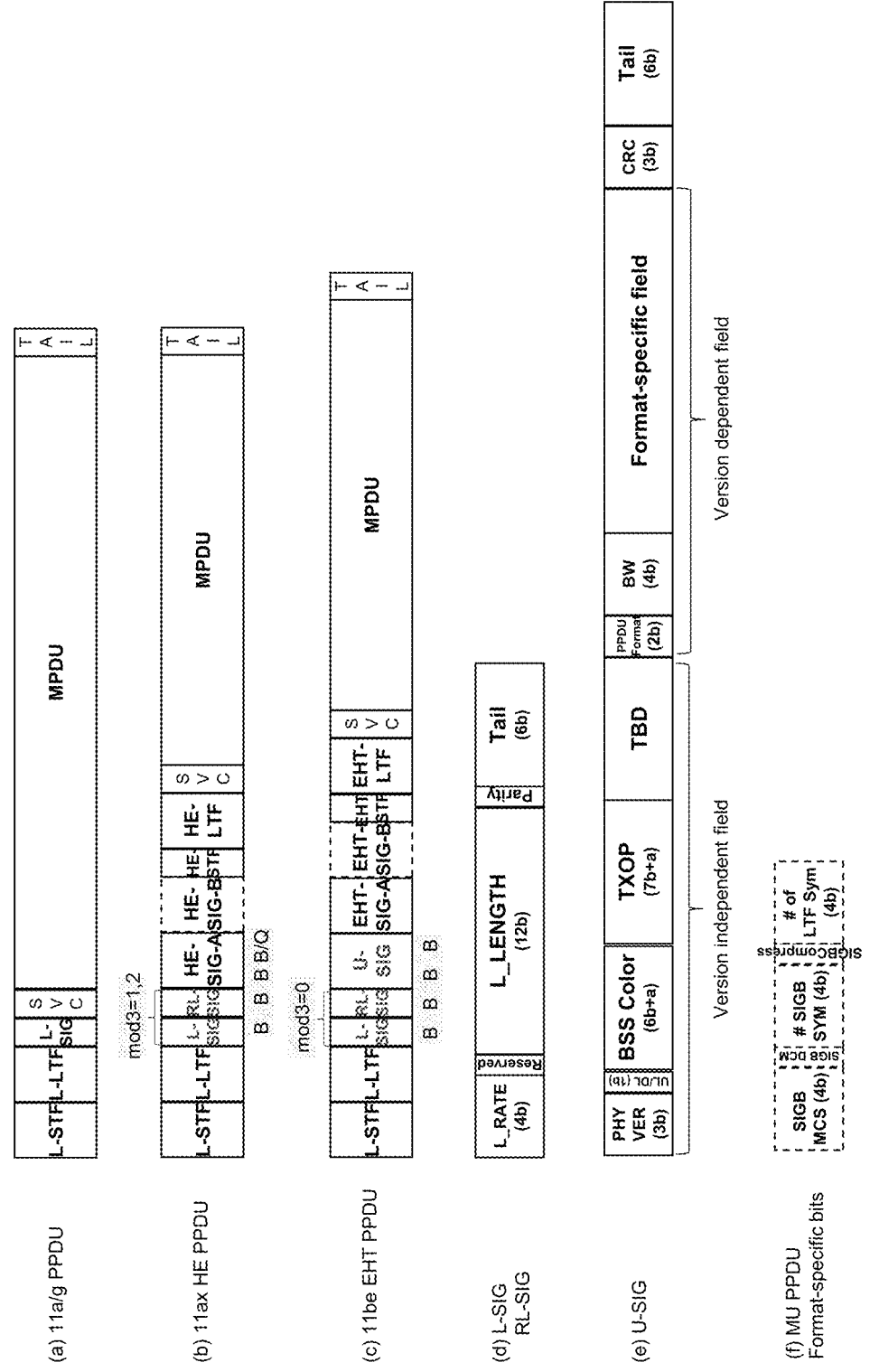
FIG. 7 illustrates an example of physical layer protocol data unit (PPDU) formats for various standard generations.

FIG. 7 illustrates an example of a format of a Physical layer Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=½ are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-

QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RX-TIME) is acquired, which is expressed by Equation 1 below.

$$RXTIME(us) = \left( \left\lceil \frac{L\_LENGTH + 3}{3} \right\rceil \right) \times 4 + 20 \qquad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left( \left\lceil \frac{TXTIME - 20}{4} \right\rceil \right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$\begin{aligned} TXTIME(us) = &T_{L\text{-}STF} + T_{L\text{-}LTF} + T_{L\text{-}SIG} + T_{RL\text{-}SIG} + T_{U\text{-}SIG} + \\ &(T_{EHT\text{-}SIG\text{-}A}) + (T_{EHT\text{-}SIG\text{-}B}) + T_{EHT\text{-}STF} + \\ &N_{EHT\text{-}LTF} \cdot T_{EHT\text{-}LTF} + T_{DATA} \qquad \text{[Equation 3]} \end{aligned}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves.

Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT- SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
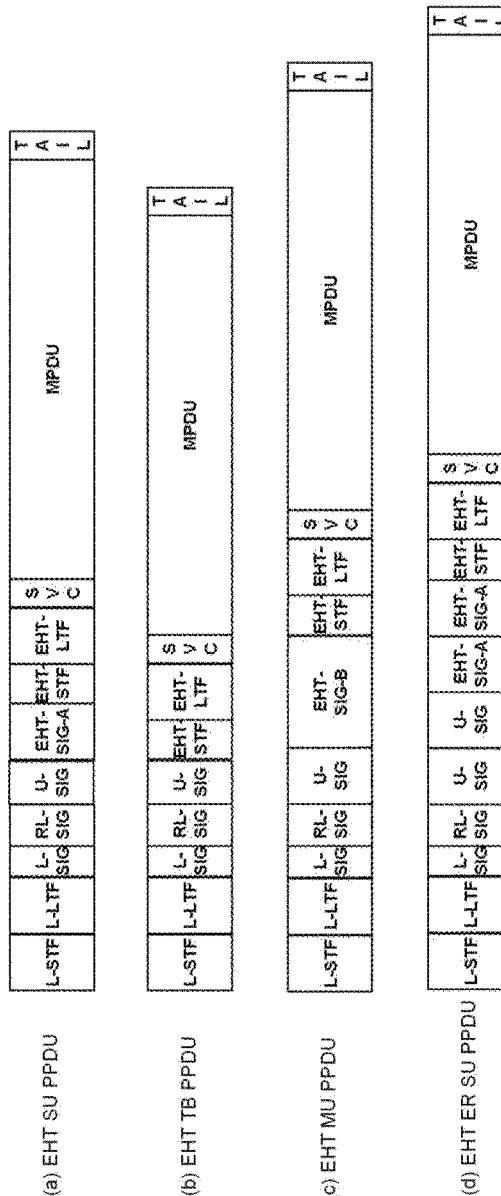
FIG. 8 illustrates an example of various extremely high throughput (EHT) physical layer protocol data unit (PPDU) formats and a method for indicating same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of explanation, in this specification, a frame or a MAC frame may be used together with an MPDU.

If one wireless communication device communicates using multiple links, the communication efficiency of the wireless communication device may be increased. A link is a physical path, and may be configured as a wireless medium usable to transfer a MAC service data unit (MSDU). For example, when the frequency band of one link is being used by another wireless communication device, the wireless communication device may continuously perform communication through another link. As described above, a wireless communication device may effectively use multiple channels. In addition, in a case where a wireless communication device performs simultaneous communication by using multiple links, the entire throughput may be increased. However, a conventional wireless LAN has been stipulated under the precondition that one wireless communication device uses one link. Therefore, a wireless LAN operation method for using multiple links is needed. A wireless communication method of a wireless communication device using multiple links will be described with reference to FIG. 9 to FIG. 26. First, a specific form of a wireless communication device using multiple links is described with reference to FIG. 9.

Figure 9:
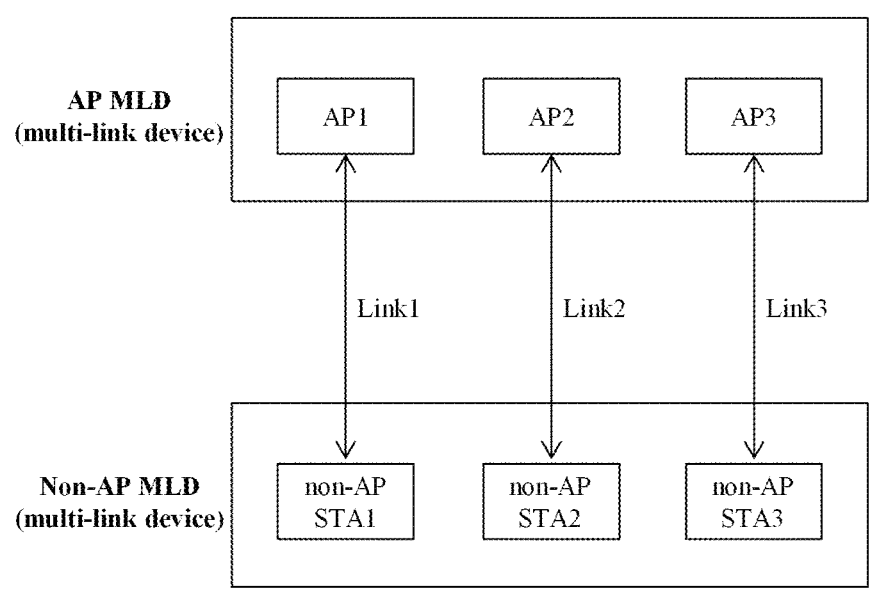
FIG. 9 shows a multi-link device according to an embodiment of the present invention.

FIG. 9 shows a multi-link device according to an embodiment of the present invention.

A multi-link device (MLD) may be defined for a wireless communication method using multiple links described above. A multi-link device may indicate a device having one or more affiliated stations. According to a specific embodiment, a multi-link device may indicate a device having two or more affiliated stations. In addition, a multi-link device may exchange a multi-link element. A multi-link element includes information on one or more stations or one or more links. A multi-link element may include a multi-link setup element to be described later. In this case, a multi-link device may be a logical entity. Specifically, a multi-link device may have multiple affiliated stations. A multi-link device may be called a multi-link logical entity (MLLE) or a multi-link entity (MLE). A multi-link device may have one medium access control (MAC) service access point (SAP) up to a logical link control (LLC). In addition, an MLD may have one MAC data service.

Multiple stations included in a multi-link device may operate in multiple links. In addition, multiple stations included in a multi-link device may operate in multiple channels. Specifically, multiple stations included in a multi-link device may operate in multiple different links or multiple different channels. For example, multiple stations included in a multi-link device may operate in multiple different channels of 2.4 GHz, 5 GHz, and 6 GHz.

An operation of a multi-link device may be called a multi-link operation, an MLD operation, or a multi-band operation. In addition, in a case where a station affiliated with a multi-link device is an AP, the multi-link device may be called an AP MLD. In addition, in a case where a station affiliated with a multi-link device is a non-AP station, the multi-link device may be called a non-AP MLD.

FIG. 9 shows an operation of communicating between a non-AP MLD and an AP-MLD. Specifically, each of the non-AP MLD and the AP-MLD communicates using three links. The AP MLD includes a first AP (AP 1), a second AP (AP 2), and a third AP (AP 3). The non-AP MLD includes a first non-AP STA (non-AP STA 1), a second non-AP STA (non-AP STA 2), and a third non-AP STA (non-AP STA 3). The first AP (AP 1) and the first non-AP STA (non-AP STA 1) communicate through a first link (link 1). In addition, the second AP (AP 2) and the second non-AP STA (non-AP STA 2) communicate through a second link (link 2). In addition, the third AP (AP 3) and the third non-AP STA (non-AP STA 3) communicate through a third link (link 3).

A multi-link operation may include a multi-link setup operation. A multi-link setup corresponds to an association operation of a single link operation described above, and may be required to be preceded for frame exchange in multiple links. A multi-link device may obtain information required for a multi-link setup from a multi-link setup element. Specifically, a multi-link setup element may include capability information related to multiple links. Capability information may include information indicating whether it is possible that one of multiple devices included in a multi-link device performs transmission and, at the same time, another device performs reception. In addition, capability information may include information relating to a link that each station included in an MLD is able to use. In addition, capability information may include information relating to a channel that each station included in an MLD is able to use.

A multi-link setup may be performed through negotiation between peer stations. Specifically, a multi-link setup may be performed through communication between stations without communication with an AP. In addition, a multi-link setup may be performed through one link. For example, even in a case where a first link to a third link are configured through multiple links, a multi-link setup may be performed through the first link.

In addition, mapping between a traffic identifier (TID) and a link may be configured. Specifically, a frame corresponding to a TID having a particular value may be exchanged through only a pre-designated link. Mapping between a TID and a link may be configured based on direction (directional-based). For example, in a case where multiple links are configured between a first multi-link device and a second multi-link device, the first multi-link device may be configured to transmit a frame having a first TID through a first link among the multiple links, and the second multi-link device may be configured to transmit a frame having a second TID through the first link. In addition, there may be a default configuration for mapping between a TID and a link. Specifically, in a case where there are no additional configuration in a multi-link setup, a multi-link device may exchange a frame corresponding to a TID through each link according to the default configuration. The default configuration may indicate all TIDs being exchanged through any one link.

A TID will be described in detail. A TID is an ID for classifying traffic or data to support quality of service (QoS). In addition, a TID may be used or assigned on a layer higher than a MAC layer. In addition, a TID may indicate a traffic category (TC) or a traffic stream (TS). In addition, a TID may be classified as one of 16 TIDs. For example, a TID may be designated as one of 0 to 15. A used TID value may be differently designated according to an access policy, and a channel access or medium access method. For example, enhanced distributed channel access (EDCA) or a hybrid coordination function contention based channel access (HCAF) are used, a TID value may be assigned between 0 and 7. In in a case where EDCA is used, a TID may indicate user priority (UP). The UP may be designated according to a TC or TS. A UP may be assigned on a layer higher than MAC. In addition, in a case where HCF controlled channel access (HCCA) or SPCA is used, a TID value may be assigned between 8 and 15. In a case where HCCA or SPCA is used, a TID may indicate a TSID. In addition, in a case where HEMM or SEMM is used, a TID value may be assigned between 8 and 15. In a case where HEMM or SEMM is used, a TID may indicate a TSID.

UP and AC may be mapped to each other. AC may be a label for providing QoS in EDCA. AC may be a label for indicating an EDCA parameter set. An EDCA parameter or an EDCA parameter set is a parameter used in channel contention of EDCA. A QoS station may ensure QoS by using AC. In addition, AC may include AC_BK, AC_BE, AC_VI, and AC_VO. AC_BK, AC_BE, AC_VI, and AC_VO may indicate background, best effort, video, and voice, respectively. In addition, AC_BK, AC_BE, AC_VI, and AC_VO may be classified as a lower AC. For example, AC_VI may be subdivided into AC_VI primary and AC_VI alternate. In addition, AC_VO may be subdivided into AC_VO primary and AC_VO alternate. In addition, UP or TID may be mapped to AC. For example, 1, 2, 0, 3, 4, 5, 6, and 7 of UP or TID may be mapped to AC_BK, AC_BK, AC_BE, AC_BE, AC_VI, AC_VI, AC_VO, and AC_VO, respectively. In addition, 1, 2, 0, 3, 4, 5, 6, and 7 of UP or TID may be mapped to AC_BK, AC_BK, AC_BE, AC_BE, AC_VI alternate, AC_VI primary, AC_VO primary, and AC_VO alternate, respectively. In addition, the priorities of 1, 2, 0, 3, 4, 5, 6, and 7 of UP or TID may sequentially increase. That is, the priority of 1 may be a low priority, and the priority of 7 may be a high priority. Therefore, the priorities of AC_BK, AC_BE, AC_VI, and AC_VO may increase in that sequence. In addition, AC_BK, AC_BE, AC_VI, and AC_VO may correspond to ACI indexes (AC index) 0, 1, 2, and 3, respectively. Due to these characteristics of TID, mapping between a TID and a link may indicate mapping between an AC and a link. In addition, mapping between an AC and a link may indicate mapping between a TID and a link.

As described above, TIDs may be mapped to multiple links, respectively. Mapping may imply designating a link through which traffic corresponding to a particular TID or AC is exchangeable. In addition, a TID or AC transmittable for each transmission direction in a link may be designated. As described above, there may be a default configuration for mapping between a TID and a link. Specifically, in a case where there are no additional configuration in a multi-link setup, a multi-link device may exchange a frame corresponding to a TID through each link according to the default configuration. The default configuration may indicate all TIDs being exchanged through any one link. Any TID or AC may be always mapped to at least one link at any time points. A management frame and a control frame may be transmitted through all links.

In a case where a link is mapped to a TID or AC, only a data frame corresponding to the TID or AC mapped to the link may be transmittable through the link. In a case where a link is mapped to a TID or AC, a data frame not corresponding to a TID or AC mapped to the link is untransmittable through the link. In a case where a link is mapped to a TID or AC, an ACK may also be transmitted based on the link to which the TID or AC is mapped. For example, a block ACK agreement may be determined based on mapping between a TID and a link. In another detailed embodiment, mapping between a TID and a link may be determined based on a block ACK agreement. Specifically, a block ACK agreement may be configured for a TID mapped to a particular link.

Through mapping between a TID and a link described above, QoS can be ensured. Specifically, a relatively small number of stations may operate, or an AC or TID having a high priority may be mapped to a link having a good channel state. In addition, through mapping between a TID and a link described above, a station can maintain a power-saving state for a longer time.

Figure 10:
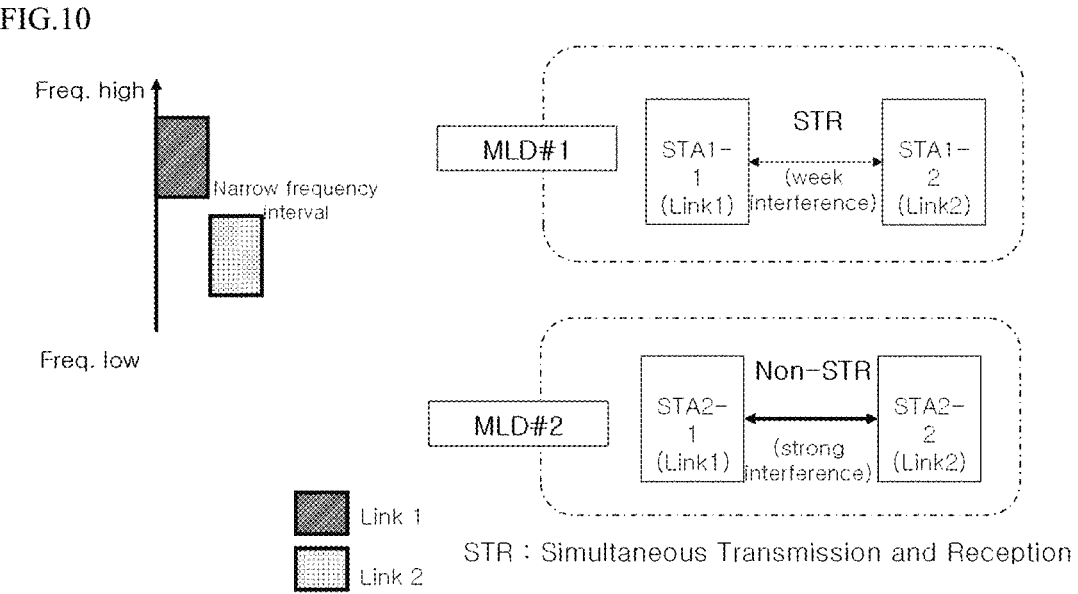
FIG. 10 shows simultaneous transmission of different links in a multi-link operation according to an embodiment of the present invention.

FIG. 10 shows simultaneous transmission of different links in a multi-link operation according to an embodiment of the present invention.

According to implementation of a multi-link device, a simultaneous operation may not be supported in multiple links. For example, it may not be supported that a multi-link device simultaneously performs transmission in multiple links, simultaneously performs reception in multiple links, or performs transmission in one link and simultaneously perform reception in another link. This is because reception or transmission performed in one link may affect reception or transmission performed in another link. Specifically, transmission in one link may act as interference in another link. Interference from one link to another link of one multi-link device may be called internal leakage. The smaller the frequency interval between links, the larger the internal leakage. If internal leakage is not too large, when transmission is performed in one link, transmission may be performed in another link. If internal leakage is large, when transmission is performed in one link, transmission in another link is not possible. A multi-link device simultaneously performing operations in multiple links as described above may be called simultaneous transmit and receive or simultaneous transmission and reception (STR). For example, a multi-link device simultaneously performing transmission in multiple links, performing transmission in one link and simultaneously performing reception in another link, or simultaneously performing reception in multiple links may be named STR.

Meanwhile, in a case where STR is not supported due to mutual interference between multiple stations configuring an MLD, the STAs may be expressed as being in a non-STR relation or an NSTR relation (a relation in which STR is not supported).

Whether two STAs (STA 1 and STA 2) of the MLD support STR may vary according to a distance between a pair of links (link 1 in which STA 1 is operated and link 2 in which STA 2 is operated) in which the STAs are operated.

Therefore, when the MLD operates STAs in a particular link pair, if STR is supported between the two STAs operated in the particular link pair, the particular link pair may be considered by the MLD as an STR link pair. On the other hand, when the MLD operates STAs in another link pair, if STR is not supported between the two STAs operated in the other link pair, the other link pair may be considered by the MLD as an NSTR link pair.

As described above, whether STR is supported between STAs of an MLD is determined according to whether a link pair in which the STAs operate is an STR link pair or an NSTR link pair. However, as described above, since the characteristics (shielding performance, etc.) of MLDs may be different from each other, a particular link pair may be considered by a particular MLD as a link pair in which STR is supported, but may be considered by a different MLD as an NSTR link pair in which STR is not supported.

In embodiments of the present invention described later, for convenience of explanation, STAs operated in an STR link pair of an MLD are named (specified as) STAs of an STR MLD, and STAs operated in an NSTR link pair of an MLD are named (specified as) STAs of a non-STR (and NSTR) MLD. That is, in the following embodiments, when an STA is called "an STA of a non-STR MLD", this indicates one of two STAs operated in an NSTR link pair of the MLD, and when an STA is called "an STA of an STR MLD", this may be interpreted as indicating one of two STAs operated in a STR link pair of the MLD.

In addition, an NSTR MLD may mean, in relation to whether STR is supported described above, not only an MLD wherein an STA of the particular MLD loses a reception capability, but also an MLD wherein the hardware configuration of the MLD does not support simultaneous transmission/reception.

In other words, the hardware configuration of a multi-link device (MLD) may have a configuration in which, while a particular STA of the MLD is performing transmission or reception, hardware resources available for another STA of the MLD is limited. For example, if a particular MLD has a hardware configuration supporting only processing of a single PPDU, when a particular STA of the particular MLD is performing Rx, the particular MLD is unable to support Tx and Rx for another STA in the MLD. Similarly, even when a particular STA of the particular MLD is performing Tx, the particular MLD is unable to support Tx and Rx for another STA in the MLD.

As described above, a device that is a multi-link device and is able to operate STAs in two or more links, but is able to support transmission/reception for only a single STA at a particular time point may be called a multi-link single radio MLD (MLSR MLD). Alternatively, an operation mode in which an MLD supports transmission/reception only for a single STA as a type of an operation mode may be called an enhanced multi-link single radio (EMLSR) mode. A MLD operating in the EMLSR mode may be a multi-radio MLD or an enhanced single-radio MLD. An enhanced single-radio MLD may mean a device that supports transmission/reception for only one link at a time, but has a configuration including separate hardware (a low-priced PHY front end, etc.) so as to support CCA and low-speed data rate (e.g., being encoded at 6 MHz or 24 MHz or lower) PPDU transmission/reception for two or more links.

In addition, as a modification of the EMLSR mode, enhance multi-link multi-radio (EMLMR) in which an MLD supports transmission/reception for each STA, but uses some of RF chains used by a particular STA, for transmission/reception of another STA may be defined. In a case of EMLMR, when all the RF chains used by the particular STA are used for transmission/reception of the other STA, there may be the same transmission/reception-limited characteristic as in EMLSR. That is, an MLD operating in the EMLMR mode may perform an operation of supporting only transmission/reception for a single one link (STA) at a particular time point regardless of whether STR is supported for links, and the operation may be understood as an operation similar to that of an MLD operating in the EMLSR mode.

That is, links of an MLD operated in the EMLSR/EMLMR mode may be considered as an NSTR link pair.

Transmission/reception described above means including transmission/transmission and reception/reception, that is, is independent to whether two links support STR/NSTR.

For convenience of explanation, an EMLSR/EMLMR MLD described hereinafter is used to mean including an MLD capable of supporting only transmission/reception for one STA at a particular time point due to hardware constraints, and an MLD supporting only high-speed data frame transmission/reception for one STA at a particular time point as a type of an operation mode even though the MLD is capable of supporting transmission/reception (a processing capability regardless of STR) for two or more STAs.

Operations of an STR MLD considering limited performance of an NSTR MLD, which are provided in embodiments of the present invention described above, are usable as operations of an STR MLD for an MLSR MLD without change. For example, when, after performing transmission to an STA of a multi-link single radio MLD, a STA of an STR MLD determines that the performed transmission has failed or is predicted to fail due to the limited performance of the multi-link single radio MLD STA, the STA may cancel transmission being performed or to be performed. A procedure of identifying whether the transmission has failed due to the limited performance of the EMLSR/EMLMR MLD may be similar to identifying whether transmission having performed for an STA of an NSTR MLD has failed due to the limited performance of the NSTR MLD STA.

As described above, a multi-link device may support STR or limitedly support same. Specifically, a multi-link device may support STR under only a particular condition. For example, if a multi-link device operates with a single radio, the multi-link device may not be able to perform STR. In addition, if a multi-link device operates with a single antenna, STR of the multi-link device may be unable to be performed. In addition, when internal leakage having a pre-designated size or larger is detected, a multi-link device may be unable to perform STR.

A station may exchange information on STR capability of the station with another station. Specifically, a station may exchange, with another station, information relating to whether a capability of the station simultaneously performing transmission in multiple links or simultaneously performing reception in multiple links is limited. Specifically, information relating to whether a capability of simultaneously performing transmission or reception in multiple links is limited may indicate whether simultaneous transmission, simultaneous reception, or simultaneous performing of transmission and reception is possible in multiple links. In addition, information relating to whether a capability of performing transmission or reception in multiple links is limited may be information indicated stage by stage. Specifically, information relating to whether a capability of performing transmission or reception in multiple links is limited may be information indicating a stage of showing the size of internal leakage. In a specific embodiment, the information indicating the stage of showing the size of internal leakage may be information indicating a stage of showing the size of interference caused by internal leakage. In another specific embodiment, the information may be information indicating a stage of showing the frequency interval between links, which is able to affect internal leakage. In addition, the information indicating the stage of showing the size of internal leakage may be information indicating the relation between the frequency interval between links and the size of internal leakage, stage by stage.

In FIG. 10, a first station (STA 1) and a second station (STA 2) are affiliated with one non-AP multi-link device. In addition, a first AP (AP 1) and a second AP (AP 2) may be affiliated with one non-AP multi-link device. A first link (link 1) is configured between the first AP (AP 1) and the first station (STA 1), and a second link (link 2) is configured between the second AP (AP 2) and the second station (STA 2). In FIG. 10, a non-AP multi-link device may limitedly perform STR. In a case where the second station (STA 2) performs transmission in the second link (link 2), reception of the first station (STA 1) in the first link (link 1) may be interrupted by transmission performed in the second link (link 2). For example, in the following case, reception of the first station (STA 1) in the first link (link 1) may be interrupted by transmission performed in the second link (link 2). The second station (STA 2) transmits first data (data1) in the second link (link 2), and the first AP (AP 1) transmits a response (ack for data1) for the first data (data1) to the first station (STA 1). The second station (STA 2) transmits second data (data2) in the second link (link 2). A transmission time of the second data (data2) may overlap with a transmission time of the response (ack for data1) for the first data (data1). Interference may occur in the first link (link 1) due to transmission by the second station (STA 2) in the second link (link 2). Therefore, the first station (STA 1) may fail to receive the response (ack for data1) for the first data (data1).

An operation of performing channel access by a multi-link device will be described. A multi-link operation, which is not described in detail, may follow a channel access procedure described with reference to FIG. 6.

A multi-link device may independently perform channel access in multiple links. The channel access method may be a backoff-based channel access. When a multi-link device independently performs channel access in multiple links, and a backoff counter in the multiple links reaches 0, the multi-link device may simultaneously start transmission in the multiple links. In a specific embodiment, when one of the backoff counters of multiple links reaches 0 and a pre-designated condition is satisfied, the multi-link device may perform channel access not only in the link, the backoff counter has reached 0, but also in another link, the backoff counter of which has not reached 0. Specifically, when one of the backoff counters of multiple links reaches 0, the multi-link device may perform energy detection in another link, the backoff counter of which has not reached 0. When energy having a pre-designated magnitude or greater is not detected, the multi-link device may perform channel access not only in the link, the backoff counter has reached 0, but also in a link in which energy detection has been performed. Accordingly, the multi-link device may simultaneously start transmission in multiple links. The size of a threshold used for energy detection may be smaller than that of a threshold used to determine whether to reduce a backoff counter. In addition, when whether to reduce a backoff counter is determined, the multi-link device may sense any types of signals as well as a wireless LAN signal. In addition, in energy detection described above, the multi-link device may sense any types of signals as well as a wireless LAN signal. Internal leakage may not be detected as a wireless LAN signal. In this case, the multi-link device may sense a signal detected due to internal leakage, through energy detection. In addition, as described above, the size of a threshold used for energy detection may be smaller than that of a threshold used to determine whether to reduce a backoff counter.

Therefore, even while transmission is being performed in one link, the multi-link device may reduce the backoff counter in another link.

According to the degree of interference between links used by a multi-link device, the multi-link device may determine whether a station operating in each link is able to independently operate. The degree of interference between links may be the size of interference detected by one station of the multi-link device when another station of the multi-link device performs transmission in one link. When transmission of, in a first link, a first station of the multi-link device cases interference having a pre-designated size or greater in a second station of a multi-link device operating in the second link, an operation of the second station may be restricted. Specifically, reception or channel access of the second station may be limited. This is because, when interference occurs, the second station may fail to decode a received signal due to the interference. In addition, this is because, when interference occurs, the second station may determine a channel as being used, at the time of channel access using backoff.

In addition, when transmission of, in a first link, a first station of the multi-link device cases interference smaller than the pre-designated size in a second station of a multi-link device operating in the second link, the first station and the second station may independently operate. Specifically, when transmission of, in a first link, a first station of the multi-link device cases interference smaller than the pre-designated size in a second station of a multi-link device operating in the second link, the first station and the second station may independently perform channel access. In addition, when transmission of, in a first link, a first station of the multi-link device cases interference smaller than the pre-designated size in a second station of a multi-link device operating in the second link, the first station and the second station may independently perform transmission or reception. This is because, in a case where interference smaller than the pre-designated size occurs, the second station may succeed in decoding a received signal even with the existence of the interference. In addition, this is because, when interference smaller than the pre-designated size occurs, the second station may determine a channel as being idle, at the time of channel access using backoff.

The degree of interference occurring between stations of a multi-link device may vary according to the hardware characteristics of the multi-link device as well as the interval between the frequency bands of links in which the stations operate. For example, internal interference occurring in a multi-link device including a high-priced radio frequency (RF) device may be smaller than that occurring in a multi-link device including a low-priced RF device. Therefore, the degree of interference occurring between stations of a multi-link device may be determined based on the characteristics of the multi-link device.

FIG. 10 shows a generated interference size varying according to the interval between frequency bands of links and the characteristics of multi-link devices. In an embodiment of FIG. 10, a first multi-link device (MLD #1) includes a first station (STA 1-1) operating in a first link (link 1) and a second station (STA 1-2) operating in a second link (link 2). A second multi-link device (MLD #2) includes a first station (STA 2-1) operating in a first link (link 1) and a second station (STA 2-2) operating in a second link (link 2). The frequency interval between the first link (link 1) and the second link (link 2) in which the first multi-link device (MLD #1) operate is the same as the frequency interval between the first link (link 1) and the second link (link 2) in which the second multi-link device (MLD #2) operate. However, a difference in characteristics between the first multi-link device (MLD #1) and the second multi-link device (MLD #2) causes different sizes of generated interference. Specifically, the size of interference generated in the second multi-link device (MLD #2) may be greater than that of interference generated in the first multi-link device (MLD #1). As described above, considering that a generated interference size may vary according to the characteristics of a multi-link device and whether STR is supported may vary for each multi-link device, exchange of information relating to whether STR is supported is required.

A multi-link device may perform signaling about whether a station included in the multi-link device supports STR. Specifically, an AP multi-link device and a non-AP multi-link device may exchange whether an AP included in the AP multi-link device supports STR, and whether an STA included in the non-AP multi-link device supports STR. In these embodiments, an element indicating whether STR is supported may be used. The element indicating whether STR is supported may be named an STR support element. An STR support element may use one bit to indicate whether a station of a multi-link device having transmitted the STR support element supports STR. Specifically, an STR support element may indicate whether each of stations included in a multi-link device transmitting the STR support element supports STR, by using each one bit. If a station supports STR, the value of a bit is 1, and if a station does not support STR, the value of a bit may be 0. In a case where a multi-link device having transmitted an STR support element includes a first station (STA 1), a second station (STA 2), and a third station (STA 3), the first station (STA 1) and the third station (STA 3) support STR, and the second station (STA 2) does not support STR, the STR support element may include a field having $101_{1b}$. Stations operating in different frequency bands are assumed to support STR, and an STR support element may omit signaling about whether STR is supported between the stations operating in different frequency bands. For example, the first station (STA 1) operates in a first link of 2.4 GHz, and the second station (STA 2) and the third station (STA 3) operate in a second link and a third link having 5 GHz, respectively. An STR support element may use one bit to indicate that STR is supported between the second station (STA 2) and the third station (STA 3). In addition, an STR support element may include only one bit if there are two stations signaled by the STR support element.

In a specific embodiment, the relation between a link positioned at 2.4 GHz and a link positioned at 5 GHz or 6 GHz among links of a multi-link device may always be determined as STR. Therefore, signaling about whether a link positioned at 2.4 GHz and a link positioned at 5 GHz or 6 GHz support STR may be omitted.

In the embodiment described above, what is described as an operation of a multi-link device may be replaced with an operation of a multi-link device. In addition, in the above embodiments, an operation of an AP may be replaced with an operation of a non-AP station, and an operation of a non-AP station may be replaced with an operation of an AP. Therefore, an operation of an AP of a non-STR multi-link device may be replaced with an operation of a non-AP station of a non-STR multi-link device, and an operation of a non-AP station of an STR multi-link device may be replaced with an operation of an AP of an STR multi-link device. In addition, an operation of a non-AP station of a non-STR multi-link device may be replaced with an operation of an AP of a non-STR multi-link device, and an operation of an AP of an STR multi-link device may be replaced with an operation of a non-AP station of an STR multi-link device.

Figure 11:
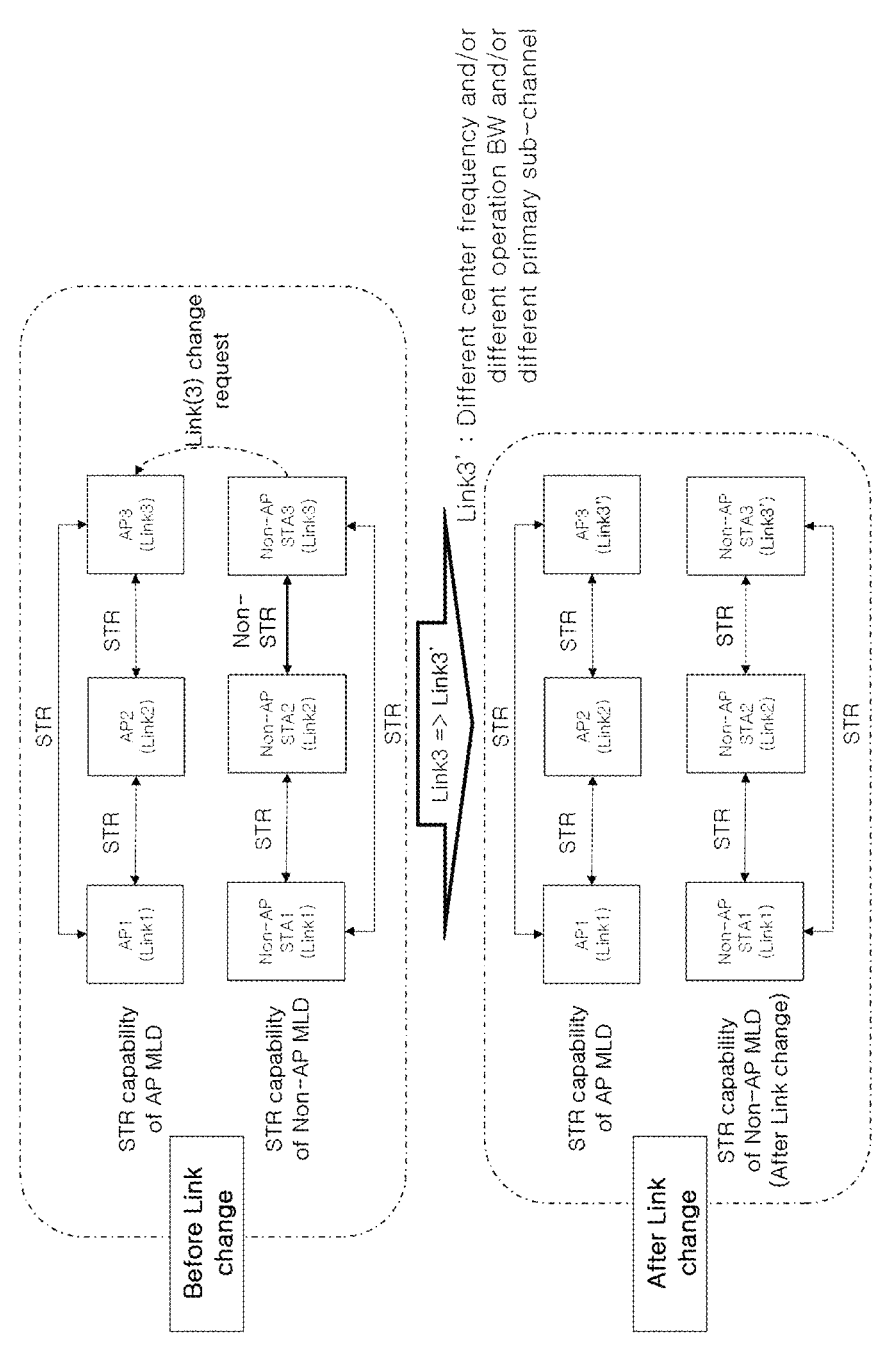
FIG. 11 shows an operation of a multi-link device in a case where a link is changed according to an embodiment of the present invention.

FIG. 11 shows an operation of a multi-link device in a case where a link is changed according to an embodiment of the present invention.

When the frequency band of a link is changed, an STR support element may be exchanged. This is because, as described above, whether a station supports STR may vary according to the distance between the frequency bands of links, and when the frequency band of a link is changed, whether the station supports STR may be changed. A case where the frequency band of a link is changed may include at least one of a change in the center frequency of the link, a change in the bandwidth of the frequency band, and a change in the 20 MHz primary channel. An AP and a station may exchange an STR support element through a request and a response. In another specific embodiment, when the frequency band of a link is changed, an STR support element may be exchanged without a separate request. In addition, in the embodiments described above, a case where the frequency band of a link is changed may include a case where an operating channel of a station is changed.

When a station of a non-AP multi-link device is unable to perform STR, the station of the non-AP multi-link device may request an AP to change a link. Specifically, the station of the non-AP multi-link device may request to change at least one of the center frequency, the bandwidth of the frequency band, and a 20 MHz primary channel. The link change request may be transmitted to the AP through the link requested to be changed. In another specific embodiments, the link change request may be transmitted to the AP through a link not requested to be changed. The link change request may include information indicating the link requested to be changed. The information indicating the link may be a number for identifying the link. In these embodiments, the change of a link may correspond to change of an operating channel in one frequency band. In addition, the change of a link may include information relating to a method of changing the link. Specifically, a link change request may indicate whether to move the center frequency of the link to a frequency higher than the current center frequency, or to move the center frequency of the link to a frequency lower than the current center frequency. In another specific embodiment, a link change request may implicitly indicate change to a frequency band far away from an adjacent link. In addition, a link change request may indicate reducing the bandwidth of the link. In addition a link change request may indicate changing the position of a primary channel. Specifically, a link change request may indicate changing the position of a primary channel to a channel in a frequency band lower than the current position of the primary channel, or to a channel in a frequency band higher than that. The AP having received a link change request may change the link according to the link change request. In addition, the AP having received a link change request in a specific embodiment may neglect the link change request.

In an embodiment of FIG. 11, a second station (STA 2) and a third station (STA 3) of a non-AP multi-link device are unable to support STR. The non-AP multi-link device requests an AP multi-link device to change a third link (link 3). The AP multi-link device having received a link change request changes an operating link of a third AP (AP 3). The third station (STA 3) operating in the third link (link 3) to be changed may transmit a change request to the third AP (AP 3). In another specific embodiment, a station not operating in the third link (link 3) may transmit a change request to an AP not operating in the third link (link 3).

When an AP changes a link, the AP may broadcast information on the link change by using a beacon frame. The information on the link change may include information on the frequency of the link. The information on the frequency of the link may include at least one of change of the center frequency, the operating bandwidth, and the primary channel of the link. In addition, the information on the link change may include information on a link change time point. In addition, the link change may be completed at the time of transmission of a beacon including the information on the link change.

In FIG. 11, the link in which the third station (STA 3) operates is changed and thus the third station (STA 3) and the second station (STA 2) may support STR. As described above, the non-AP multi-link device transmits an STR support element to the AP multi-link device to perform signaling about whether STR is supported, which has been changed.

Link change described above may not be allowed, or STR may not be supported even through link change. In addition, as in the embodiment of FIG. 11, an AP multi-link device supports STR, but a non-AP multi-link device may not support STR. This is because it may be common that a relatively high-priced device is used as an AP multi-link device, and a relatively low-priced device is used as a non-AP multi-link device. Therefore, at the time of communication between multi-link devices, a method enabling efficient communication even when one multi-link device does not support STR is required. Here, STR may indicate transmission and reception being simultaneously performed. This will be explained with reference to FIG. 12.

Figure 12:
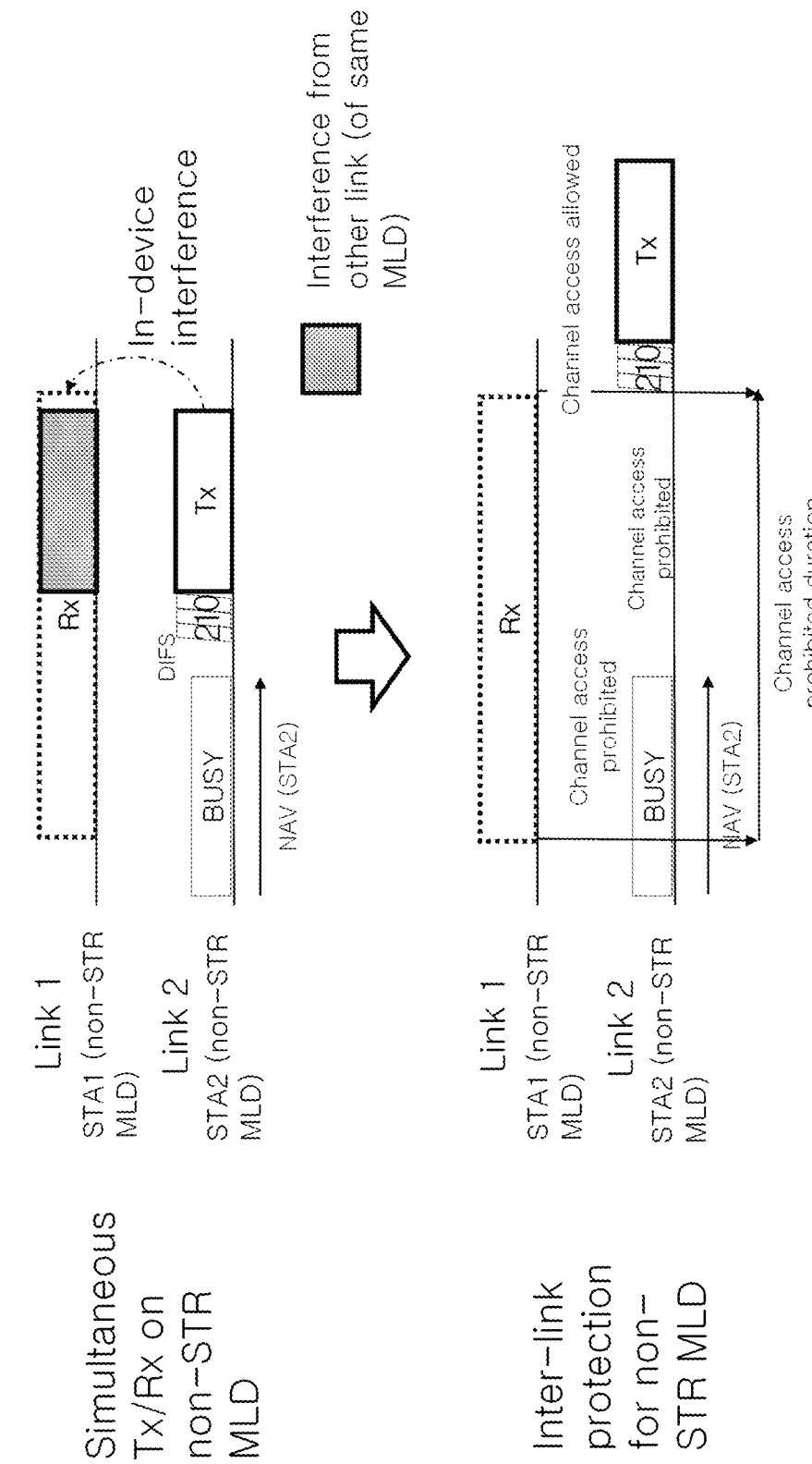
FIG. 12 shows that, during reception of one station of a non-STR multi-link device, channel access of another station of the non-STR multi-link device is prohibited according to an embodiment of the present invention.

FIG. 12 shows that, during reception of one station of a non-STR multi-link device, channel access of another station of the non-STR multi-link device is prohibited according to an embodiment of the present invention.

In a case where transmission is performed in one link of a non-STR multi-link device and reception is performed in another link of the non-STR multi-link device, the transmission and the reception of the non-STR multi-link device may fail. In order to solve this failure, when reception is performed in one link of a non-STR multi-link device, channel access in another link of the non-STR multi-link device may be prohibited. Specifically, when reception is performed in one link of a non-STR multi-link device, backoff of channel access in another link of the non-STR multi-link device may be prohibited. Accordingly, when reception is performed in one link of a non-STR multi-link device, transmission being started in another link of the non-STR multi-link device may be prevented. In a specific embodiment, when reception is started in one link of a non-STR multi-link device, backoff of channel access in another link of the non-STR multi-link device may be prohibited. This may be configured through a particular bit of a memory, such as a channel access prohibition flag. Then, whether channel access is prohibited may be shared through a memory in a multi-link device. Through this embodiment, without separate frame exchange, channel access prohibition may be implemented. For convenience of explanation, channel access prohibition used in the present specification indicates prohibiting channel access or transmission in order to protect transmission or reception of a non-STR multi-link device, unless otherwise specified.

In a case where channel access is prohibited, a station operating in a link in which channel access is prohibited is unable to perform a backoff procedure regardless of a NAV and a CCA result. In addition, in a case where channel access is prohibited, a station operating in a link in which channel access is prohibited is unable to perform transmission regardless of a NAV and a CCA result. However, even when channel access is prohibited, a station operating in a link in which channel access is prohibited may perform reception. In addition, channel access prohibition in a second link caused by reception performed in a first link may be released based on when the reception in the first link is completed. Specifically, channel access prohibition in a second link caused by reception performed in a first link may be released when the reception in the first link is completed. In another specific embodiment, channel access prohibition in a second link caused by reception performed in a first link may be released based on a time point at which an ACK is transmitted after the reception in the first link is completed. Specifically, channel access prohibition in a second link caused by reception performed in a first link may be released at a time point at which an ACK is transmitted after the reception in the first link is completed. In another specific embodiment, in a specific embodiment, channel access prohibition in a second link caused by reception performed in a first link may be released at a time point at which ACK transmission is completed after the reception in the first link is completed. In addition, immediately after channel access prohibition is released, the station may instantly reduce a backoff counter without additional sensing. The additional sensing may indicate sensing performed during a DCF interframe space (DIFS). In another specific embodiment, when a channel is idle for a pre-designated time immediately before channel access prohibition is released, the station may instantly reduce a backoff counter without additional sensing. The pre-designated time may be one of a PCF interframe space (PIFS), a DIFS, a short interframe space (SIFS), and an arbitration interframe space (AIFS).

In an embodiment of FIG. 12, a non-STR multi-link device includes a first station (STA 1) operating in a first link (link 1) and a second station (STA 2) operating in a second link (link 2). In a case where, while the first station (STA 1) is performing reception, the second station (STA 2) performs transmission in the second link (link 2), in-device interference occurs. As described above, while the first station (STA 1) operating in the first link (link 1) is performing reception, channel access of the second station (STA 2) performed in the second link (link 2) is prohibited. After reception of the first station (STA 1) in the first link (link 1) is completed, the channel access prohibition is released. Immediately after the channel access prohibition is released, the second station (STA 2) may reduce a previous backoff counter value from 3 to 2 by 1 without additional sensing.

For convenience of expression, the drawing of FIG. 12 uses a single block (Tx solid line and Rx dotted line) when expressing Rx and Tx, and even though a separate Ack block is not illustrated, the single block may be understood as expressing an operation including Tx/Ack reception and Rx/Ack transmission. This may also be applied to the drawings described later in the same way.

When a station identifies that an intended receiver of a received PPDU is not the station, the station may stop receiving the PPDU. In this case, an operation of releasing channel access prohibition by a multi-link device is at issue. An intended receiver in the present specification is used to have the same meaning as a destination station.

Figure 13:
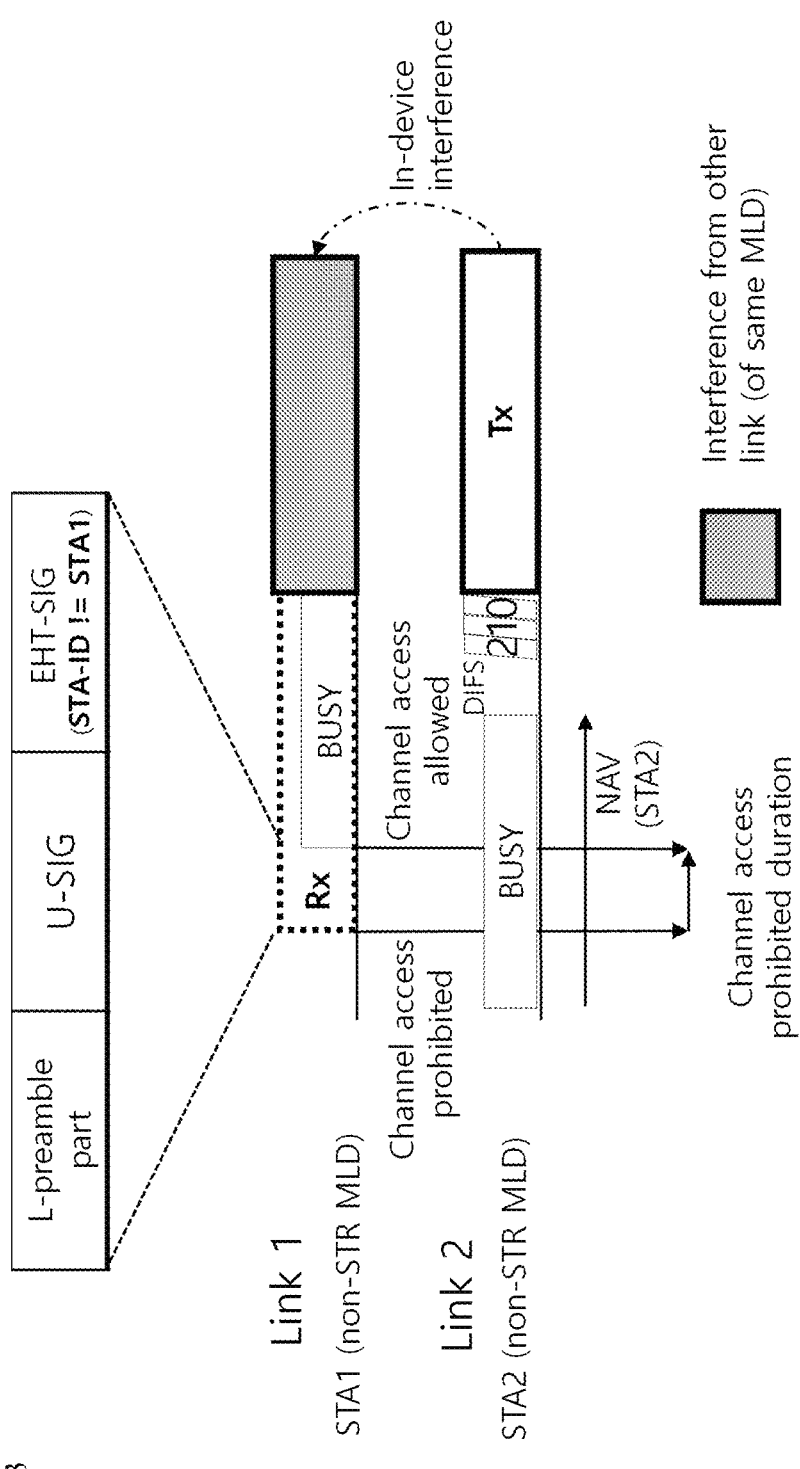
FIG. 13 shows an operation of releasing channel access prohibition when an intended receiver of a PPDU received by a station of a non-STR multi-link device is identified as not being the station according to an embodiment of the present invention.

FIG. 13 shows an operation of releasing channel access prohibition when an intended receiver of a PPDU received by a station of a non-STR multi-link device is identified as not being the station according to an embodiment of the present invention.

When a station identifies that an intended receiver of a received PPDU is not the station, the station may release channel access prohibition. The station may determine whether the station is the intended receiver of the PPDU, based on information indicating a receiver address of a signaling field of the PPDU. The information indicating the receiver address of the signaling field of the PPDU may be a value of an STA-ID field of an EHT-SIG field described above. Specifically, the station may determine whether the STA-ID field of the EHT-SIG field indicates the station. In addition, the station may determine whether the station is the intended receiver of the PPDU, based on a value of a RA field of a MAC frame included in the PPDU. Specifically, the station may determine whether the RA field of the MAC frame included in the PPDU indicates the station. In FIG. 13, a non-STR multi-link device includes a first station (STA 1) operating in a first link (link 1) and a second station (STA 2) operating in a second link (link 2). The first station (STA 1) receives a PPDU. The first station (STA 1) determines that an intended receiver of the received PPDU is not the first station (STA 1), and stops receiving the PPDU. At this time, the first station (STA 1) may release channel access prohibition of the second station (STA 2). Even if the channel access prohibition of the second station (STA 2) is released, channel access of the second station (STA 2) may be delayed according to a NAV configured for the second station (STA 2).

Even though channel access prohibition is released as illustrated in FIG. 13, a station included in a non-STR multi-link device may often have fewer channel access opportunities, compared to a station not included in a multi-link device or a station included in an STR multi-link device. Therefore, a method for compensating for channel access opportunities of a station included in a non-STR multi-link device may be required for fair competition with other stations. For example, immediately after release of channel access prohibition, when reducing a backoff counter, a station for which channel access prohibition has been released may be allowed to reduce the backoff counter by 2 or greater. This will be explained with reference to FIG. 14(a) and FIG. 14(b).

FIG. 14 show a station performing channel access after channel access prohibition is released according to an embodiment of the present invention.

A station for which channel access prohibition has been released may reduce a backoff counter by 2 or greater immediately after release of channel access prohibition. While channel access of the station is prohibited, another station has performed a backoff procedure, and thus the reduction is for ensuring fairness in channel access opportunities with other stations.

In another specific embodiment, a station for which channel access is prohibited may perform a channel access procedure including CCA (CSMA) and backoff counter reduction, while channel access is prohibited. In FIG. 14(a) and FIG. 14(b), a non-STR multi-link device includes a first station (STA 1) operating in a first link (link 1) and a second station (STA 2) operating in a second link (link 2). In FIG. 14(a) and FIG. 14(b), while the first station (STA 1) is performing reception, channel access of the second station (STA 2) is prohibited. In FIG. 14(a), while channel access of the second station (STA 2) is prohibited, the second station (STA 2) may perform a channel access procedure including CCA (CSMA) and backoff counter reduction. In FIG. 14(a), while channel access of the second station (STA 2) is prohibited, a channel of the second link (link 2) is idle, and thus the second station (STA 2) reduces a backoff counter.

In addition, a station, the channel access of which is prohibited, may delay transmission rather than starting same, even when a backoff counter reaches 0 while the channel access is prohibited. At this time, the station may maintain a backoff counter value at 0. In addition, even when the station delays transmission, the station may maintain a CW value without change. Therefore, this is differentiated from doubling a CW value by a station because a channel accessed by the station is busy. This is because the CW maintenance does not correspond to a case where a reason for delayed transmission is a channel being determined as being busy. In FIG. 14(*b*), while channel access of the second station (STA 2) is prohibited, the second station (STA 2) may perform a channel access procedure including CCA (CSMA) and backoff counter reduction. In FIG. 14(*b*), while channel access of the second station (STA 2) is prohibited, a channel of the second link (link 2) is idle, and thus the second station (STA 2) reduces a backoff counter. While channel access of the second station (STA 2) is prohibited, a backoff counter of the second station (STA 2) reaches 0. The second station (STA 2) delays transmission, and start transmission after the channel access prohibition is released.

As described above, channel access prohibition may include transmission to the second station being prohibited when the first station of the non-STR multi-link device performs transmission. In addition, channel access prohibition may include transmission of the second station being prohibited when the first station of the non-STR multi-link device performs reception.

Through FIG. 14(*b*), in embodiments, if there are multiple stations, the channel access of which is prohibited, it is highly probable that the channel access prohibition of the multiple stations is simultaneously released, and the multiple stations simultaneously attempt transmission. Therefore, a method for lowering a transmission collision probability is required. This will be explained with reference to FIG. 15.

Figure 15:
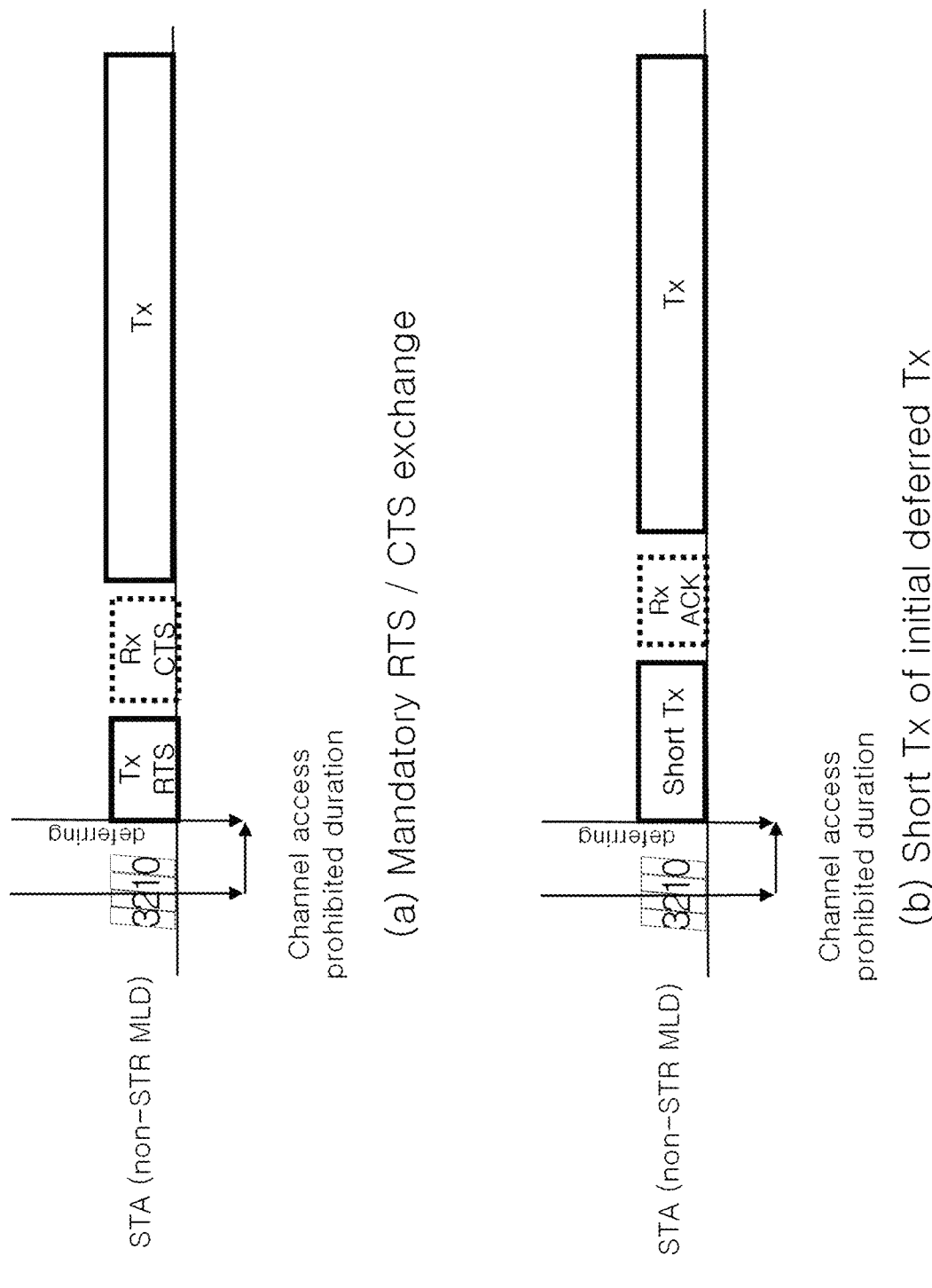
FIG. 15 show an operation in which a station performs transmission after channel access prohibition is released according to an embodiment of the present invention.

FIG. 15 show an operation in which a station performs transmission after channel access prohibition is released according to an embodiment of the present invention.

As described above, transmission is performed in a first link among multiple links in which a non-STR multi-link device operates, and thus transmission in a second link may be prohibited. When the transmission in the first link is completed, transmission in the second link may be started by RTS/CTS frame exchange. Therefore, in a case where transmission is performed in a first link among multiple links in which a non-STR multi-link device operates, the non-STR multi-link device may start RTS/CTS frame exchange in a second link. After release of channel access prohibition of a station, the transmission of which is delayed due to the channel access prohibition, the station may start exchange of a request to send (RTS)/clear to send (CTS) frame before starting delayed transmission. If the station has failed to receive the CTS frame, the station may be unable to start the delayed transmission. In an embodiment of FIG. 15(*a*), a station, the transmission of which is delayed due to channel access prohibition, transmits an RTS frame before starting the delayed transmission. The station receives a CTS frame as a response for the RTS frame, and then start the delayed transmission.

In another specific embodiment, after release of channel access prohibition of a station, the transmission of which is delayed due to the channel access prohibition, the station may transmit a frame including only a part of the delayed transmission. The station receives a response, e.g., an ACK, for the frame including only the part of the delayed transmission, and then may transmit a part of the delayed transmission having not been transmitted. If the station has failed to receive the response for the frame including only the part of the delayed transmission, the station may not transmit a part of the delayed transmission having not been transmitted. As described above, the reason of the station starting RTS/CTS exchange or transmitting only a part of delayed transmission after release of channel access prohibition is that a collision probability of transmission after channel access prohibition may be higher than that of general transmission. Therefore, the embodiments described above may be mandatorily applied to transmission performed after release of channel access prohibition. In a conventional wireless LAN operation, an RTS/CTS frame has been used to solve a hidden node problem, and may have been used based on the size of transmission data. In the embodiments described above, an RTS/CTS frame is for preventing transmission collision with a station that is to perform delayed transmission, so as to protect transmission or reception of a non-STR multi-link device.

As described above, when one station of a non-STR multi-link device performs reception, transmission of another station of the non-STR multi-link device may be limited. In addition, when one station of a non-STR multi-link device performs transmission, another station of the non-STR multi-link device may have difficulty in precisely sensing a channel state of a link in which the other station operates. Specifically, when a first station of a non-STR multi-link device performs transmission, the second station of the non-STR multi-link device may always determine, as being busy, a channel state of a link in which the second station operates. Accordingly, even when a channel of a link in which the second station operates is idle, the second station may determine the channel as being busy, due to in-device interference. As described above, a station that is not able to determine a channel state due to in-device interference, or a station of a non-STR multi-link device when another station of the non-STR multi-link device is performing transmission is called being in a blind state. Due to situations described above, a station in a blind state may have difficulty in performing a backoff procedure to attempt transmission. In addition, due to situations described above, a station in a blind state may have difficulty in starting PPDU reception or succeeding in decoding. Therefore, a transmission method considering a state in a blind state is required. This will be explained with reference to FIG. 16.

Meanwhile, when a PPDU is transmitted/received via an STA of another link, an STA of an EMLSR/EMLMR MLD is unable to identify or receive whether a PPDU transmitted to the STA exists, even if the PPDU is transmitted to the STA. Therefore, an STA of an MLD operating in an EMLSR/EMLMR mode may have the same performance restriction as an STA of an NSTR MLD being blind, while another STA in the MLD is transmitting/receiving a data frame. Therefore, an operation considering the state a blinded STA in embodiments described later may be understood to be identical to considering whether an STA of an MLD operating in an EMLSR/EMLMR mode is in a restricted state due to an operation (transmission/reception) of another STA in the MLD.

In this case, a mode in which a multi-link device uses a single radio of a single link in a particular time interval may be referred to as an EMLSR mode. While a multi-link device is performing frame exchange in a first link of EMLSR links that are multiple links to which the EMLSR mode is applied, the multi-link device does not perform transmission and reception in a second link of the EMLSR links. In addition, in a case where, in a particular time interval of a particular mode, some of RF chains used by a particular STA of a multi-link device are used by another station of the multi-link device to perform transmission or reception, the particular mode may be called an enhance multi-link multi-radio (EMLMR). Specifically, in a case where one station of a multi-link device in the EMLMR mode uses all RF changes of another station of the multi-link device to perform transmission or reception, an operation of the multi-link device may be the same as an operation of multiple links in the EMLSR mode. In addition, even when a multi-link device operates in the EMLSR mode, some links of multiple links in which the multi-link device operates may operate without being limited by the EMLSR mode. When a multi-link device operates in the EMLSR mode, links to which the EMLSR mode is applied may be some of links in which the multi-link device operates. For example, when a multi-link device operates in a first link to a third link, the EMLSR mode or the EMLMR mode may be applied only to the first link and the second link. Therefore, when the multi-link device performs transmission or reception in the first link in a particular time interval of the EMLSR mode, the multi-link device is unable to perform transmission or reception in the second link. The multi-link device may perform transmission or reception in the third link without limitation corresponding to the EMLSR mode. For convenience of explanation, like the first link and the second link, a link to which the EMLSR mode is applicable is referred to as an EMLSR link, and a link to which the EMLMR mode is applicable is called an EMLMR link. Performing transmission or reception by using RF chains of a particular station in the EMLSR mode and the EMLMR mode brings switching of a transmission, reception, or monitoring capability in a link in which the particular station operates. Therefore, in the subsequent explanations, an embodiment of the present invention applied in relation to the EMLSR mode may be identically applied in relation to the EMLMR mode without special mention.

Figure 16:
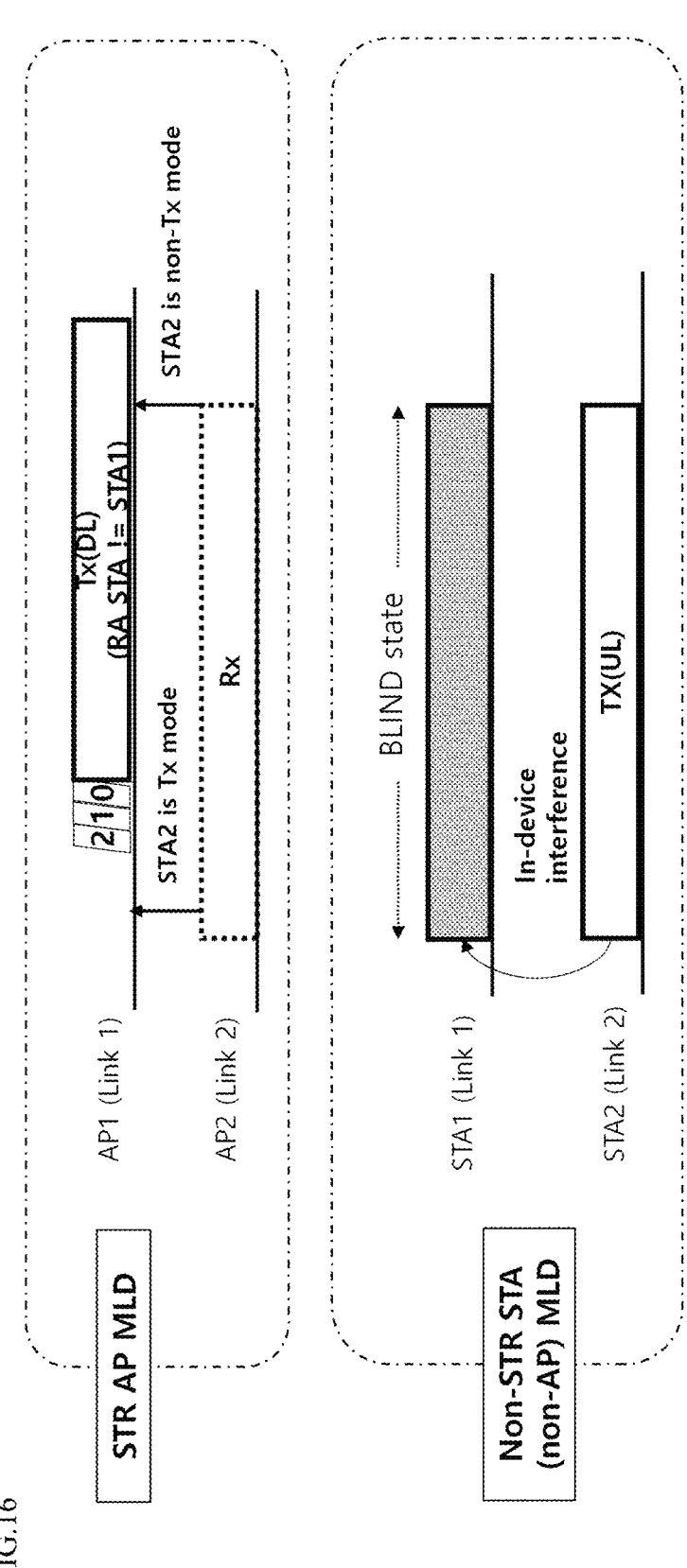
FIG. 16 shows transmission performed based on a state of a station in a non-STR multi-link device according to an embodiment of the present invention.

FIG. 16 shows transmission performed based on a state of a station in a non-STR multi-link device according to an embodiment of the present invention.

A station to perform transmission to a station of a non-STR multi-link device may determine whether to perform transmission according to whether the station of the non-STR multi-link device is in a blind state. The station to perform transmission to the station of the non-STR multi-link device may be a station included in an STR multi-link device. In addition, the station to perform transmission to the station of the non-STR multi-link device may be an AP included in an AP multi-link device, and the non-STR multi-link device may be a non-AP multi-link device. A station to perform transmission to a station of a non-STR multi-link device may determine whether the station of the non-STR multi-link device is in a blind state, as follows. The station to perform transmission may determine whether another station of a multi-link device including the station is performing transmission to the non-STR multi-link device. When another station of a multi-link device including the station is performing reception from the non-STR multi-link device, the station may determine that the station of the non-STR multi-link device, which is to receive transmission of the station, is in a blind state. In an embodiment of FIG. 16, an STR AP multi-link device includes a first AP (AP 1) operating in a first link (link 1) and a second AP (AP 2)

operating in a second link (link 2). A non-STR non-AP multi-link device includes a first station (STA 1) operating in the first link (link 1) and a second station (STA 2) operating in the second link (link 2). The second station (STA 2) is performing transmission to the second AP (AP 2). Therefore, the second AP (AP 2) may notify the first AP (AP 1) that the second AP is performing reception from the second station (STA 2). Specifically, the second AP (AP 2) may notify the first AP (AP 1) that a subject performing transmission to the second AP (AP 2) is the second station (STA 2). In another specific embodiment, the second AP (AP 2) may notify the first AP (AP 1) that the second station (STA 2) is currently performing transmission. The first AP (AP 1) may determine that the first station (STA 1) is in a blind state, based on the notification.

Stations in a multi-link device may be operated through a common MAC. Therefore, information exchange between the first AP (AP 1) and the second AP (AP 2) described above may not be explicitly performed.

A station may not perform transmission to a station in a blind state. This is because, even when a station performs transmission to a station in a blind state, it is highly probable that the station in the blind state fails to start reception, or the station in the blind state fails to decode a PPDU. The station may cancel the transmission to the station in the blind state, and may perform transmission to another station.

When an STR multi-link device performs transmission to a non-STR multi-link device, the STR multi-link device may perform transmission to the non-STR multi-link device in multiple links. Specifically, when a STR multi-link device performs transmission to a non-STR multi-link device in a first link, the STR multi-link device may start transmission to the non-STR multi-link device in a second link. The STR multi-link device may determine the length of the transmission performed in the second link, based on the transmission being transmission to the non-STR multi-link device. Specifically, the STR multi-link device may determine the length of the transmission to the non-STR multi-link device in the second link, based on the length of the transmission to the non-STR multi-link device in the first link. In a specific embodiment, the STR multi-link device may simultaneously terminate the transmission in the first link and the transmission in the second link. The simultaneous termination prevents transmission to a station of the non-STR multi-link device while another one of the stations of the non-STR multi-link device is transmitting a response, for example, an ACK, for the transmission after transmission to another one of stations of the non-STR multi-link is terminated first. Through the embodiment described above, multiple stations of a non-STR multi-link device may simultaneously transmit responses for transmission to the multiple stations.

An STR multi-link device is unable to determine, in real time, a state of a station included in a non-STR multi-link device. Therefore, even when an STR multi-link device operates according to embodiments described with reference to FIG. 16, interference or transmission collision may occur between links in which a non-STR multi-link device operates. For example, in the embodiment of FIG. 16, before recognition that the second station (STA 2) is performing transmission to the second AP (AP 2), the first AP (AP 1) may start transmission to the first station (STA 1). As described above, a probability of occurrence of interference or collision between links may be greater than a probability of occurrence of interference or transmission collision in a link. This will be explained in more detail with reference to FIG. 17.

FIG. 17 shows a situation in which interference or collision between links may occur.

In a case where transmission of a second station of a non-STR station multi-link device to a second AP of an STR AP multi-link device is started simultaneously with transmission of a first AP of the STR AP multi-link device to a first station of the non-STR station multi-link device, a transmission collision between links may occur. FIG. 17(*a*) shows the case. The transmission collision may occur because, as described above, an STR multi-link device is unable to determine, in real time, a state of a station included in a non-STR multi-link device.

In addition, even in a case where transmission of a second station of a non-STR station multi-link device to a second AP of an STR AP multi-link device is started earlier than transmission of a first AP of the STR AP multi-link device to a first station of the non-STR station multi-link device, a transmission collision between links may occur. FIG. 17(*b*) shows the case. The transmission collision is caused because a time may be taken for the second AP (AP 2) to notify the first AP (AP 1) that the second station (STA 2) is performing transmission. As described above, transmission collision occurs even between stations starting transmission at different time points, and thus a probability of occurrence of interference or transmission collision between links may be greater than a probability of occurrence of interference or collision in a link. In addition, as an AP of an STR multi-link device is delayed in identifying a transmitter of a received PPDU received, a probability of occurrence of interference or transmission collision between links may be increased. Therefore, a method for solving this problem is required. When one of stations of an STR multi-link device is performing reception, channel access of another station of the STR multi-link device may not be performed. However, in a case where channel access is prohibited as described above, the meaning of STR function implementation may fade away. Therefore, an operation method rather than channel access prohibition of an STR multi-link device may be needed. This will be explained with reference to FIG. 18A and FIG. 18B.

As described above, it may be important for a multi-link device to quickly determine a station performing transmission to the multi-link device. A user field of EHT-SIG of an EHT UL PPDU may indicate an identifier (STA-ID) of a station transmitting the EHT UL PPDU. Specifically, in a case where a DL/UL field of a signaling field of an EHT PPDU indicates that the EHT PPDU is an UL PPDU, a user field of EHT-SIG of the EHT PPDU may indicate an identifier of a station transmitting an EHT UL PPDU. A multi-link device receiving an EHT PPDU may identify a station transmitting the EHT PPDU, based on a user field of EHT-SIG of an EHT UL PPDU. Accordingly, an AP multi-link device may determine a station transmitting an EHT UL PPDU, and the AP multi-link device may determine a destination device of the transmission. Specifically, the AP multi-link device may determine whether a possibility that the transmission to be performed thereby fails due to interlink collision is high. In addition, if there is a high possibility that transmission to be performed by the AP multi-link device fails, the AP multi-link device may delay the transmission to be performed thereby, and perform another transmission.

Figure 18:
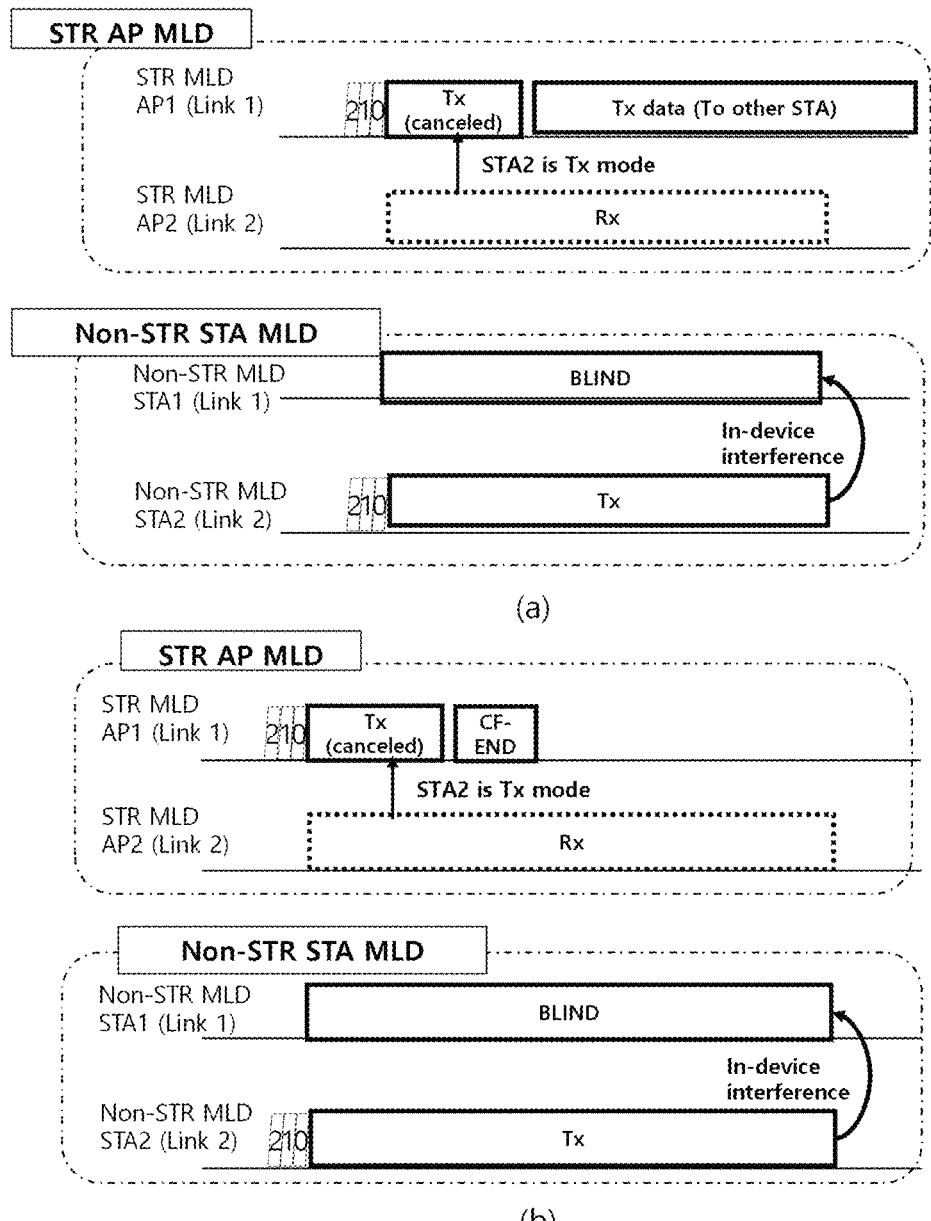
FIG. 18 show an operation in which an STR multi-link device stops transmitting to a non-STR multi-link device according to an embodiment of the present invention.

FIG. 18 show an operation in which an STR multi-link device stops transmitting to a non-STR multi-link device according to an embodiment of the present invention.

When a station of an STR multi-link device determines that a station of a non-STR multi-link device is in a blind state, while performing transmission to the station of the non-STR multi-link device, the STR multi-link device may stop transmitting to the station of the non-STR multi-link device in the blind state. Specifically, the STR multi-link device may determine whether the station of the non-STR multi-link device is in a blind state, based on a value indicated as an STA(AID)-ID by a signaling field of a received PPDU or a transmitting address (TA) field of a MAC frame included in the received PPDU. The STA-ID may be a value indicating a station transmitting a UL PPDU, in a UL PPDU. In a specific embodiment, if the value indicated as the STA (AID)-ID by a signaling field of the received PPDU indicates a first station included in the non-STR multi-link device, the STR multi-link device may determine that a second station included in the non-STR multi-link device is in a blind state. In addition, if the TA field of the MAC frame included in the received PPDU indicates the first station included in the non-STR multi-link device, the STR multi-link device may determine that the second station included in the non-STR multi-link device is in a blind state. Specifically, in a case where a station that has transmitted a PPDU and is indicated by a signaling field of the PPDU is the first station, or a TA field of a MAC frame included in the PPDU is the first station, the STR multi-link device may determine that the second station included in the non-STR multi-link device is in a blind state. As described above, the STR multi-link device may identify that one station of the non-STR multi-link device performs transmission, to determine that another station of the non-STR multi-link device is in a blind state. An operation of a station after transmission is canceled is described first.

If a TXOP configured for a station of the non-STR multi-link device is remaining, a station having canceled transmission to the station of the non-STR multi-link device may attempt transmission to a station other than the station of the non-STR multi-link device. The station having canceled transmission to the station of the non-STR multi-link device may perform transmission to a station other than the station of the non-STR multi-link device without a separate backoff procedure. In a specific embodiment, when a channel is detected as being idle for a pre-designated time interval without a separate backoff procedure after canceling of transmission to a station of the non-STR multi-link device, a station having canceled the transmission to the station of the non-STR multi-link device may perform transmission to a station other than the station of the non-STR multi-link device. The pre-designated time interval may be one of a SIFS, a PDIF, and a DIFS.

When a station having canceled transmission to a station of the non-STR multi-link device performs transmission to a station other than the station of the non-STR multi-link device, the station having canceled the transmission to the station of the non-STR multi-link device may transmit traffic having the same priority as that of the canceled transmission, or traffic having a higher priority. This is because, when traffic corresponding to a priority lower than that of traffic used in a channel access for the canceled transmission is transmitted, fairness may not be ensured. In the embodiments described above, a station of the STR multi-link device may be an AP.

A station having canceled transmission to a station of the non-STR multi-link device may initialize a configured TXOP. Specifically, a station having canceled transmission to a station of the non-STR multi-link device may transmit a CF-end frame after canceling transmission. Accordingly, this enables another station operating in a link in which the transmission is expected, to use the link.

In FIG. 18, an STR AP multi-link device includes a first AP (AP 1) operating in a first link (link 1) and a second AP (AP 2) operating in a second link (link 2). A non-STR non-AP multi-link device includes a first station (STA 1) operating in the first link (link 1) and a second station (STA 2) operating in the second link (link 2). The second station (STA 2) is performing transmission to the second AP (AP 2). The first AP (AP 1) determines that the first station (STA 1) is in a blind state, while performing transmission to the first station (STA 1). Therefore, the first AP (AP 1) stops transmitting to the first station (STA 1). In FIG. 18A, after stopping transmission to the first station (STA 1), the first AP (AP 1) performs transmission to a station other than the first station (STA 1) as in the embodiment described first. In FIG. 18B, after stopping transmission to the first station (STA 1), the first AP (AP 1) transmits a CF-end frame as in the embodiment described later.

When the station stops transmission, the station transmits a fragment being transmitted, and then may not transmit the next fragment. In another specific embodiment, the station may immediately stop transmission of a packet being transmitted.

In addition, an STA of an STR MLD having performed transmission to an STA of an MLD operating in the EMLSR or EMLMR mode may also cancel transmission being performed or to be performed, in the same way as an STR MLD having performed transmission to an STA in a blind state, described above. This is because an STA of an MLD operating in the EMLSR/EMLMR mode may have a performance restriction similar to that as in a blind state, as described above.

That is, while an STA of an STR MLD is performing transmission to an STA (e.g., EMLSR STA 1) of an MLD operating in the EMLSR/EMLMR mode, an STA of an STR MLD, when a PPDU is received from another STA (e.g., EMLSR STA 2) of the EMLSR/EMLMR MLD through an STA operated in another link, the STA of the STR MLD may stop the transmission being performed. In addition, if transmission has not been started yet, the STA of the STR MLD may transmit different traffic having the same access category (AC) rather than performing the transmission to be performed for the STA (e.g., EMLSR STA 1) of the EMLSR/EMLMR MLD.

As described above, a method of transmission management for an STA of an EMLSR/EMLMR mode MLD may be performed similarly/identically to a method of transmission management for an STA of an NSTR MLD. Therefore, even if a separate description for an EMLSR/EMLMR mode MLD is not provided in the present invention, an operation performed based on whether a particular STA of an NSTR MLD is a blind state may be performed identically/similarly based on whether the performance of a particular STA of an EMLSR/EMLMR mode MLD is limited due to transmission/reception of another STA.

In the embodiments described above, when an STR multi-link device stops transmission to a station of a non-STR multi-link device in a blind state, and performs transmission to a station other than the station of the non-STR multi-link device in the blind state, it is required to notify the other station that transmission to the other station may be performed, for stable reception of the other station. A method therefor is described. For convenience of explanation, a station other than a station of a non-STR multi-link device in a blind state is called the other station.

A station of an STR multi-link device may insert the address of the other station into a MAC frame. Specifically, a station of the STR multi-link device may insert the address of an intended receiver of a MAC frame, in a receiving address (RA) of the MAC frame, and insert the address of the other station in a separate field. In another specific embodiment, a station of the device may insert the address of the other station in EHT-SIG. Specifically, a station of the STR multi-link device may insert the address of an intended receiver of a PPDU and the address of the other station, in a user field of a signaling field of the PPDU. The address of the other station may be inserted behind the address of the intended receiver of a PPDU, in the user field of the signaling field of the PPDU.

In another specific embodiment, a station may monitor PPDU reception for a pre-designated time even after recognizing that an intended receiver of a received PPDU is not the station. Specifically, the station may monitor whether PPDU reception is continued for a pre-designated time, even after recognizing that an intended receiver of a received PPDU is not the station. Accordingly, the station may determine whether the transmission of the PPDU is stopped and transmission to the station is to start. In these embodiments, when it is determined that PPDU transmission is continued for the pre-designated time, the station may enter a power-saving state (doze state). When it is determined that PPDU transmission has not been continued for the pre-designated time, the station may maintain a wake-up state. Then, when the station receives a new PPDU, the station may decode the PPDU.

In another specific embodiment, a station transmitting a PPDU may insert, in the PPDU, information signaling that the transmission of the PPDU may be stopped. The information signaling that the transmission of the PPDU may be stopped may be a subfield having one bit. For example, if the value of the subfield signaling that the transmission of the PPDU may be stopped is 1, a station receiving the PPDU may determine that the transmission of the PPDU may be stopped before a time point indicated by a length field of a signaling field of the PPDU and a duration field of a MAC frame. If the station determines that the transmission of the PPDU may be stopped before the time point indicated by the length field of the signaling field of the PPDU and the duration field of the MAC frame, the station may defer to enter a power-saving state. In addition, the station transmitting the PPDU may insert, in a reserved field of the PPDU, information signaling that the transmission may be stopped.

As described above, transmission canceling or transmission stop may prevent unnecessary occupation of a channel.

When transmission is stopped or delayed due to transmission collision between links, a CW value used in channel access may be doubled as in general transmission failure. When transmission is stopped or delayed due to transmission collision between links, a CW value used in channel access may not be doubled unlike general transmission failure or transmission failure. That is, a station may maintain a CW value used in channel access without change. Doubling a CW value is to large the range of a number available as a backoff counter value and thus reduce a probability of transmission collision. If a station is able to explicitly recognize a transmission collision as having occurred between links, the need for doubling may be small. Furthermore, if transmission is stopped or delayed due to transmission collision between links, doubling a CW value by a station may delay transmission. However, in a case where transmission collision between links and collision in a link occur simultaneously, a station is required to double a CW value. This will be explained with reference to FIG. 19.

FIG. 19 shows an STR multi-link device processing a CW value when recognizing transmission collision between links according to an embodiment of the present invention.

If a station cancels transmission due to transmission performed in a non-STR multi-link device as in embodiments described above, the station may sense a channel state after canceling the transmission. If a channel is sensed as not being idle, the station may double a CW value. The doubling may follow an embodiment described with reference to FIG. 6. In addition, if the channel is sensed as being idle, the station may maintain the CW value. This embodiment is for handling differently from a case of transmission success because there is a low possibility that transmission collision occurs in a link, even when a channel is sensed as being idle. Specifically, when an AP of an AP multi-link device fails in transmission to a station of a non-STR multi-link device, the AP of the AP multi-link device may obtain a backoff counter in a CW without increasing the CW. If an AP multi-link device fails in transmission to a first station of a non-STR multi-link device and a second station of the non-STR multi-link device performs transmission, an AP of the AP multi-link device may obtain a backoff counter in a CW without increasing the CW. As described above, the AP multi-link device may determine whether the second station of the non-STR multi-link device performs transmission, based on a transmission station of a PPDU indicated by a signaling field of the PPDU or a station indicated by a TA field of a MAC frame included in the PPDU. In embodiments described above, if EDCA is applied, a procedure relating CW adjustment and backoff counter generation may be performed for AC.

In another specific embodiment, an STR multi-link device may determine whether transmission of a PPDU has failed, based on whether a response for the PPDU has been received. The STR multi-link device may not consider whether a station receiving the PPDU is included in a non-STR multi-link device. For example, even when a first station receiving the PPDU is included in a non-STR multi-link device and the first station is unable to transmit a response for the PPDU due to transmission performed by a second station of the non-STR multi-link device, the STR multi-link device may determine that the transmission of the PPDU has failed. In addition, when the transmission of a PPDU by the STR multi-link device has failed, the STR multi-link device may increase a CW value to the next largest value among values available as the CW value. If the CW value is a maximum value, the STR multi-link device may maintain the CW value at the same value.

In another specific embodiment, in a case where a channel is sensed as being idle, a station may configure a CW value as a minimum value (CW_min) of the CW of traffic. This embodiment is for handling identically to a case of transmission success because there is a low possibility that a transmission collision occurs in a link, when a channel is sensed as being idle. The station may apply embodiments described above to the CW of the AC of traffic included in the canceled transmission.

In addition, in a case where a station cancels transmission according to embodiments described above, the station may not increase a retry counter. The retry counter may include at least one of a long retry counter and a short try counter.

Canceling transmission in the above embodiments may include at least one of stopping the transmission and delaying the transmission before starting same.

Before attempting transmission, if a station transmits a CTS-to-self frame and then cancels the transmission, the station may not start exchanging an RTS/CTS frame before attempting the transmission after canceling the transmission. This is because a NAV has already been configured through the CTS-to-self frame. In addition, when a station cancels transmission and then attempts transmission again, if a TXOP is remaining, the station may attempt the transmission without a backoff procedure.

In FIG. 19, an STR AP multi-link device includes a first AP (AP 1) operating in a first link (link 1) and a second AP (AP 2) operating in a second link (link 2). A non-STR non-AP multi-link device includes a first station (STA 1) operating in the first link (link 1) and a second station (STA 2) operating in the second link (link 2). The second station (STA 2) is performing transmission to the second AP (AP 2). The first AP (AP 1) determines that the first station (STA 1) is in a blind state, while performing transmission to the first station (STA 1). Therefore, the first AP (AP 1) stops transmitting to the first station (STA 1). In FIG. 19(a), the first AP (AP 1) determines that a channel of the first link (link 1) is idle. A TXOP is not remaining, and thus the first AP (AP 1) accesses the channel through a backoff procedure. In FIG. 19(b), the first AP (AP 1) determines that a channel of the first link (link 1) is not idle. A TXOP is remaining, and thus the first AP (AP 1) attempts transmission without a backoff procedure.

<Transmission Method of MLD Considering NSTR Link Pair>

An embodiment described above provides an operation limitation method of an MLD considering that transmission or reception performed by an STA configuring an MLD supporting NSTR affects (e.g., interferes with) PPDU transmission or reception and/or channel access of another STA of the same MLD. Hereinafter, embodiments of the present invention described below provides a channel access management method of each STA of an MLD when the operation limitation method of an MLD supporting NSTR is applied.

<Transmission Management Method of AP>

In a case where a particular AP among at least one AP configuring an AP MLD completes a channel access for a particular AC and thus obtains a right to initiate transmission of traffic for the particular AC, the particular AP may not transmit a frame stored in a transmission queue for the particular AC.

In this case, even though the particular AP has obtained the transmission initiation right for the particular AC, the particular AP may recognize that the frame in the transmission queue of the particular AC is required to be transmitted to a STA in a blind state, and determine not to start transmission. The particular AP may recognize that the frame in the transmission queue of the particular AC is required to be transmitted to a STA of an EMLSR/EMLMR mode MLD having a performance restriction similar to that as BLIND, and determine not to start transmission. (Hereinafter, a description for the EMLSR/EMLMR mode MLD is omitted)

More specifically, in a case where a frame in a transmission queue of an AC for which the transmission initiation right is obtained is a frame required to be transmitted to an STA of an NSTR MLD in a blind state (i.e., another STA operated in an NSTR link pair of the NSTR MLD is performing transmission), even if the frame is transmitted, the STA of the NSTR MLD is unable to receive the frame. Therefore, the AP may determine not to perform the transmission of the frame. If the transmission queue of the AC for which the transmission initiation right is obtained includes a frame to be transmitted to another STA not being in a blind state, the AP may transmit the frame in the transmission queue of the AC to the other STA.

If the AP has determined not to initiate transmission for the AC for which the transmission initiation right is obtained, the AP may perform/call a new backoff procedure for the AC. In performing a new backoff procedure for the AC, the AP may generate a new backoff counter while maintaining a contention window (CW). That is, a CW[AC] and a QSRC[AC] (QoS STA short retry counter) are not changed and a backoff counter is generated again, so that a new backoff procedure for the AC for which the transmission initiation right has been obtained may be performed.

Meanwhile, if the transmission queue of the AC for which the transmission initiation right is obtained includes a frame required to be transmitted to an STA in a blind state, the AP may consider the frame as not existing in the transmission queue. For example, if the transmission queue includes only a frame required to be transmitted to an STA in a blind state, the AP may, by considering the transmission queue as including no frame, maintain, at 0, a backoff counter (BO) of the AC for which the transmission initiation right is obtained, and determine (operate) not to start transmission. In this case, when the blind state of the STA is released, the AP may consider a frame required to be transmitted to the STA, as being generated in the transmission queue, and immediately start transmission. The meaning of "immediately" described above may indicate transmission performed without a separate backoff procedure according to an EDCA rule. That is, when the blind state of the STA is released, if a medium is determined (considered) as having been idle for a pre-configured time (e.g., DIFS, SIFS, PIFS, AIFSN[AC], etc.) before the release of the blind state, the AP may initiate transmission to the STA at the next slot boundary.

In addition, in a case where an AP of an MLD has not received a response for a trigger frame (e.g., a frame allowing response of TB PPDU or CTS) having been transmitted by thereby, that is, even in a case where transmission of the transmitted trigger frame has failed, the AP may not retransmit the transmitted trigger frame. In addition, even when an ACK has not been received after transmitting a frame requesting an Ack (Ack frame and block Ack frame) response, the AP may not retransmit the frame.

In general, an AP of an AP MLD and STAs (AP STAs or non-AP STAs) and are required to retransmit a failed frame when the transmission of the frame transmitted thereby is considered as having failed. However, when an AP of an AP MLD determines that the reason of failure of a frame transmitted thereby to an STA of an MLD is an operation of another STA in an NSTR relation with the STA, the AP may not retransmit the failed frame. This is because, even if the AP retransmits a failed frame, when an operation of another STA in an NSTR relation with a reception STA (destination device or intended reception device (recipient)) is not changed, it is considered that a response for the retransmitted frame will not be performed by the reception STA.

In a case where it is determined that transmission has failed due to an operation of another STA in an NSTR relation with the reception STA, when a backoff procedure is performed to transmit another frame having the same access category (AC) as the failed frame, the AP may generate a new backoff counter while maintaining a CW[AC]. In other words, an STA (AP and non-AP STA) having performed failed transmission due to an operation of another STA in an NSTR relation with the reception STA may not increase a CW[AC] due to the failed transmission and generate a new backoff counter when performing a next backoff procedure. The STA having performed the failed transmission may not change a QSRC[AC] as well as the CW[AC].

If an STA (AP STA and non-AP STA) of an MLD transmits a frame to a reception STA through a particular link and then receives (as a response) an Ack for the frame via an STA (of the same MLD as that of the reception STA) of another link rather than receiving an Ack response through the particular link, the STA of the MLD may configure a CW[AC] and a QSRC[AC] as CW_min and 0, respectively. That is, even if an STA of an MLD has failed to receive a direct Ack response from a reception STA after transmitting a frame to the reception STA, when an Ack response has been performed (received from) by another STA of the same MLD as that of the reception STA, the STA of the MLD may consider (determine) the transmission of the frame as having been successful. Even when an Ack is received as a response from another STA of the same MLD as that of the reception STA, the STA of the MLD may not change a CW[AC] and a QSRC[AC] and maintain same as they are. That is, even though an Ack for a frame transmitted by the STA of the MLD is not received as a response from the reception STA, when a response for the frame is received from another STA of the same MLD as that of the reception STA, the STA of the MLD may consider the transmission of the frame as having not failed.

That is, even when a frame transmitted by an AP of an AP MLD has failed, if a destination device is an STA of an MLD and it is determined that the STA has not responded due to an operation state of another STA operated in an NSTR link pair, the AP of the AP MLD may not perform retransmission to the STA. The AP of the AP MLD may retransmit the failed frame when recognizing the operation state of the other STA operated in the NSTR link pair of the STA has been changed. The reason why the STA has not responded due to the operation state of the other STA may be that the STA has become blind due to a transmission operation of the other STA and thus has not responded/has failed to respond, or the STA has not respond in order to protect a reception operation of the other STA.

<Transmission Management Method of STA>

When a particular STA of a non-AP MLD has completed a channel access procedure for a particular AC, that is, when the particular STA has obtained a transmission right enabling to initiate transmitting traffic of the particular AC, the particular STA may not transmit a frame in a transmission queue for the particular AC.

Although the particular STA has obtained a transmission initiation right for the particular AC, the particular STA may determine not to start transmission by considering an operation of an STA operated in another link (i.e., NSTR link pair) in an NSTR relation with a link in which the particular STA is operated.

When providing a more detailed description, although the particular STA has obtained a transmission initiation right for the particular AC, the particular STA may determine not to transmit a frame in the transmission queue of the particular AC by considering that the other STA is performing a PPDU reception operation. That is, in a case where the non-AP MLD is an NSTR MLD, the STA operated in the NSTR link pair may abandon the obtained transmission initiation right by considering an operation state of another STA of the NSTR link pair. The meaning of giving up the obtained transmission initiation right may indicate not attempting transmission and performing (calling) a backoff procedure again, or maintaining a backoff counter at 0 and deferring (delaying) transmission.

If the STA has determined not to initiate transmission for the AC for which the transmission initiation right is obtained, the STA may perform/call a new backoff procedure for the AC. In performing a new backoff procedure for the AC, the STA may generate a new backoff counter while maintaining a contention window (CW). That is, a CW[AC] and a QSRC[AC] (QoS STA short retry counter) are not changed and a backoff counter is generated again, so that a new backoff procedure for the AC for which the transmission initiation right has been obtained may be performed.

Meanwhile, the STA may not perform a new backoff procedure and maintain a BO at 0 and, in order to perform this, may consider the transmission queue of the STA as including no frame, when another STA of the NSTR link pair is performing reception. For example, an STA operated in an NSTR link pair may, when another STA operated in the NSTR link pair is receiving a PPDU, consider the transmission queue of the STA as including no frame, to maintain, at 0, a backoff counter (BO) of an AC for which a transmission initiation right is obtained, and determine (operate) not to start transmission.

In this case, when the PPDU reception of the other STA is completed, the STA may consider a frame as being generated in the transmission queue again, and immediately start transmission. The meaning of "immediately" described above may indicate transmission performed without a separate backoff procedure according to an EDCA rule. That is, when the PPDU reception of the other STA is completed, if a medium is determined (considered) as having been idle for a pre-configured time (e.g., DIFS, SIFS, PIFS, AIFSN[AC], etc.) before the completion of the PPDU reception, the STA may initiate transmission at the next slot boundary.

The time point at which the other STA has completed the PPDU reception may be a time point at which PHY-RX-END.indication primitive related to a PPDU including an MPDU, the destination device of which is the other STA, has occurred. Alternatively, the time point at which the other STA has completed the PPDU reception may be a time point at which PHY-TXSTART.request primitive related to an Ack frame (a PPDU including the Ack frame) that is a response for a PPDU including an MPDU, the destination device of which is the other STA, has occurred. Alternatively, the time point at which the other STA has completed the PPDU reception may be a time point at which PHY-TXEND.confirm primitive related to an Ack frame (a PPDU including the Ack frame) that is a response for a PPDU including an MPDU, the destination device of which is the other STA, has occurred. Alternatively, the time point at which the other STA has completed the PPDU reception may be a time point at which a TXOP corresponding to a PPDU including an MPDU, the destination device of which is the other STA, is terminated. The termination time point of the TXOP may indicate a time point at which a NAV corresponding to the TXOP is released.

<Transmission Management Limitation of STA>

According to an embodiment of the present invention described above, an STA of a non-AP MLD may, when another STA of an NSTR link pair is receiving a PPDU, consider a transmission queue as including no frame to maintain a backoff counter (BO) at 0, and when the PPDU reception of the other STA is completed, may immediately start transmission without a new backoff procedure.

As described above, the reason why an STA of a non-AP MLD performs transmission management considering an operation state of another STA in the present invention may be understood to minimize negative effects (interference, channel access delay, etc.) which may occur due to the restriction of a NSTR link pair, and maximally ensure the channel access capability of each STA.

However, in the process of maximally ensuring the channel access capability of each STA of a non-AP MLD, a probability of transmission collision between STAs of different non-AP MLDs may be increased. For example, as considered in an embodiment of the present invention, when a particular STA of a particular non-AP MLD maintains a backoff counter at 0 and then initiates transmission, a transmission collision with a different STA of another non-AP MLD maintaining a backoff counter at 0 may occur.

This may be caused when the particular STA and the different STA maintain the backoff counters at 0 due to a reception operation of the same PPDU. More specifically, in a case where an AP transmits a MU PPDU through a particular link, multiple non-AP MLDs receiving the MU PPDU may maintain, at 0, the backoff counters of STAs operated in another link that is an NSTR link pair with the particular link, and the multiple non-AP MLD having completed the reception of the MU PPDU may initiate transmission through STAs of the other link.

That is, as considered in an embodiment of the present invention, STAs of non-AP MLDs maintaining the backoff counters at 0 and then initiating transmission may be required to start a channel access procedure by considering that there is a possibility that an STA of another non-AP MLD may simultaneously start transmission. To this end, an STA of a non-AP MLD may identify whether a PPDU being received by another STA of an NSTR link pair is a PPDU required to be received by multiple STAs, so as to manage a channel access procedure. More specifically, an STA of a non-AP MLD may determine to maintain the backoff counter at 0, only when a PPDU being received by another STA of an NSTR link pair is a PPDU having only the other STA as a destination device (intended recipient). That is, an STA of a non-AP MLD may consider the STA's transmission queue (of a particular AC) thereof as including no frame, only when a PPDU being received by another STA of an NSTR link pair is a PPDU having only the other STA as a destination device. In other words, an STA of a non-AP MLD is unable to consider the transmission queue thereof as including no frame, when a PPDU being received by another STA of an NSTR link pair is a PPDU having multiple STAs as destination devices. Then, when the backoff counter becomes 0, the STA of the non-AP MLD is required to perform a new backoff procedure.

A method of identifying, by the STA of the non-AP MLD, whether a PPDU being received by another STA of an NSTR link pair is a PPDU having only the other STA as a destination device may be at least one of the following methods.

1. The PPDU being received is an EHT MU PPDU and includes only one user field, and an STA-ID of the user field is configured as a value indicating the other STA.

2. An RA of the PPDU being received is an individual address (as synonyms, direct address and unicast address), and the individual address is an individual (MAC) address assigned to the other STA. The individual address may indicate a MAC address, the group bit of which is 0 among MAC addresses.

3. An address 1 field of a MAC frame included in the PPDU being received is configured as an individual address assigned to the other STA.

4. A MAC frame included in the PPDU being received is a frame individually addressed to the other STA.

5. A destination address (DA) of an MSDU included in the PPDU being received is a MAC address of the other STA.

6. An address 1 field of an MPDU included in the PPDU being received is a MAC address of the other STA.

That is, an STA of a non-AP MLD may perform an operation of maintaining the backoff counter at 0, only when a PPDU being received by another STA of an NSTR link pair is a PPDU individually transmitted to the other STA. The STA of the non-AP MLD may maintain the backoff counter at 0 by considering a transmission queue as being in an empty state although there is a frame in the transmission queue.

However, when the other STA is implicitly or explicitly indicated by an AP, the STA of the non-AP MLD may maintain the backoff counter at 0.

For example, when the PPDU being received by the other STA is an EHT MU PPDU and the other STA is indicated (information related to the STA_ID of the other STA is indicated) in the first user field among user fields included in the EHT MU PPDU, this may be interpreted such that the other STA has been implicitly indicated by an AP. In this case, even though the other STA is receiving an EHT MU PPDU, the STA of the non-AP MLD may perform an operation of maintaining the backoff counter at 0. Then, when the other STA is indicated in the first user field among user fields included in an HT MU PPDU, this may be interpreted such that an implicit indication as described above has been performed.

As another example, when the value of a particular subfield in a user field indicating information related to the STA-ID of the other STA is indicated as 1, this may be interpreted such that the other STA has been explicitly indicated by an AP. In this case, even though the other STA is receiving an EHT MU PPDU, the STA of the non-AP MLD may perform an operation of maintaining the backoff counter at 0.

On the contrary, in a case where a PPDU being received by another STA in an NSTR link pair is not a PPDU having the other STA as a destination device or is a PPDU having multiple STAs including the other STA as destination devices, when the backoff counter becomes 0, a STA of a non-AP MLD may be required to perform (call) a new backoff counter while maintaining a CW[AC] and a QSRC [AC]. That is, in this case, the STA of the non-AP MLD is unable to maintain the backoff counter at 0.

That is, in a case where the PPDU being received by the other STA of the NSTR link pair is not a PPDU having only the other STA as a destination device, the PPDU being received is not a PPDU having the other STA as a destination device, or the format and/or the destination device of the PPDU being received has not been identified, when the backoff counter becomes 0, the STA of the non-AP MLD may be required to generate a new backoff counter. That is, in a situation corresponding to at least one of the following cases, the STA of the non-AP MLD is unable to perform an operation of maintaining the backoff counter at 0, and may be required to generate a new backoff counter.

1. The PPDU being received by the other STA of the NSTR link pair is an EHT MU PPDU including two or more user fields.

2. The PPDU being received by the other STA of the NSTR link pair is an HE MU PPDU.

3. An RA of the PPDU being received by the other STA of the NSTR link pair is a group address. That is, the group bit of a MAC address indicated in a RA field a MAC frame included in the PPDU being received is 1.

4. An address 1 field of a MAC frame included in the PPDU being received by the other STA of the NSTR link pair is not a frame individually addressed to the other STA.

5. A destination address (DA) of an MSDU included in the PPDU being received by the other STA of the NSTR link is not a MAC address of the other STA.

6. An address 1 field of an MPDU included in the PPDU being received by the other STA of the NSTR link is not a MAC address of the other STA.

7. A format of the PPDU being received by the other STA of the NSTR link pair has not been identified.

8. A destination device of the PPDU being received by the other STA of the NSTR link pair has not been identified.

As another method, an STA of a non-AP MLD may perform an operation of maintaining the backoff counter at 0, regardless of the type of a PPDU being received by another STA of an NSTR link pair. However, in a case where a STA of a non-AP MLD maintains the backoff counter at 0 and, when another STA of an NSTR link pair has completed PPDU reception (or after a pre-configured (promised) time has passed from a time point of the completion), initiates transmission, the STA of the non-AP MLD may be required to transmit an RTS frame as the first frame. The limitation of being required to transmit the RTS frame as the first frame may be applied to only a case where a PPDU being received by the other STA is not a PPDU having only the other STA as a destination device. That is, in a case where a PPDU being received by the other STA is not a PPDU having only the other STA as a destination device, the STA of the non-AP MLD may not be obligated to transmit an RTS frame as the first frame.

In other words, an STA having been maintaining the backoff counter at 0 by considering an operation (e.g., PPDU reception) of another STA operated in an NSTR link pair may be required to start first transmission performed to obtain a TXOP by necessarily using an RTS frame. This may be a sequence considered to allow TXOP acquisition attempted while the backoff counter is maintained at 0, to be started through RTX/CTS frame exchange, in consideration that there may be multiple STAs of non-AP MLDs having been maintaining the backoff counter at 0.

Alternatively, when an STA of a non-AP MLD may not reduce the backoff counter when another STA of an NSTR link pair is receiving a PPDU. This may be an operation performed by the STA of the non-AP MLD considering a medium state as being busy (virtual busy), when the other STA is receiving a PPDU. That is, an STA of a non-AP MLD may be required to consider a medium state as being busy, when another STA of an NSTR link pair is receiving a PPDU. The medium busy state may be released when RXEND.indication related to the PPDU occurs.

Figure 20:
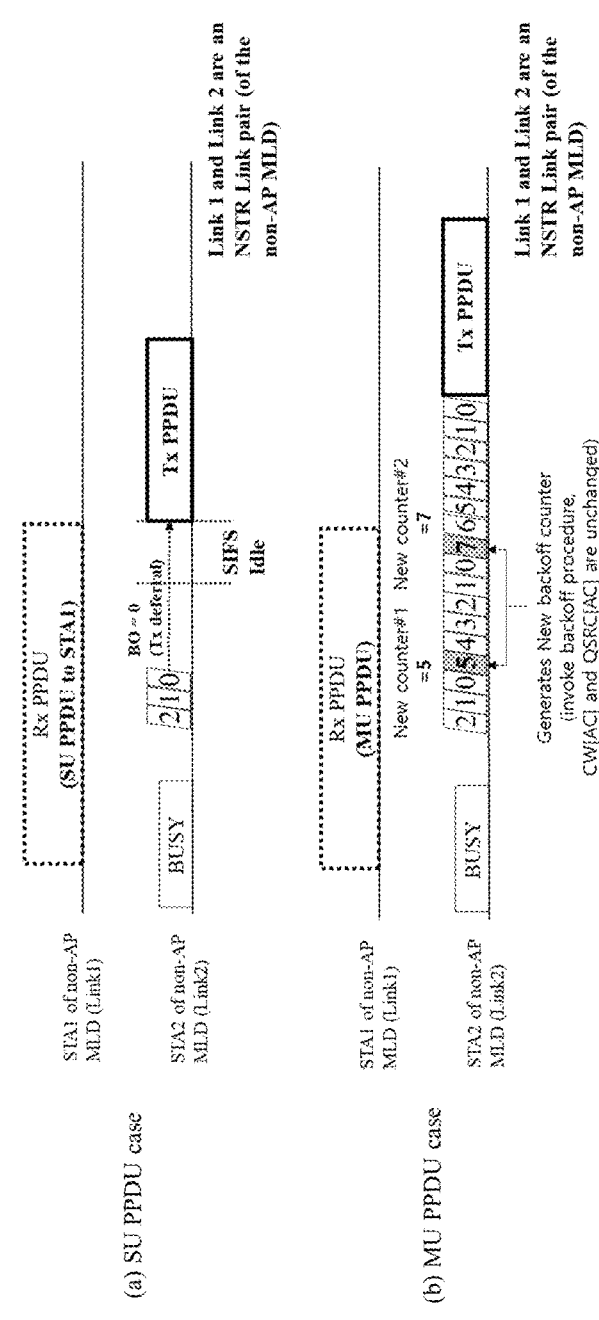
FIG. 20 illustrate an example of a transmission management method of a non-AP multi-link device according to an embodiment of the present invention.

FIG. 20 illustrates an example of a transmission management method of a non-AP multi-link device according to an embodiment of the present invention.

Referring to FIG. 20(a), while a non-AP MLD is receiving a single user (SU) PPDU (when the PPDU is an EHT PPDU, a PPDU being an EHT MU PPDU and including only one user field) in link 1 via STA 1, the backoff counter of STA 2 operated in link 2 by the non-AP MLD has reached 0, and link 1 and link 2 may be an NSTR link pair.

In this case, based on information indicating that a PPDU being received via STA 1 is a PPDU having only STA 1 as a destination device, STA 2 of the non-AP MLD may recognize that there may be no STA of another non-AP MLD deferring transmission while maintaining the backoff counter at 0 to receive the PPDU. Therefore, as illustrated in FIG. 20(a), STA 2 may not start transmission even when the backoff counter has reached 0, and may select deferring the transmission while maintaining the backoff counter at 0.

As described above, when a (SU) PPDU reception procedure of STA 1 is completed while STA 2 is maintaining the backoff counter at 0, STA 2 may initiate transmission without performing a separate backoff procedure. STA 2 may internally operate as if a frame to be transmitted were generated in a transmission queue of an access category (AC) for which a backoff procedure has been completed (the backoff counter is maintained at 0), at a time point at which the PPDU reception procedure of STA 1 is completed. That is, even though a backoff procedure for a particular AC has been completed, STA 2 may consider, when a PPDU reception procedure of STA 1 is in process, as if there were no frame to transmit in a transmission queue of the particular AC and, at a time point at which the PPDU reception procedure of STA 1 is completed, may consider as if a frame to be transmitted were generated in the transmission queue of the particular AC, and initiate PPDU transmission in link 2. However, only in a case where a medium has been maintained at an idle state for a predetermined time or longer (in FIG. 20(*a*), considered as SIFS) at a time point at which PPDU transmission is initiated, STA 2 may start the PPDU transmission.

In addition, when transmission is performed without a separate backoff procedure while a backoff counter is being maintained at 0, a restriction that a medium state (CCA result of link 2) should not have been changed to busy while the backoff counter has been being maintained at 0 may be applied. In other words, STA 2 having been maintaining the backoff counter at 0 while STA 1 is receiving a PPDU may, when it is identified that a medium has been changed to be busy, be required to perform (call) a new backoff procedure after the medium is changed to be idle again.

In addition, STA 2 may also select performing (calling) a new backoff procedure instead of maintaining the backoff counter at 0. In this case, when calling a new backoff procedure, STA 2 calls the new backoff procedure without changing a CW[AC] and a QSRC[AC].

Referring to FIG. 20(*b*), while a non-AP MLD is receiving a multi-user (MU) PPDU in link 1 via STA 1, the backoff counter of STA 2 operated in link 2 by the non-AP MLD has reached 0, and link 1 and link 2 may be an NSTR link pair.

In this case, based on information indicating that a PPDU being received by STA 1 is an MU PPDU (or a group (non-individual) address frame) having not only STA 1 but also other STAs as destination devices, STA 2 of the non-AP MLD may recognize that other non-AP MLDs may also defer transmission to receive the PPDU. Therefore, as illustrated in FIG. 20(*b*), STA 2 may, when the backoff counter has reached 0, determine to perform (call) a backoff procedure again rather than maintaining the backoff counter at 0 or initiating transmission. When calling a new backoff procedure, STA 2 calls the new backoff procedure without changing a CW[AC] and a QSRC[AC].

As illustrated in FIG. 20(*b*), the backoff counter (of a particular AC) of STA 2 has reached 0 twice while STA 1 is receiving a PPDU, and STA 2 has called a new backoff procedure twice. When STA 2 has maintained a CW[AC] and has called a new backoff procedure, a value of 5 has been generated as a first backoff counter (new counter #1 of FIG. 20(*b*)), and in a backoff procedure called again after the backoff counter has reached 0, a value of 7 has been generated as a second backoff counter (new counter #2 of FIG. 20(*b*)). After the second backoff counter reaches 0, STA 1 is not receiving the PPDU anymore, and thus STA 2 initiates PPDU transmission.

FIG. 21 illustrates an example of the contents of a beacon frame transmitted by an AP of an AP MLD, and a target beacon transmission time (TBTT) information field format included in a reduced neighbor report (RNR) element according to an embodiment of the present invention.

Referring to FIG. 21(*a*), a beacon frame may include, in legacy IEs, the same parameters and elements as included in a beacon frame disclosed in conventional 802.11ax of Wi-Fi. For example, the legacy IEs of the beacon frame may include elements, such as a timestamp field, a beacon interval field indicating an interval at which a beacon is transmitted, a TIM, a DSSS parameter set, an IBSS parameter set, country, channel switch announcement, extended channel switch announcement, wide bandwidth channel switch, transmit power envelop, supported operating classes, IBSS DFS, ERP information, HT capabilities, HT operation, VHT capabilities, VHT optical, SIG beacon compatibility, short beacon interval, SIG capabilities, SIG operation, HE capabilities, HE 6 GHz band capabilities, HE operation, BSS color change announcement, and a spatial reuse parameter set.

A method of configuring fields and elements included in the legacy IEs field, and the meaning thereof are the same as the configuration and the meaning of fields and elements with the same names included in a beacon frame disclosed in a conventional standard up to 802.11ax of Wi-Fi.

In addition, the beacon frame may include a reduced neighbor report (RNR) element for indicating information of a neighbor AP. The RNR element may be used to inform a station of information of a neighbor AP, and the station may receive a beacon frame, and recognize the neighbor AP through the RNR element information included in the beacon frame.

Specifically, the RNR element may include an element ID field, a length field, and neighbor AP information fields. The neighbor AP information fields may include a TBTT information header (2-octet), an operation class (1-octet), a channel number (1-octet), and a TBTT information set (variable length) field, respectively. In this case, the RNR element transmitted by an AP included in an AP MLD may include a TBTT information field format, as shown in FIG. 21(*b*), to indicate basic information on another AP included in the same MLD. Unlike a TBTT information field in an RNR element transmitted by an AP in conventional 802.11ax of Wi-Fi, an RNR element transmitted by an AP included in an EHT AP MLD may include an MLD parameters field.

The MLD parameters field may include MLD ID, link ID, and change sequence subfields, as shown in FIG. 21C. In this case, when the AP MLD indicates other AP information on the other AP of the same MLD through a specific neighbor AP information field in an RNR element, an MLD ID subfield included in the specific neighbor AP information field may be configured to 0. That is, an AP may configure an MLD ID subfield to be a particular value, to inform a station that a neighbor AP information field corresponds to an AP included in the same AP MLD, and the station having received the neighbor AP information field may recognize, from the value of the MLD ID subfield, that the AP corresponding to the neighbor AP information field is included in the same MLD as the AP having transmitted the neighbor AP information field.

The link ID subfield may be a subfield that indicates an index determined by an AP MLD, to indicate a link in which the other AP to be indicated through neighbor AP information is operated. The change sequence subfield may be a subfield that is used to indicate information regarding updates (e.g., critical update) related to a link of the other AP. For example, if the value of a change sequence subfield is changed, a station having received same may recognize that a parameter related to a BSS (or link) of a corresponding AP has been updated, and may request the updated parameter from the AP in order to update the parameter. In this case, if the AP MLD is an NSTR AP MLD, i.e., an MLD not supporting simultaneous transmission and reception (e.g., if the AP MLD is an NSTR mobile AP MLD or an NSTR soft AP MLD, i.e., if a mobile terminal operates as a soft AP MLD for tethering), an STA included in an STA MLD may perform a procedure for updating a parameter, only through a primary link. That is, in order to update a parameter of a different link (e.g., non-primary link) for a different neighbor AP rather than the primary link of the AP MLD, the STA may transmit or receive a frame for parameter updating only through the primary link.

Hereinafter, in the present invention, an NSTR AP MLD may be referred to as an NSTR soft AP MLD or an NSTR mobile AP MLD.

In addition, if an AP is an NSTR AP MLD not supporting simultaneous transmission and reception (e.g., if the AP is an NSTR mobile AP MLD or an NSTR soft AP MLD, i.e., if a mobile terminal operates as a soft AP MLD for tethering), the NSTR AP MLD may transmit a beacon frame after including, therein, information indicating that the NSTR AP MLD is an NSTR AP MLD. For example, the NSTR AP MLD may configure the value of a specific subfield included in a beacon frame to be a particular value (e.g., "0" or "1"), and a non-AP STA MLD having received the beacon frame may recognize that the AP MLD having transmitted the beacon frame is an NSTR AP MLD. Therefore, the specific subfield for indicating that an AP MLD is an NSTR AP MLD may be configured to be a value (e.g., "1" or "0") different from the particular value when the specific subfield does not indicate an NSTR AP MLD (e.g., STR AP MLD or other AP MLDs).

The specific subfield for indicating that an AP MLD is an NSTR AP MLD may be indicated together with a capability-related subfield (e.g., MLD level capability) of a beacon frame, or may be included in a neighbor AP information field related to an AP of a non-primary link of the NSTR AP MLD, and then be transmitted. For example, the specific subfield for indicating that an AP MLD is an NSTR AP MLD may be encoded and indicated together with an indicator of a frequency classification type for a STA/AP MLD type (frequency separation for STR/AP MLD type indication), which is a capability-related subfield. That is, the specific subfield may be encoded together with an indicator of a frequency classification type for a STA/AP MLD type, the indicator indicating a distance for supporting STR, and then be indicated through a beacon frame. In this case, if the indicator indicates an AP MLD type, this may indicate that an AP MLD having transmitted the beacon frame is an NSTR AP MLD or is not an NSTR AP MLD, according to a configured value (e.g., if "0" is configured, this may indicate that the AP MLD is not an NSTR AP MLD, and if "1" is configured, this may indicate that the AP MLD is an NSTR AP MLD).

As described above, a method in which a subfield indicating whether an AP MLD is an NSTR AP MLD is utilized may be used as a method of explicitly indicating whether an AP MLD is an NSTR AP MLD.

As another example, an NSTR AP MLD may indicate that the NSTR AP MLD is an NSTR AP MLD in an implicit manner without directly indicating that the NSTR AP MLD is an NSTR AP MLD through a specific subfield. Specifically, an NSTR AP MLD may indicate that the number of links supportable thereby is two, and at the same time, indicate that the NSTR AP MLD has an NSTR link pair, thereby implicitly indicate that same is an NSTR AP MLD. In order to indicate that the number of links supportable thereby is two, the NSTR AP MLD may configure a maximum number of simultaneous links subfield in a beacon frame to be 1 (or a promised value indicating that the number of links is two). In order to indicate that the NSTR AP MLD has an NSTR link pair, the NSTR AP MLD may configure an NSTR link pair present subfield included in a beacon frame to be 1 or 0.

An AP MLD may inform a non-AP STA MLD that the AP MLD is an NSTR AP MLD, in an explicit or implicit manner by transmitting a beacon frame through a method described above. The non-AP STA MLD may implicitly or explicitly recognize, from the received beacon frame, whether the AP MLD having transmitted the beacon frame is an NSTR AP MLD. If the AP MLD having transmitted the beacon frame is an NSTR AP MLD (i.e., if the AP MLD is indicated by the beacon frame as an NSTR AP MLD through an explicit or implicit manner), the non-AP STA MLD may perform a procedure for association or setup with the NSTR AP MLD only over a link on which the beacon frame has been received. That is, the non-AP STA MLD may transmit or receive a frame for association or setup with the NSTR AP MLD through the link (e.g., primary link) on which the beacon frame has been received. For example, transmission or reception of a frame for association or setup with an AP connected through a link other than the primary link included in the NSTR AP MLD may be performed only through the primary link. In this case, a (ML) (re)association request frame transmitted by the non-AP STA MLD may also be transmitted over a link (non-primary link) other than the primary link.

The NSTR AP MLD may not indicate information on an AP of a non-primary link in an RNR element of the beacon frame (transmitted through the primary link) so as to prevent non-AP STA MLDs from attempting a setup procedure through the non-primary link. That is, a beacon frame transmitted by an AP of the NSTR AP MLD may not include/indicate a neighbor AP information field relating to an AP (of the same MLD) of another link. In this case, non-AP STA MLDs are unable to identify information on an AP of a non-primary link after receiving a beacon frame, and thus may not attempt setup for an NSTR AP MLD in the non-primary link. In this case, a non-AP STA MLD having received, from an NSTR AP MLD, a beacon frame not including a neighbor AP information field for an AP of a non-primary link may, based on that the number of simultaneously supported links of an AP having transmitted the beacon frame is two, as described above, and no information on another AP of the same MLD is indicated, implicitly recognize that a counterpart AP is an NSTR AP MLD.

On the other hand, when a normal AP MLD receives an (ML) (re)association request frame from an STA (MLD), the normal AP MLD is required to transmit an (ML) association response frame through a link on which the (ML) (re) association request frame has been received. However, an NSTR AP MLD may be allowed to respond to an (ML) association request frame received through a non-primary link, through a primary Link (i.e., same may be allowed to transmit an (ML) association response frame through the primary link).

This may be allowed because, as described above, an operation of an NSTR AP MLD performing transmission through a non-primary link is somewhat more restricted compared to a general AP. More specifically, an NSTR AP MLD has an operational restriction that if a response for a (ML) association response frame is transmitted through a non-primary link, the NSTR AP MLD is required to start transmission in the primary link together. This may be an operational restriction considered to prevent the AP of the primary link from being a blind state, as considered in other embodiments of the present invention.

Therefore, when an NSTR AP MLD receives an (ML) (re)association request frame through a non-primary link, the NSTR AP MLD may transmit an (ML) (re)association response frame through the primary link, or may transmit an (ML) (re)association response frame through the primary link and the non-primary link simultaneously. In other words, an STA MLD having transmitted an (ML) (re) association request frame through a non-primary link of an NSTR AP MLD may recognize that a response for the request frame transmitted thereby will be received through the primary link, and wait for the receipt of an (ML) (re)association response frame on the primary link.

An RNR element transmitted by an AP through a beacon frame may include a particular TBTT information field including an MLD parameters field. In this case, if an MLD ID of the MLD parameters field is configured to be "0", an STA MLD may recognize that an AP corresponding to a neighbor AP information field including the MLD parameters field is included in an AP MLD including the AP having transmitted the beacon frame. That is, the STA MLD may recognize that the neighbor AP information field indicates information on another AP that is included in the same AP MLD as that of the AP having transmitted the beacon frame. In this case, a method of interpreting/obtaining same by the STA MLD may be identical/similar to an operation performed by conventional STAs after receiving an RNR element.

However, an NSTR soft AP does not transmit a beacon frame in a non-primary link, and thus may be impossible to indicate, through an RNR element, information related to a beacon frame of another AP (AP of non-primary link). More specifically, an NSTR soft AP MLD does not transmit a beacon frame via an AP of a non-primary link, and is not possible to indicate information on a beacon frame when indicating AP basic information of the non-primary link in an RNR element. For example, a non-primary link that does not transmit beacon frames has no information corresponding to TBTT information count, TBTT information length, and neighbor AP TBTT offset subfields that are required to be indicated through the RNR element. Therefore, an NSTR soft AP MLD may need to configure, to be a pre-configured value, a TBTT-related field of a neighbor AP information field corresponding to an AP of a non-primary link, when transmitting an RNR element through an AP of a primary link.

A neighbor AP TBTT offset subfield of a TBTT information field (see FIG. 21(b)) is a subfield indicating information related to the next TBTT of another AP to be indicated. That is, a neighbor AP TBTT offset subfield included in a neighbor AP information field may include information on the next TBTT of an AP corresponding to the neighbor AP information field. For example, if AP 1 transmitting a beacon frame indicates information on AP 2 through an RNR element (through a neighbor AP information field), a neighbor AP TBTT offset subfield corresponding to AP 2 indicates how many TUs (time units, 1024 us) the next TBTT of AP 2 is distanced from the previous TBTT of AP 1. A value indicated by the neighbor AP TBTT offset subfield is a value obtained by rounding down a TBTT offset to the nearest integer. That is, if an AP indicates a value of 10 in a neighbor AP TBTT offset subfield of another AP, the next TBTT of the other AP may have a time interval of TUs more than or equal to 10 TUs and smaller than 11 TUs from the previous TBTT of the AP.

However, when a primary link AP of an NSTR soft AP MLD configures a neighbor AP TBTT Offset subfield (1-octet) corresponding to an AP of a non-primary link, the primary link AP may be required to configure same to be a pre-configured value (e.g., 254 or 255). This may be because an NSTR soft AP does not transmit a beacon frame through a non-primary link and thus is unable to determine a target beacon transmission time (TBTT), which is a scheduled time to transmit the next beacon frame. In other words, a beacon frame transmitted by an NSTR soft AP MLD through a primary link may need to configure a neighbor AP TBTT offset subfield corresponding to an AP of a non-primary link to be 254 and/or 255 through an RNR element. In this case, the neighbor AP TBTT offset subfield corresponding to the non-primary link may be present in a TBTT information field including an MLD parameters field in which an MLD ID subfield is configured to be 0.

Therefore, in a case where a non-AP STA MLD receives a beacon frame of an NSTR soft AP MLD and then identifies a TBTT information field indicated by an MLD ID subfield of 0 and a TBTT offset subfield of 254 and/or 255, in a particular neighbor AP information field of an RNR element included in the beacon frame, the non-AP STA MLD may recognize that the particular neighbor AP information field may be information on an AP (of the NSTR soft AP MLD) operated in a non-primary link of the NSTR soft AP MLD. Similarly, a non-AP STA MLD having received a beacon frame of an NSTR soft AP MLD is not allowed to transmit a probe request frame and an ML probe request frame to the NSTR soft AP MLD through a non-primary link of the NSTR AP MLD, if information on an AP MLD operated in the non-primary link is identified.

In addition, if the non-AP STA MLD recognizes the received beacon frame as a beacon frame transmitted by an MLD and a neighbor AP TBTT offset subfield corresponding to another AP in the same MLD as that of an AP (reporting AP) having transmitted the beacon frame is indicated as 254 and/or 255, the non-AP STA MLD is not allowed to transmit a probe request frame and an ML probe request frame to the other AP.

In addition, if the non-AP STA MLD recognizes the received beacon frame as a beacon frame transmitted by an MLD and a neighbor AP TBTT offset subfield corresponding to another AP in the same MLD as that of an AP (reporting AP) having transmitted the beacon frame is indicated as 254 and/or 255, the non-AP STA MLD is not allowed to transmit a probe request frame and an ML probe request frame to the other AP.

<MLD AP TBTT Offset Indication>

In embodiments of the present invention described above, it is mentioned that a beacon frame transmitted by an NSTR soft AP MLD may indicate a pre-configured value (254 and/or 255) as a neighbor AP TBTT offset subfield corresponding to an AP of a non-primary link. However, the neighbor AP TBTT offset subfield may be indicated by 254 or 255 even if same does not correspond to the AP of the non-primary link of the NSTR soft AP MLD. For example, if another AP identified by an AP transmitting a beacon frame has a TBTT Offset of 254 TUs or more (254 TUs or more than 254 TUs), the AP may indicate 254 as a neighbor AP TBTT offset subfield corresponding to the other AP in the beacon frame. Furthermore, if an AP transmitting a beacon frame is unable to accurately identify a TBTT offset of another AP, the AP may indicate 255 as a neighbor AP TBTT offset subfield corresponding to the other AP.

However, an AP of an MLD is able to always recognize the TBTT offsets of other APs in the MLD, and thus is not allowed to indicate (configure) a value of 255 when indicating (configuring) a neighbor AP TBTT offset subfield corresponding to another AP (of the same MLD) through an RNR element.

Specifically, a neighbor AP information field included in an RNR element of a beacon frame may include a neighbor AP TBTT offset subfield that indicates an offset between times at which the beacon frame is transmitted. The neighbor AP TBTT offset subfield indicates an offset value between a time point at which a beacon frame is transmitted and a time point at which a next beacon frame is transmitted by an AP corresponding to the neighbor AP TBTT offset subfield among multiple APs included in an AP MLD (NSTR or STR AP MLD). In this case, the neighbor AP TBTT offset subfield is unable to be configured as a particular value under a particular condition.

For example, in a case where an AP is included in the same AP MLD as an AP having transmitted a beacon frame, a neighbor AP TBTT offset subfield is unable to be configured to be a particular value (e.g., "255"). The size of the neighbor AP TBTT offset subfield may be 8 bits, and in this case, the neighbor AP TBTT offset subfield is unable to be configured to be a largest value indicatable by the neighbor AP TBTT offset subfield (when the size is 8 bits, the values of the subfield correspond to 0 to 255, respectively, and thus the maximum value of the offset indicatable by 8 bits may be 255). However, in a case where an AP is not included in the same AP MLD as an AP having transmitted a beacon frame (e.g., the AP is a legacy AP), a neighbor AP TBTT offset subfield may be configured to be a particular value (e.g., "255").

In a similar embodiment, a value configured as a neighbor AP TBTT offset subfield may be interpreted differently according to a particular condition.

For example, if a neighbor AP TBTT offset subfield is configured to be a particular value (e.g., if the same is configured to be "254"), the configured value may be differently interpreted as "254" or more than "254" according to a particular condition.

Specifically, if an AP corresponding to a neighbor AP information field including a neighbor AP TBTT offset subfield is included in an AP MLD identical to or different from that of an AP having transmitted a beacon frame, and the neighbor AP TBTT Offset subfield is configured to be a particular value (e.g., "254"), a station may interpret a value indicated by the neighbor AP TBTT offset subfield as 254 TUs. However, if the AP is not included in the AP MLD identical to or different from that of the AP having transmitted the beacon frame (e.g., the AP is a legacy AP or an AP not included in an MLD), and the neighbor AP TBTT Offset subfield is configured to be a particular value (e.g., "254"), the station may interpret a value indicated by the neighbor AP TBTT offset subfield as 254 TUs or more TUs.

In general, a reason why a conventional AP transmits TBTT offset information along with basic information on neighbor APs through a beacon frame may be to help STAs receiving the beacon frame to quickly obtain basic information on other APs and to use the identified TBTT offset information to more efficiently receive beacon frames of the other APs.

However, a neighbor AP TBTT offset subfield in a conventional beacon frame is configured by 1 octet and is designed to be capable of indicating only TBTT offsets corresponding to a maximum of 254 TUs. This design may be a neighbor AP TBTT offset subfield design that is a compromise between beacon frame overhead and indicatable information by excluding information support for an TBTT offset equal to or larger than 254 TUs, in consideration of a maximum TBTT offset available for other APs ((2^16) or (2^16)−1 TUs based on a configurable beacon interval).

However, when an AP MLD indicates information on another AP in the MLD through a beacon frame, the AP MLD may include an additional MLD AP TBTT offset subfield in the beacon frame and transmit same so as to more accurately indicate the TBTT offset of the other AP. The MLD AP TBTT offset subfield may be included in a TBTT information field corresponding to the other AP present in the same MLD when the AP MLD transmits the beacon frame. In this case, if a neighbor AP TBTT offset subfield and an MLD AP TBTT offset subfield are indicated together in a particular TBTT information field, the neighbor AP TBTT offset subfield may be indicated by a pre-configured value (which may be 254 or 255). The MLD AP TBTT offset subfield is a subfield with a 2-octet size, and may be utilized to indicate a TBTT offset value when a TBTT offset between an AP (reporting AP) having transmitted a beacon frame and another AP (reported AP) of the same MLD (Reported AP) exceeds 254 TUs. More specifically, the MLD AP TBTT offset subfield may be included in the TBTT information field only when an AP MLD transmits a beacon frame and the existing neighbor AP TBTT offset subfield is unable to indicate an accurate TBTT offset because the TBTT offset of another AP within the same MLD exceeds 254 TUs.

If an STA MLD identifies a TBTT information field including an MLD AP TBTT offset subfield in an RNR element included in a beacon frame received from a particular AP, the STA MLD may identify the TBTT offset of an AP corresponding to the TBTT information field, based on a value indicated by the MLD AP TBTT offset subfield. In order to identify whether TBTT information fields included in the beacon frame include the MLD AP TBTT offset subfield, an STA may identify same, based on a value of a TBTT information length subfield (present in a TBTT information header (sub)field of each neighbor AP information field) corresponding to each TBTT information field. That is, if the STA recognizes, based on the value of a TBTT information length subfield, that a TBTT information field includes the MLD AP TBTT offset subfield, the STA may identify the TBTT offset of an AP corresponding to the TBTT information field, based on a value indicated by the MLD AP TBTT offset subfield. In this case, if a value of 0 or a pre-configured value (or a value of 254 or less) is indicated through an MLD AP TBTT offset subfield of a particular TBTT information field, the STA MLD may identify the TBTT offset of an AP corresponding to the particular TBTT information field, based on the value of a neighbor AP TBTT offset subfield.

FIG. 22 illustrates another example of a TBTT information field format according to an embodiment of the present invention.

Referring to FIG. 22, a TBTT information field may have a configuration including an MLD AP TBTT offset subfield. The MLD AP TBTT offset subfield may be included only in a beacon frame transmitted by an AP in an AP MLD. In addition, the MLD AP TBTT offset subfield may be included in only a TBTT information field corresponding to another AP in the same MLD as an AP transmitting a beacon frame.

For example, a beacon frame transmitted by a particular AP in an AP MLD may use a TBTT information field corresponding to another AP in the same MLD in a format including includes an MLD AP TBTT Offset subfield, so as to indicate that the TBTT offset of the other AP is 300 TUs. A neighbor AP TBTT offset subfield of the TBTT information field corresponding to the other AP is indicated by 254 or 255, and the MLD AP TBTT offset subfield may be indicated by a value (e.g., 300 or 299, or (300-254)) corresponding to 300 TUs. The MLD AP TBTT offset subfield described above is a subfield name for an example, and a subfield having the same purpose may be defined with a different name.

FIG. 23 illustrates an example of a TBTT information length subfield indicating a TBTT information field including an MLD AP TBTT offset subfield according to an embodiment of the present invention.

Referring to FIG. 23, the type of contents included in a TBTT information field may be indicated according to a TBTT information length subfield. A TBTT information length subfield may be a subfield included in a TBTT information header field existing in each of neighbor AP information fields included in an RNR element. That is, an RNR element transmitted through a beacon frame may include multiple neighbor AP information fields, and a TBTT information field included in each neighbor AP information field may have a structure including a different amount and type of contents. The TBTT information field included in each neighbor AP information field may include a different amount and type of contents, and thus information regarding the contents (and format) indicated through each TBTT information field is indicated through the TBTT information header field.

That is, an STA may parse each neighbor AP information field in an RNR element of a beacon frame via an AP, based on information indicated in a TBTT information header. Each parsed neighbor AP information field may indicate information on a neighbor AP or another AP in the same MLD. If the value of a TBTT information length subfield included in a TBTT information header field implies a content configuration including an MLD AP TBTT offset subfield, as shown in FIG. 23, the STA may identify the TBTT offset of an AP corresponding to a corresponding TBTT information field, based on a value indicated by the MLD AP TBTT offset subfield.

<Non-Primary Link Setup and Management>

As mentioned above, an NSTR AP MLD is unable to transmit a beacon frame, a probe response frame, and a multi-link (ML) probe response frame through a non-primary link. Therefore, an STA MLD that is to be connected to an NSTR AP MLD is required to transmit an (ML) probe request frame only through a link over which the NSTR AP MLD has transmitted a beacon frame.

An ML probe request frame transmitted by an STA of an EHT non-AP STA MLD may have a configuration including EHT capability information and a multi-Link element, in addition to information included in a probe request frame transmitted by a conventional HE STA. In this case, a multi-link element included in an ML probe request frame may function to allow an MLD transmitting the ML probe request frame to request additional information on an AP of another link from an AP MLD.

For example, when transmitting an ML probe request frame, a non-AP STA MLD may request, through a multi-link element of the ML probe request frame, an AP MLD to additionally respond with complete or partial information on an AP of another link. That is, the non-AP MLD may request an AP MLD to make an AP receiving an ML probe request frame, transmit all or part of parameters related to a link of another AP included in the same AP MLD.

For example, if all or part of parameters related to an AP connected to a non-primary link are updated, a station included in the non-AP STA MLD may request an AP connected to a primary link to transmit all or part of the parameters updated in relation to another AP of the non-primary link.

The meaning of the requesting/responding with the complete information may be requesting/responding with information relating to the AP (reported AP) of the other AP and having the same level as that for the AP (reporting AP) responding with an ML probe response frame. The meaning of the requesting/responding with the partial information may be responding with information on the AP of the other link in relation to only information requested by an STA.

If additional information on an AP of another link is requested in an ML probe request frame received over a particular link, an AP MLD having transmitted a beacon frame may respond with an ML probe response frame including not only information on an AP of the particular link, but also the requested additional information on the AP of the other link.

In this case, if an STA MLD requests complete information on an AP of another link while transmitting an ML probe request frame in a particular link, an AP MLD may be required to provide, through an ML probe response frame transmitted as a response in the particular link, information on the AP on the other link at the same level as that of the information on an AP on the particular link. In other words, an STA MLD having received complete information on an AP of another link through a particular link may obtain information on the AP of the other link having the same level as that obtained when the STA MLD directly receives a ML probe response from the AP of the other link.

In this case, if an STA MLD requests partial information on an AP of another link while transmitting an ML probe request frame in a particular link, an AP MLD may be required to provide, through an ML probe response frame transmitted as a response in the particular link, only request information (information of requested elements) of information on the AP on the other link. In other words, an STA MLD having received partial information on an AP of another link through a particular link may additionally obtain only information requested thereby and relating to the AP of the other link. In this case, an STA MLD requesting partial information on an AP of another link may transmit an ML probe request frame including a link ID corresponding to the other link and information indicating information to be additionally obtained (which may be indicated by a requested element IDs field). Thus, if an ML probe request frame received through a particular link includes information (the requested element IDs field) indicating information on another link, the AP MLD may additionally indicate the information indicated for the other link through an ML probe response frame.

In this case, when transmitting an ML probe request frame through a particular link, an STA MLD may configure, to be 0 or 1, a complete profile subfield (of a per-STA control field included in a multi-Link element) corresponding to another link so as to indicate whether complete or partial information on the other link is requested.

In this case, pieces of additional information (complete information and partial information) on the other AP may be transmitted through a per-STA profile included in a multi-link element of an ML probe response frame. The per-STA profile is a field included in a multi-link element and the number thereof is equal to or greater than 0, and may include information of another STA (AP and non-AP STA) existing in the same MLD as that of an STA (AP and non-AP STA) transmitting a frame including the multi-link element. In this case, a per-STA profile has a configuration including a complete profile subfield, and complete information of another STA (AP and non-AP STAs) corresponding to a per-STA profile with a complete profile subfield indicated by 1 (the complete information is information having the same level as that of an STA (AP and non-AP) transmitting a frame including a multi-link element) may be obtained through the per-STA profile. However, parameters/elements implying the same information as that of the STA (AP and non-AP) having transmitted the per-STA profile may be omitted by an inheritance rule. The inheritance rule may mean that, in order to prevent repeated indications of the same parameter and element, if a parameter and an element are not indicated, the values of the same parameter and element having already been indicated (indicated for the other STA (AP and non-AP)) are inherited and used. That is, if the value of parameter 1 is indicated for STA 1 and the value of parameter 1 is not indicated for STA 2, the value of parameter 1 for STA 2 may be interpreted by the inheritance rule as being the same as the value of parameter 1 for STA 1.

In this case, a per-STA profile subelement included in a multi-link element transmitted by an NSTR AP MLD may have a configuration not including a beacon interval subfield for indicating an interval at which beacons are transmitted. That is, the NSTR AP MLD may need to configure a beacon interval present subfield to be 0 when indicating a per-STA profile subelement corresponding to an AP of a non-primary link in the multi-link element. This may be because the AP operated on the non-primary link of the NSTR AP MLD does not transmit beacon frames and thus there is no period for beacon frames. That is, a per-STA profile subelement (of a probe response and association response frame) corresponding to the AP of the non-primary link of the NSTR AP MLD may have a beacon interval present subfield indicated by 0 even if a complete profile subfield (of a per-STA control field) is indicated by 1. That is, beacon interval information on an AP of a non-primary link does not exist even when complete information is indicated.

Similarly, DTIM information (DTIM count and DTIM period information) on an AP of a non-primary link may not be present even when complete information is indicated. That is, a per-STA profile corresponding to the AP of the non-primary link of the NSTR AP MLD may have a DTIM information present (DTIM info present) subfield indicated by 0 even if a complete profile subfield (of a per-STA control field) is indicated by 1

That is, because no beacons are transmitted through a non-primary link, even if a non-AP STA MLD requests all information (or all updated information) on another AP of the non-primary link via an AP of a primary link of an AP MLD (i.e., if complete information is configured to be "1"), an ML probe response frame may not include beacon interval and DTIM information on the AP of the non-primary link. That is, a per-STA profile subelement for the AP of the non-primary link included in the ML probe response frame may not include beacon interval and DTIM information.

In this case, although all information (or all updated information) on the other AP on the non-primary link has been requested, the AP MLD may not include beacon interval and DTIM information for the AP of the non-primary link in the ML probe response frame. Therefore, the AP MLD may perform transmission after configuring a beacon interval present subfield and a DTIM information present subfield to have a value (e.g., "0") indicating that each field is not included.

An NSTR AP MLD does not transmit a beacon frame in a non-primary link, and thus may not indicate DTIM information and beacon interval information when indicating information on an AP on the non-primary link. That is, an NSTR AP MLD may need to always indicate 0 as a DTIM information present subfield of a per-STA profile (more precisely, an STA control field) corresponding to an AP on a non-primary link. That is, an NSTR AP MLD may need to always indicate 0 as a beacon interval present subfield in a per-STA profile corresponding to an AP on a non-primary link. Therefore, even if an NSTR AP MLD receives an ML probe request frame requesting complete information from a non-AP STA MLD or receives an (ML) (re)association request frame, the NSTR AP MLD may be required to always 0 as a beacon interval present subfield and a DTIM information present subfield of a per-STA profile corresponding to an AP of a non-primary link.

Alternatively, since no beacon frames are transmitted in a non-primary link, an NSTR AP MLD may need to configure promised values as beacon interval, DTIM count, and DTIM interval subfields in a per-STA profile corresponding to an AP of the non-primary link. This operation may be considered to maintain the same per-STA profile configuration as that of a typical AP MLD (e.g., STR AP MLD) when an NSTR AP MLD transmits (responds with) complete information on an AP on a non-Primary link. That is, an STA MLD may request complete information on a particular link from an AP MLD by using an ML probe request frame and the like, and then expect complete information on an AP of the particular link to be transmitted as a response in a response frame transmitted as a response. In this case, if complete information responded with by an NSTR AP MLD has a per-STA profile configuration different from that of complete information responded with by an STR AP MLD, the implementation complexity of a process of obtaining information through a per-STA profile by the STA MLD may increase. Therefore, although an AP of a non-primary link does not transmit beacon frames, an NSTR AP MLD may, when responding with complete information of the non-primary link, use a per-STA profile having the same configuration as that of a per-STA profile used by a general AP MLD when responding with complete information. The per-STA profile corresponding to the non-Primary link AP of the NSTR AP MLD may have a beacon interval subfield, a DTIM count subfield, and a DTIM interval subfield, each of which are configured to have a pre-configured value. For example, an NSTR AP MLD may, when transmitting complete information on an AP of a non-primary link, configure each bit of a beacon interval subfield of the non-primary link to 0 or 1, or in a promised manner. For example, an NSTR AP MLD may, when transmitting complete information on an AP of a non-primary link, configure each bit of a DTIM count subfield of the non-primary link to 0 or 1, or in a promised manner. For example, an NSTR AP MLD may, when transmitting complete information on an AP of a non-primary link, configure each bit of a DTIM interval subfield of the non-primary link to be 0 or 1, or in a promised manner.

Alternatively, since no beacon frames are transmitted in a non-primary link, an NSTR AP MLD may configure values related to a beacon frame of a primary link as beacon interval, DTIM count, and DTIM interval subfields in a per-STA profile corresponding to an AP of the non-primary link. This operation may be considered to maintain the same per-STA profile configuration as described above. The per-STA profile corresponding to the non-Primary link AP of the NSTR AP MLD may have a beacon interval subfield, a DTIM count subfield, and a DTIM interval subfield, each of which are configured to have a value related to a beacon frame transmitted in a primary link. For example, an NSTR AP MLD may, when transmitting complete information on an AP of a non-primary link, configure a beacon interval subfield of the non-primary link to have a value indicating (meaning) a beacon interval of a primary link. For example, an NSTR AP MLD may, when transmitting complete information on an AP of a non-primary link, configure a DTIM count subfield of the non-primary link to have a DTIM count value of a primary link. For example, an NSTR AP MLD may, when transmitting complete information on an AP of a non-primary link, configure a DTIM interval subfield of the non-primary link to have a value indicating (meaning) a DTIM interval of a primary link.

Alternatively, since no beacon frames are transmitted in a non-primary link, an NSTR AP MLD may configure values having a particular purpose as beacon interval, DTIM count, and DTIM interval subfields of a per-STA profile corresponding to an AP of the non-primary link. More specifically, a beacon interval subfield of a non-primary link may be configured by an AP MLD as a value (e.g., a virtual beacon interval) having a particular purpose, for example, a value for calculation. A conventional beacon interval of Wi-Fi literally refers to a value related to a time interval at which beacon frames are transmitted, but is also utilized as a time unit for various BSS operations. For example, a unit of JointFailureTimeout and QueryFailureTimeout primitives is defined as a beacon interval, and a listen interval field, a PRAW start offset subfield, an AID request interval field, an AID switch count field, an AID response interval field, a minimum transmission interval subfield, a channel quality measurement duration, and a color switch countdown (of a BSS color change announcement element) subfield indicate an interval/duration by using a beacon interval (or TBTT) as a basic unit. As described above, a beacon interval means a value related to an interval at which actual beacon frames are transmitted, but is also a value used as a unit for various primitives and fields. Therefore, even though no actual beacon frame is transmitted in a non-primary link, defining (indicating or configuring) a beacon interval for the non-primary link may be required for the purpose of being used as a unit of the above primitives/subfields.

That is, even though no beacon frames are transmitted in a non-primary link, a NSTR AP MLD may indicate a beacon interval subfield of the per-STA profile corresponding to an AP of the non-primary link as a beacon interval value to be used as a time unit of the non-primary link. In this case, non-AP MLDs may recognize (identify or calculate) a duration and interval of the above primitives and fields (using the beacon interval as a time unit), based on the value indicated by the beacon interval subfield of the per-STA Profile corresponding to the AP of the non-Primary link. At this time, a DTIM interval subfield and a DTIM count subfield of the per-STA profile corresponding to the AP of the non-primary link may also be configured according to a BSS operation purpose of an AP MLD, and a non-AP MLD operating an STA in the non-primary link may be required to operate based on the above configured values when operating the STA on the non-primary link.

Meanwhile, a method of configuring a subfield (a beacon interval, a DTIM Count, a DTIM interval, etc.) related to a beacon of a non-primary link by an NSTR AP MLD, as described above, may be applied equally to other frames and subfields (transmitted in a primary link or the non-primary link) including information related to a beacon of the non-primary link as well as a per-STA profile transmitted in the primary link.

In addition, a non-AP STA MLD that is to be associated with an NSTR AP MLD may need to use a beacon interval of a primary link of the NSTR AP MLD as a unit of a listen interval field transmitted while requesting setup for the primary link and a non-primary link. That is, a non-AP STA MLD transmitting a listen interval field to an NSTR AP MLD is required to calculate and configure a unit of a listen interval field as a beacon interval of an AP operating in a primary link of the NSTR AP MLD. The listen interval field may be a field indicating information related to a period (time) at which at least one STA switches to a wake state so that a non-AP STA MLD performing multi-link (re)association receive a beacon frame. The listen interval field may refer to a value derived when a ListenInterval parameter is indicated by an MLME primitive.

In this case, when a non-AP STA MLD transmits a listen interval field to an AP MLD (e.g., STR AP MLD) other than an NSTR AP MLD, the non-AP STA MLD may be required to configure the unit of the listen interval field to be the largest value among beacon intervals (of APs) of links for which the non-AP STA MLD is to perform setup. For example, if a non-AP STA MLD is to perform a multi-link setup for link 1 and link 2 with an AP MLD, the non-AP STA MLD may use the greater value among the beacon interval (of the AP) of link 1 and the beacon interval of link 2, as the unit of a listen interval field included in an ML association request frame. That is, if the beacon interval of link 1 is 100 ms and the beacon interval of link 2 is 50 ms, the unit of the listen interval subfield transmitted by the non-AP STA MLD may be 100 ms.

In general, if an AP and an STA have completed a setup, the STA may receive a beacon frame transmitted by the AP to identify and track (update) changes in operational parameters and elements of the AP. In addition, a beacon frame includes a Timestamp field and thus functions to provide information for STAs within a BSS to perform time synchronization.

However, since an NSTR AP MLD does not transmit beacon frames in a non-primary link as described above, an STA MLD having performed a setup with the NSTR AP MLD may be required to perform separate operations to track (update) parameters/elements and maintain time synchronization for the non-primary link.

According to an embodiment of the present invention, a non-AP STA MLD associated with an NSTR AP MLD may receive a beacon frame in a primary link, then identify a change sequence (present in an MLD parameter field of an RNR element) of a non-primary link, and transmit an ML probe request. An ML probe request frame transmitted by the non-AP STA MLD may have been transmitted to request changed parameter and element information of the non-primary link. The ML probe request frame may configure, to be 1, a complete profile of a per-STA profile corresponding to the non-primary link (an AP of the non-primary link) and transmit same, to request complete information of the non-primary link. Alternatively, an ML probe request frame transmitted by an STA MLD to update a parameter/element of a non-primary link may request updated information rather than complete/partial information on the non-primary link.

In other words, even if multiple links are formed between a non-AP STA MLD and an AP MLD, a frame for performing association, reassociation, and/or parameter update procedures may be transmitted only through a primary link. For example, if an STA recognizes that a parameter for an AP of a non-primary link have been updated, through a particular field (e.g., a change sequence or a BSS parameter change count subfield) which is included in neighbor AP information included in a beacon frame and indicates whether a parameter for a link of another AP is updated, a non-AP STA MLD may request transmission of the updated parameter through a primary link rather than the non-primary link of the other AP. That is, the non-AP MLD is unable to transmit, through a non-primary link, a frame (e.g., a probe request frame) for requesting an updated parameter.

For example, a non-AP STA MLD requesting information for updating a parameter/element of a non-primary link after performing a setup with an NSTR AP MLD may request a changed parameter/element for an AP of the non-primary link by configuring, to be 1, an updated profile subfield of a per-STA profile corresponding to the non-primary link in an ML probe request frame transmitted through a primary link. If a value of 1 is indicated as the updated profile subfield in the per-STA Profile (corresponding to the non-primary link) of the received ML probe request frame, the NSTR AP MLD may respond with an ML probe response frame including changed information (parameter and element) of the non-primary link.

In this case, a per-STA profile field in an ML probe request frame transmitted by a non-AP STA MLD may have a configuration including an updated profile subfield and a recorded change sequence subfield. The recorded change sequence subfield indicates a most recent change sequence value maintained by a non-AP STA MLD for a non-primary link, and an AP MLD may identify/determine the type of updated information, based on a value indicated through the recorded change sequence subfield.

For example, an NSTR AP MLD may have changed parameter 1 by increasing the change sequence number of a non-primary link from 100 to 101, and then changed parameter 2 by increasing the change sequence number from 101 to 102. An STA MLD may transmit an ML probe request frame to request updated information of the non-primary link. The NSTR AP MLD may respond with an ML probe response frame including both parameter 1 and parameter 2 if the non-AP STA MLD indicates the recorded change sequence subfield to be 100, or an ML probe response frame including only parameter 2 if the non-AP STA MLD indicates the recorded change sequence subfield to be 101.

The non-AP STA MLD may not use a separate updated profile subfield to request an updated profile, but may indicate a complete profile subfield to be 0. In other words, a method of requesting an updated profile by the non-AP STA MLD may correspond to configuring a complete profile subfield to be 0, and in this case, a separate updated profile subfield may not be included in a per-STA profile.

FIG. 24 illustrates an example of an STA-specific profile subelement (per-STA profile subelement) format according to an embodiment of the present invention.

Referring to FIG. 24(a), a per-STA profile subelement may have a configuration including an STA control field. The STA control field (see FIG. 24(b)) represents information for indicating the type of a field included in an STA profile (see FIG. 24(a)) of the per-STA profile subelement. In this case, in a particular per-STA profile subelement transmitted by an AP MLD other than an NSTR AP MLD, if a complete profile subfield of the STA control field is indicated by 1, a MAC address present subfield, a beacon interval present subfield, and a DTIM information present subfield may be required to all indicated by 1. However, as described above, since an NSTR AP MLD does not transmit beacon frames on a non-primary link, information related to a beacon frame of the non-primary link may not be indicated in a per-STA profile subelement corresponding to the non-primary link. That is, in a particular per-STA profile subelement (corresponding to an AP of a non-primary link) transmitted by an NSTR AP MLD, even if a complete profile subfield is indicated by 1, a beacon interval present subfield and a DTIM information present subfield may be indicated by 0.

In addition, as described in an embodiment above, a non-AP STA MLD transmitting an ML probe request frame to an NSTR AP MLD may request the changed (updated) information of a non-primary link AP from an AP of a primary link by indicating a value of 1 as an updated profile subfield of an STA control field (included in a per-STA profile subelement corresponding to the AP of the non-Primary link). The non-AP STA MLD may indicate, by using a recorded change sequence subfield (see FIG. 24C) a recorded change sequence value, which is information relating a time point at which the non-AP STA MLD has updated information of the non-primary link AP. The recorded change sequence subfield may be a subfield included in the STA profile. After receiving an ML probe request frame of the non-AP STA MLD through the primary link, the NSTR AP MLD may determine the information of the non-primary link AP to be provided as a response to the non-AP STA MLD, by comparing the value of a recorded change sequence subfield included in the ML probe request frame with the current change sequence value of the non-primary link AP.

Figure 25:
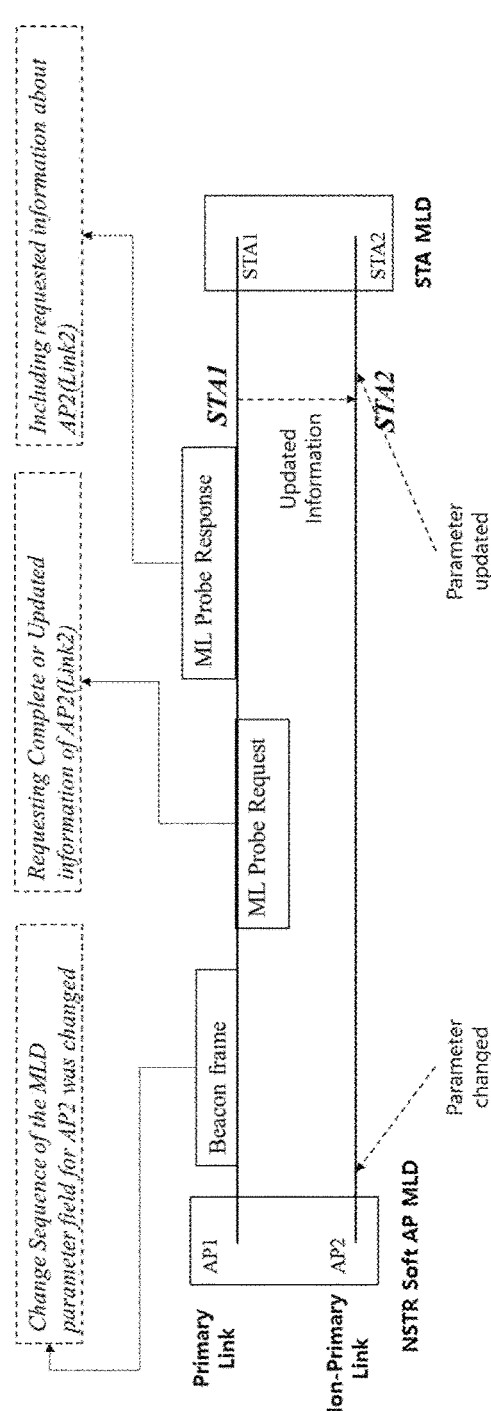
FIG. 25 illustrates an example of a process in which a non-AP MLD having performed a setup with a non-simultaneous transmission and reception (NSTR) soft AP MLD updates information of a non-primary link according to an embodiment of the present invention.

FIG. 25 illustrates an example of a process in which a non-AP MLD having performed a setup with a non-simultaneous transmission and reception (NSTR) soft AP MLD updates information of a non-primary link according to an embodiment of the present invention.

Referring to FIG. 25, an NSTR AP MLD may change a parameter of AP 2 operating in link 2 that is a non-primary link, and then indicate that the parameter of the AP 2 has been changed, through a beacon frame transmitted by AP 1 operating in link 1 that is a primary link. Information indicating that the parameter of AP 2 has been changed may be indicated by a change sequence subfield value corresponding to AP 2 in an RNR element included in the beacon frame transmitted by AP 1, the value having been increased by 1 from a value indicated in the previous beacon frame.

After receiving the beacon frame transmitted by AP 1 via STA 1, a non-AP STA MLD may recognize the fact that the parameter of AP 2 has been updated. To obtain changed parameter information of AP 2, the non-AP STA MLD may transmit an ML probe request frame via STA 1.

The ML probe request frame transmitted by the non-AP STA MLD via the STA 1 may have a configuration in which a per-STA profile subelement corresponding to AP 2 is included in an ML element, and the per-STA profile subelement may include an indicator relating whether a complete profile or an updated profile is requested.

After receiving the ML probe request frame from STA 1 through the primary link, the NSTR AP MLD may include requested information (complete or updated information) of AP 2 in an ML probe response frame, to respond to STA 1.

The non-AP STA MLD having received, as a response, the information of AP 2 requested thereby from the NSTR AP MLD through an ML probe response frame may update the parameter for AP 2 to complete a parameter update for the non-primary link in which beacon frames are not transmitted.

<Broadcast ML Probe Response>

According to an embodiment of the present invention, when information related to an AP operated in a non-primary link has been changed, an NSTR AP MLD may transmit a broadcast ML probe response frame through a primary link. When a non-AP STA MLD receives a broadcast ML probe response frame transmitted by the NSTR AP MLD through the primary link, the non-AP STA MLD may be required to update information on (the AP) of the non-primary link. In this case, the broadcast ML probe response frame may be an ML probe request frame transmitted by the NSTR AP MLD without a separate request, rather than being transmitted in response to an ML probe request frame transmitted by a particular STA.

A broadcast ML probe response frame includes a per-STA profile subelement corresponding to an AP of a non-primary link, and thus functions to assist non-AP STA MLDs in updating changed parameters and elements of the non-primary link. A (recorded) change sequence of a non-primary link being maintained by each non-AP STA may be different, and thus a broadcast ML probe response frame may include complete information on an AP of the non-primary link. The broadcast ML probe response frame may be transmitted together with a DTIM beacon frame.

Therefore, if it is identified, through a beacon frame, that a change sequence number corresponding to an AP of a non-primary link is different from (recorded) change sequences being maintained by non-AP STA MLDs, the non-AP STA MLDs may be required to receive a broadcast ML probe response frame by receiving the next DTIM frame.

A procedure of parameter update of a non-primary link by using a broadcast ML probe response frame, as described above, may also be performed using a broadcast ML association response frame. A method of configuring a per-STA profile subelement of a broadcast ML association response frame and an update procedure of a reception STA MLD are the same as an embodiment for a broadcast ML probe response frame described above, and thus a detailed description is omitted.

Figure 26:
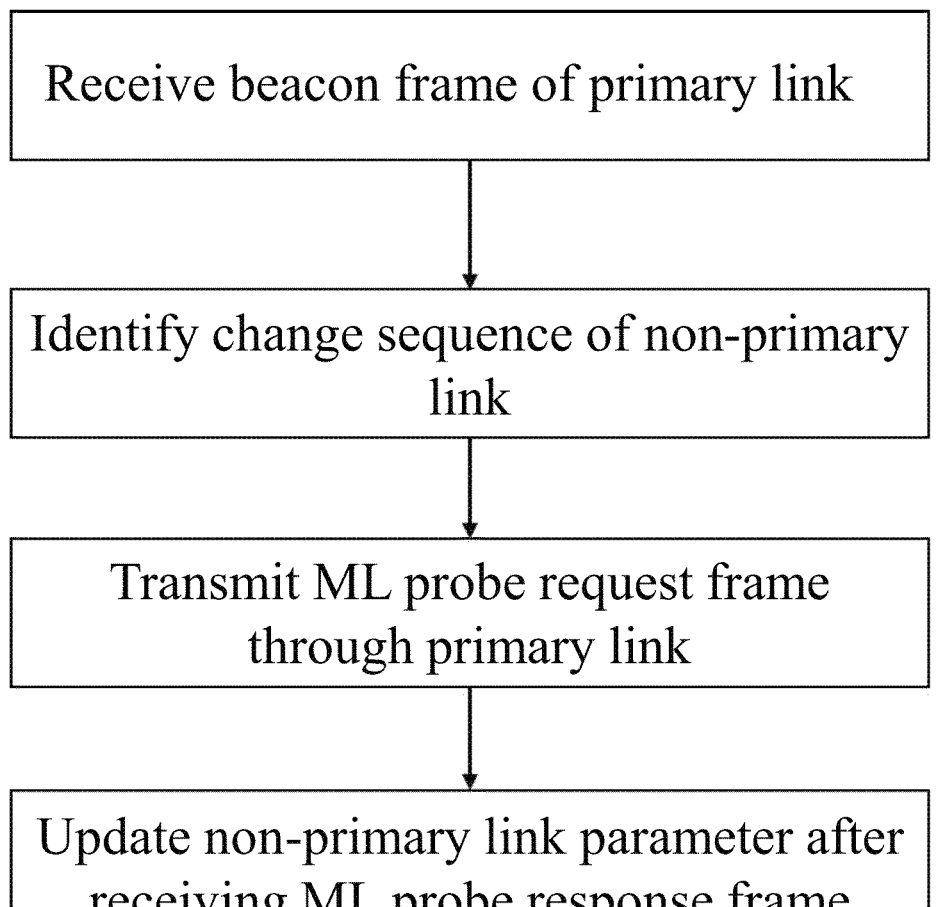
FIG. 26 is a flowchart illustrating an example of a procedure in which a non-AP STA MLD associated with an NSTR AP MLD updates a parameter of a non-primary link according to an embodiment of the present invention.

FIG. 26 is a flowchart illustrating an example of a procedure in which a non-AP STA MLD associated with an NSTR AP MLD updates a parameter of a non-primary link according to an embodiment of the present invention.

After receiving a beacon frame in a primary link, a non-AP STA MLD identifies a change sequence (present in an MLD parameter field of an RNR element) of a non-primary link. If the identified change sequence value of the non-primary link is different from a (recorded) change sequence value being maintained by the non-AP STA MLD, the non-AP STA MLD may transmit an ML probe request frame through the primary link. The ML probe request frame may include a subfield indicating whether complete information or updated information on a non-primary link AP is requested. Additionally, the ML probe request frame requesting updated information may further include a subfield indicating the (recorded) change sequence value being maintained by the non-AP STA MLD. Thereafter, the non-AP STA MLD having received, as a response, an ML probe response frame from the AP MLD performs a parameter update, based on information of the non-primary link AP included in the responded ML probe response frame.

<Time Synchronization Management of Non-Primary Link>

As described above, a beacon frame transmitted by an AP serves to help STAs in a BSS to perform time synchronization as well as transferring various parameter and element information. A TimeStamp field included in the beacon frame indicates the value of a timing synchronization function (TSF) timer of a time point at which a data symbol including a first bit of the TimeStamp field appears on a transmit antenna connector, and an STA having received the TimeStamp field may synchronize the STA's TSF timer with the AP, based on the received TimeStamp field value.

In this way, an AP and an STA may operate while maintaining time synchronization, based on the TimeStamp value included in the beacon frame, and perform a timing-based operation. However, an NSTR AP MLD is unable to transmit beacon frames through a non-primary link, and thus an STA, among STAs of a non-AP STA MLD, which is associated with a non-primary link AP of the NSTR AP MLD, is required to use a method other than a method using beacon frames, so as to maintain time synchronization with the AP.

To maintain time synchronization with a non-primary link AP of an NSTR AP MLD, an associated non-AP STA may need to use TimeStamp of a TIM frame transmitted by the AP. A TIM frame has a configuration including a TimeStamp field having the same function as a beacon frame. Therefore, the STA having received a TIM frame from the non-primary link AP of the NSTR AP MLD may be required to manage a TFS timer by using a TimeStamp field in the TIM frame. However, an NSTR AP MLD may be restricted from initiating transmission in a non-primary link without occupying a primary link, and thus may be necessary to transmit a TIM frame in the non-primary link simultaneously when transmitting a beacon frame in the primary link. This means that a non-AP STA MLD associated with an NSTR AP MLD may be required to be prepared to receive a TIM frame in a non-primary link according to the TBTT of a primary link.

In another embodiment of the present invention, if an AP MLD is an NSTR AP MLD not supporting simultaneous transmission and reception, the same TSF timer may be used in each link of multiple APs included in the NSTR AP MLD, and the used TSF timer may be the TSF timer of a primary link. In other words, if an AP MLD is an NSTR AP MLD, non-primary links of APs affiliated with the NSTR AP MLD may use the TSF timer of a primary link.

That is, a non-AP STA MLD associated with an NSTR Soft AP MLD may need to use the TSF timer of a primary link commonly for a non-primary link. In other words, a non-AP STA MLD associated with an NSTR AP MLD may not have a separate TSF timer for a non-primary (NSTR soft AP MLD-based) link, but may share a TSF timer managed using a primary link. That is, in an aspect of the present invention, an NSTR AP MLD and a non-AP STA MLD associated with the NSTR AP MLD may use an MLD-level (MLD-unit or MLD-common) timer. For a stable operation of an NSTR AP MLD and a non-AP STA MLD associated with the NSTR AP MLD, the time synchronization between APs in the NSTR AP MLD and/or between STAs in the non-AP STA MLD associated with the NSTR AP MLD may be required to be maintained to have an error equal to or smaller than a promised value. For example, an NSTR AP MLD may be required to maintain that a TimeStamp difference (or difference between timers) maintained between an AP of a primary link and an AP of a non-primary link, to be equal to or smaller than a promised/configured value. For example, a non-AP STA MLD associated with an NSTR Soft AP MLD may be required to maintain a TimeStamp difference being maintained between an STA of a primary link and a STA of a non-primary link, to be equal to or smaller than a promised/configured value.

In other words, the TSF timer of a primary link may be identically maintained (or applied or used) in links for all APs included in or affiliated with an NSTR AP MLD. In addition, the difference between timestamps or TSF timers of two APs among APs included in or affiliated with an NSTR AP MLD may be limited to be within a particular value (e.g., 30 us).

That is, the TSF timers of all APs included in or affiliated with an NSTR AP MLD may be identical, and the difference or the clock drift between timestamps or TSF timers of two APs (e.g., an AP of a primary link and an AP of a non-primary link) included in or affiliated with an AP MLD or an NSTR AP MLD may be limited to be within a particular value (e.g., ±30 us). In this case, the AP MLD or NSTR AP MLD may modify a timestamp or a TSF timer so that the difference or the clock drift between the TSF timers is within the particular value.

In addition, a non-AP STA MLD associated with an NSTR AP MLD may be required to receive a next beacon frame transmitted in a primary link, when the non-AP STA MLD receives a TIM frame through a non-primary link. More specifically, when a non-AP STA MLD receives a TIM frame via an STA of a non-primary link and a value indicated by a check beacon field in a TIM frame action field is different from a check beacon value being maintained by the non-AP STA MLD, the non-AP STA MLD may be required to receive a next beacon frame transmitted in a primary link. The next beacon frame may be a beacon frame that is transmitted according to a TBTT of the primary link and exists after a time point at which the TIM frame has been received in the non-primary link. The receiving of the next beacon frame may mean an operation accompanying (including) updating a parameter of the non-primary link through a per-STA profile (corresponding to an AP of the non-primary link) included in the beacon frame. The parameter to be updated may be limited to a parameter related to a critical update.

<Channel Switching and Channel Quieting Procedure for Non-Primary Link>

As described above, an NSTR AP MLD does not transmit beacon frames in a non-primary link, and accordingly, an operation of a BSS performed based on a transmission timing of a beacon frame may be performed differently from a BSS operation of a conventional AP MLD.

In conventional Wi-Fi, an operating channel frequency (operating frequency band) of a BSS may be changed according to a procedure promised between an AP and an STA. In this case, a conventional extended channel switching (ECS) operation may be used, or a channel switching mechanism newly defined in 11be may be used. When an AP determines to change an operating channel of a BSS, the AP may transmit a beacon frame, a probe response frame, or an extended channel switch announcement frame to notify associated STAs so that the STAs switch to a new channel and operating class while maintaining association. The AP transmits an extended channel switch announce element through a beacon frame, and a channel switch count field of the element indicates information relating to how many beacon frames will be transmitted before channel switching (changing of operating channel) is performed. If the AP includes a MAX channel switch time element in a beacon frame together with the extended channel switch announcement element, the AP is required to transmit a first beacon frame in a new channel within a switch time field (of the MAX channel switch time element). That is, the beacon frame transmitted in the new channel needs to be transmitted in a time interval shorter than a time interval indicated by the switch time field, from a last beacon frame transmitted in a current channel.

Referring to a channel switching operation of a conventional Wi-Fi BSS described above, the AP of the BSS may indicate, to the STA through a beacon frame transmitted in a current channel, information on a new channel, information on a time at which channel switching is performed, and information relating to a time point of a beacon frame transmitted first in the new channel. Based on channel switching-related information included in the beacon frame transmitted by the AP, the STA of the BSS may move to the new channel in a predetermined time interval (a time interval indicated by the AP), so that the STA completes the channel switching while maintaining association with the AP. As described above, a channel switching procedure of a conventional Wi-Fi BSS is performed in a manner in which the information required for channel switching (a channel switch mode, a new operating class, a new channel number, a channel switch count, etc.) is provided through a beacon frame transmitted by an AP. Therefore, a non-primary link BSS of an NSTR AP MLD, in which beacon frames are not transmitted, is unable to perform channel switching by using the conventional channel switching procedure.

In addition, when conventional Wi-Fi configures a quiet interval, information on a time interval to which the quiet interval is applied is indicated through elements (quiet element, quiet channel element, etc.) included in a beacon frame transmitted by an AP of a BSS, and similar to the channel switching procedure, a non-primary link of an NSTR AP MLD in which no beacon frame is transmitted is unable to use a conventional quieting procedure for configuring a quiet interval.

According to an embodiment of the present invention, an NSTR AP MLD may indicate, through a beacon frame transmitted by a primary link, pieces of information required for changing (switching) an operating channel of a non-primary link and/or pieces of information required for configuring a quiet interval. That is, non-AP STA MLDs associated with an NSTR AP MLD may operate based on information obtained through a beacon frame of a primary link, to perform channel switching of a non-primary link. In other words, non-AP STA MLDs associated with an NSTR AP MLD may obtain information relating to a quiet interval of a non-primary link through a beacon frame of a primary link.

More specifically, an NSTR AP MLD may need to include a per-STA profile for an AP of a non-primary link in a beacon frame of a primary link (and (ML) probe response frame), when performing channel switching or configuring a quiet interval for the non-Primary link.

Figure 27:
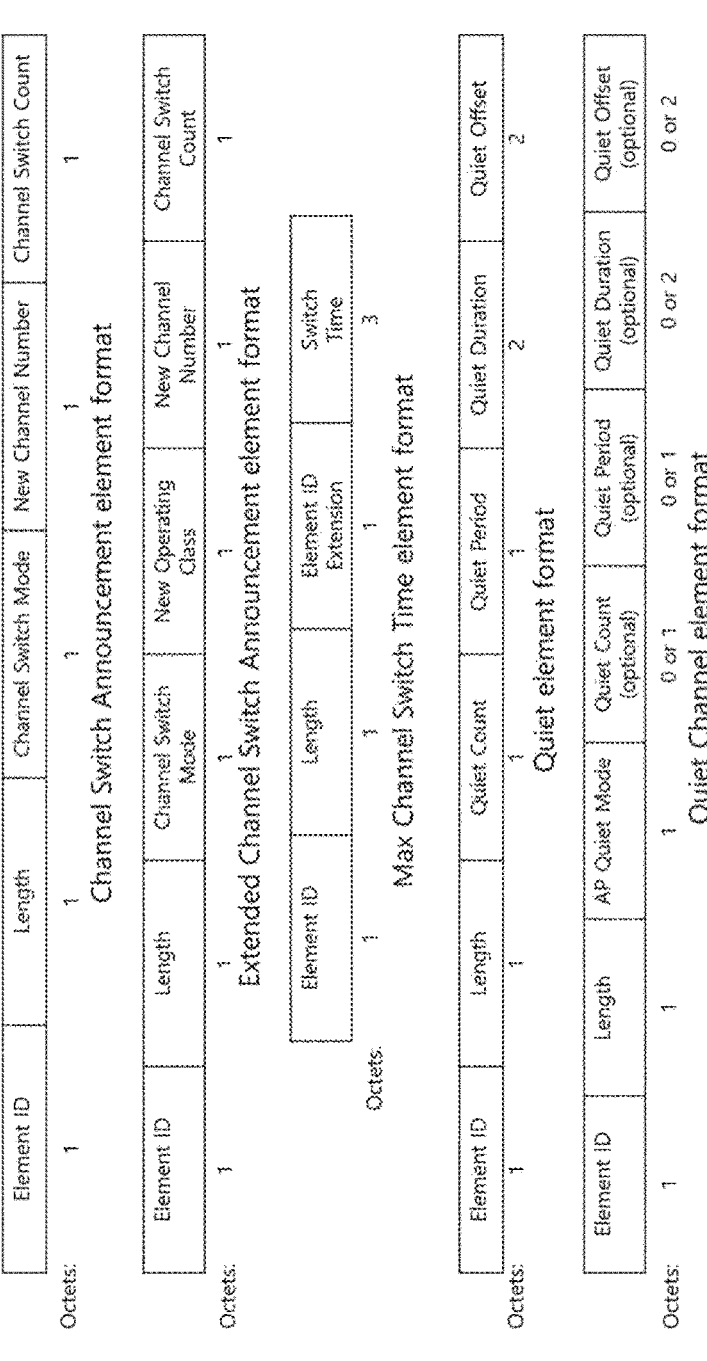
FIG. 27 illustrates an example of formats of elements according to an embodiment of the present invention.

FIG. 27 illustrates an example of formats of elements according to an embodiment of the present invention. FIG. 27 shows an example of a format of each element discussed above.

Referring to FIG. 27, a per-STA profile for (corresponding to) an AP of a non-primary link may have a configuration including at least one of a channel switch announcement element, an extended channel switch announcement element, a max channel switch time element, a quiet element, and a quiet channel element.

Timing fields of the above elements may be required to be configured based on a target beacon transmission time (TBTT) and a beacon interval of a primary link.

A primary link AP of an NSTR AP MLD may be required to configure, based on a beacon interval and a TBTT of the primary link AP, timing fields of a channel switch announcement element, an extended channel switch announcement element, a max channel switch time element, a quiet element, and a quiet channel element included in a per-STA profile (included in a beacon frame and an (ML) probe response frame) for an AP of a non-primary link. The timing fields are used to collectively refer to time-related fields including duration-related fields (switch time and quiet duration fields) and time point-related fields (channel switch count and quiet count fields).

Therefore, non-AP MLDs associated with an NSTR AP MLD may, after receiving a beacon frame from an AP of the NSTR AP MLD operated in a primary link, obtain information relating to channel switching and/or a quiet interval of a non-primary link from a per-STA profile included in the beacon frame, and then be required to interpret the information relating to the channel switching of the non-primary link and/or the information relating to the quiet interval, based on a TBTT and a beacon interval (BI) of the primary link. The per-STA profile refers to a per-STA profile corresponding to an AP of the non-primary link.

Meanwhile, after an NSTR AP MLD completes channel switching of a non-primary link through a beacon frame of a primary link (after completing announcement and channel switching), the NSTR AP MLD may be required to transmit a TIM frames in a new channel (of the non-primary link) within a time indicated by a switch time field (of a max channel switch time element). That is, a non-primary link AP of an NSTR AP MLD may need to transmit a TIM frame in a new channel after performing channel switching. In this case, the non-primary link AP may need to transmit a TIM frame on the new channel within a time indicated by a switch time field after a beacon frame indicating a channel switch count subfield of 1 (or 0) is transmitted in the primary link. In this case, the channel switch count field and the switch time field may be included in a per-STA profile (corresponding to the non-primary AP) included in the beacon frame transmitted on the primary link. The TIM frame may be replaced by a different frame transmitted on the new channel of the primary link or the non-primary link. In one example, an NSTR AP MLD may, after completing a channel switch of a non-primary link, transmit, on a primary link, a beacon frame indicating information related to the completion of the channel switch. The beacon frame may be an additional beacon frame transmitted independently of a TBTT. The beacon frame may be a beacon frame having a configuration including complete information on the non-primary link. For example, the beacon frame having a configuration including complete information on the non-primary link may be a beacon frame in which a complete information subfield of a per-STA profile corresponding to an AP of the non-primary link is configured to be 1. The beacon frame of the primary link transmitted after the channel switch of the non-primary link is terminated may be required to be transmitted within a promised time after a beacon frame transmitted before the channel switch is started. The promised time may be a time indicated by a switch time field (of a max channel switch time element). Alternatively, the beacon frame may be a beacon frame including an indication related to channel switching of the non-primary link. For example, a beacon frame of a primary link that is transmitted after channel switching is completed on a non-primary link may have a configuration including a channel switch complete subfield. The channel switch complete subfield may be a subfield included in an ML element.

A particular switch complete subfield may be a subfield indicated by 1 at the time of completion of a channel switch of an AP corresponding to a per-STA profile including the particular subfield. That is, after completing a channel switch on a non-primary link, an AP may be required to configure a value of 1 as a channel switch complete subfield of a per-STA profile (of a beacon frame) corresponding to the AP of the non-primary link. The beacon frame relating to channel switching may be transmitted (used) for the same purpose by an AP MLD even if the AP MLD is not an NSTR AP MLD, i.e., a normal AP MLD.

A non-AP MLD associated with an NSTR AP MLD may perform channel switching of a non-primary link through a primary link, and, then, only when a promised frame (a TIM frame or another frame of the non-primary link and/or a beacon frame indicating information related to completion of the channel switching of the primary link) is received from the AP MLD, may perform an operation considering that the channel switching of the non-primary link has been completed. If it is considered that the channel switching has not been completed, the non-AP STA MLD may consider that the channel switching of the non-primary link has been canceled, and may have to operate (return to a previous channel) in the previous channel (before the channel switching is performed).

Alternatively, an NSTR AP MLD may be restricted such that the NSTR AP MLD is unable to configure a quiet interval on a non-primary link. The quiet interval of the non-primary link may be defined (configure) as the same time interval as the quiet interval of a primary link, if there is a defined (configured) quiet interval on the primary link. That is, if a non-AP STA MLD associated with the NSTR AP MLD recognizes the quiet interval of a primary link, the non-AP STA MLD may also consider the quiet interval of a non-primary link as being configured as the same time interval.

In addition, an NSTR AP MLD may not be able to perform channel switching of a non-primary link. However, if the NSTR AP MLD is to perform channel switching of the non-primary link, the NSTR AP MLD may perform an operation as if an AP of the non-primary link operated in an existing channel were released and a new non-primary link AP were added in a new channel.

A quiet element for a non-primary link transmitted through a beacon frame of a primary link may be configured (indicated) as below by an NSTR AP MLD.

1. A quiet count field may be configured to be the number of TBTTs in the primary link remaining until the next quite interval is started in the non-primary link.

2. A quiet period field may be configured to be a value (a beacon interval unit of the primary link) related to every how many primary link beacon intervals a regular (periodic) quiet interval of the non-primary link, which is defined through a corresponding quite element, is started. (This is configured to be 0 if the quiet interval is not a regular quiet interval)

3. A quiet offset field may be configured to be a time value (a TU unit) relating to after how long offset the quiet interval of the non-primary link is started from a TBTT of the primary link specified through the quiet count subfield.

An (extended) channel switch announcement element and a max channel switch time for a non-primary link transmitted through a beacon frame of a primary link may be configured (indicated) as below by an NSTR AP MLD.

1. A channel switch count field (of the channel switch announcement element) may be configured as information relating to how many TBTTs of the primary link remaining until a channel switch of the non-primary link is started. If a channel switch of a non-primary link AP is started at the next TBTT of the primary link, the beacon frame transmitted at this TBTT may have a channel switch count field (relating to the non-primary link AP) configured to be 1 or 0.

2. A switch time field (of the max channel switch time element) may be configured to be a value for a maximum time difference between a primary beacon frame (a beacon frame with the channel switch count field configured to be 1 or 0 in the above description indicated by number 1) transmitted at a TBTT immediately before a TBTT at which a channel switch of the non-primary link is started, and a TIM frame transmitted on a new channel of the non-primary link after the channel switch of the non-primary link is completed. For example, if a beacon interval of the primary link is 100 ms and the switch time field (for a non-primary link AP) is configured to be 200 ms, the AP of the non-primary link is required to transmit a TIM frame on a new channel within 200 ms after a beacon frame transmission time point on the primary link at which the AP has started a channel switch.

Therefore, a non-AP MLD associated with an NSTR AP MLD may, after receiving a beacon frame through a primary link, obtain information relating to a quiet interval and a channel switch time point and interval of a non-primary link, based on information indicated in a per-STA profile of a non-primary AP included in the beacon frame and TBTT and beacon interval information of the primary link. The non-AP MLD may configure (recognize or interpret) a starting time point of a quiet interval of the non-primary link, based on a TBTT of the primary link. The non-AP MLD may recognize/interpret a channel switch time point of the non-primary link, based on a reception time of a beacon frame received on the primary link.

A conventional Wi-Fi non-AP STA, when an AP performs a channel switch, may select whether to perform a channel switch together, so as to maintain association with the AP. However, a non-AP STA MLD associated with an NSTR AP MLD may be required to necessarily perform a channel switch of a non-primary link when the NSTR AP MLD performs a channel switch on the non-primary link.

If a non-AP STA MLD having performed an ML setup with an NSTR AP MLD (i.e., ML setup using a primary link and a non-primary link) determines not to perform a channel switch of the non-primary link, the non-AP STA MLD may need to terminate (release or change) the ML setup with the NSTR AP MLD, and change to be set up only over the primary link (through setup after release or through resetup).

Figure 28:
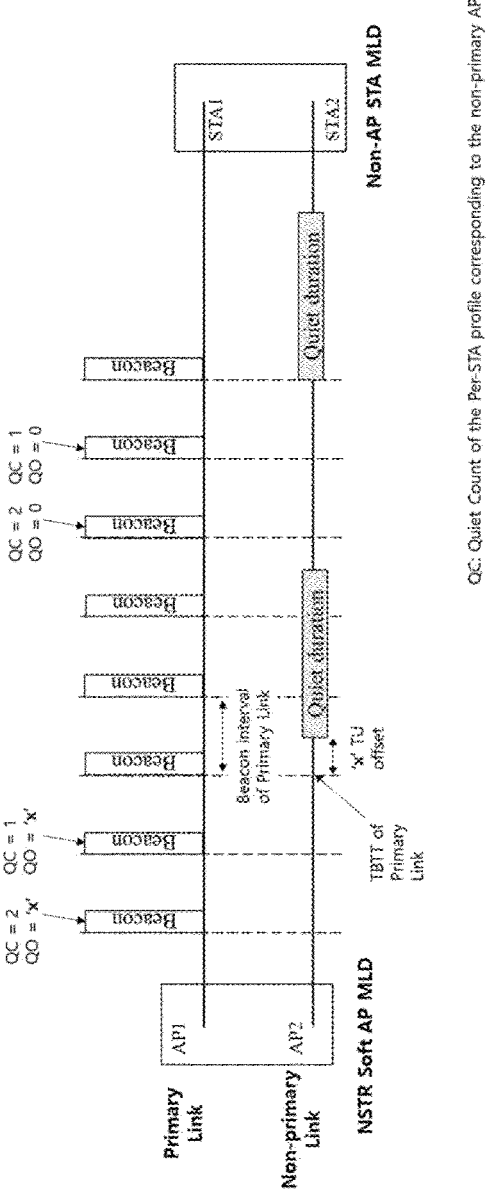
FIG. 28 illustrates an example of a process in which an NSTR AP MLD configures (defines) a quiet interval in a non-primary according to an embodiment of the present invention.

FIG. 28 illustrates an example of a process in which an NSTR soft AP MLD configures (defines) a quiet interval in a non-primary according to an embodiment of the present invention.

Referring to FIG. 28, an NSTR AP MLD operates AP 1 and AP 2 on a primary link and a non-primary link, respectively, and AP 1 and AP 2 are associated with STA 1 and STA 2 of a non-AP STA MLD, respectively.

To configure (define) a quiet interval (quiet interval #1 in FIG. 28) on the non-primary link, the NSTR AP MLD may include a per-STA profile corresponding to AP 2 in a beacon frame transmitted via AP 1 on the primary link, and then transmit the beacon frame. The per-STA profile corresponding to AP 2 may include a quiet element, and the quite element indicates information regarding a time point at which the quiet interval (quiet interval #1 in FIG. 28) is started, through a quiet count field and a quiet offset field. The quiet element included in a first beacon frame (beacon #1 in FIG. 28) of the primary link shown in FIG. 18 has a quiet count field configured to be 2 and a quiet offset field configured to be a value indicating "x" TUs (TU is a time unit, 1024 us), and in a second beacon frame (beacon #2 in FIG. 28), a quiet count field is configured to be 1.

The non-AP STA MLD having received the first and/or second beacon frames through the primary link may identify the quiet element included in the per-STA profile (corresponding to AP 2) of the beacon frame, thereby recognizing that a quiet interval has been configured (advertised by the AP MLD) on the non-primary link and the quiet interval (quiet interval #1 in FIG. 28) is started from a time point after passage of the "x" TUs from a TBTT corresponding to a third beacon frame.

As illustrated in FIG. 28, to additionally configure (define) a next quiet interval (quiet interval #2 in FIG. 28) on the non-primary link, the NSTR AP MLD may again include a per-STA profile corresponding to AP 2 in a beacon frame transmitted via AP 1 on the primary link, and then transmit the beacon frame. A sixth beacon frame (beacon #6 in FIG. 28) of the primary link shown in FIG. 28 has a quiet count field configured to be 2 and a quiet offset field configured to be a value indicating 0 TUs (TU is a time unit, 1024 us), and in a seventh beacon frame (beacon #7 in FIG. 28), a quiet count field is configured to be 1.

The non-AP STA MLD having received the sixth and/or seventh beacon frames through the primary link may identify the quiet element included in the per-STA profile (corresponding to AP 2) of the beacon frame, thereby recognizing that a quiet interval (quiet interval #2) has been configured (advertised by the AP MLD) on the non-primary link and the quiet interval (quiet interval #2) is started from a TBTT corresponding to an eighth beacon frame.

Information on the length of quiet intervals is indicated through a quite duration field indicated together in the quite element.

Figure 29:
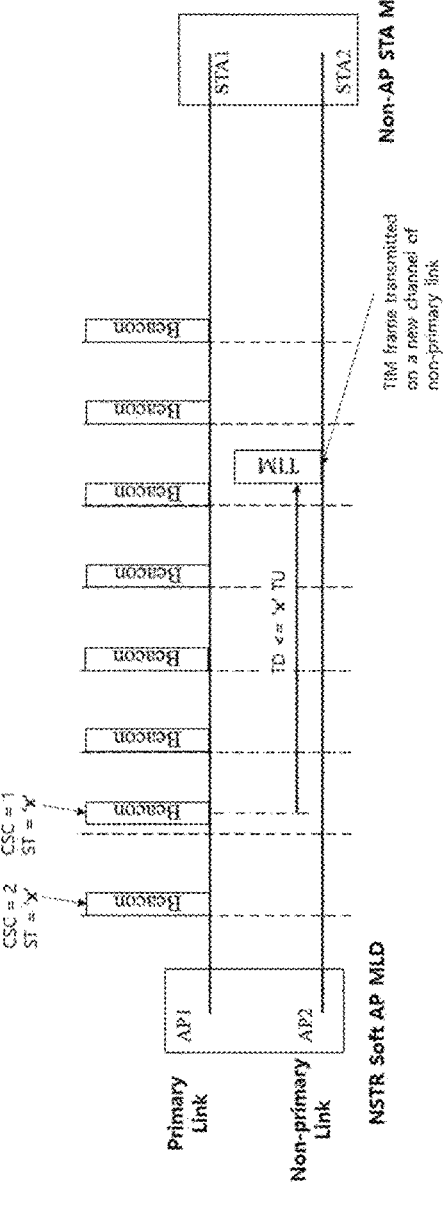
FIG. 29 illustrates an example of a method in which an NSTR AP MLD performs a channel switch of a non-primary according to an embodiment of the present invention.

FIG. 29 illustrates an example of a method in which an NSTR soft AP MLD performs a channel switch of a non-primary according to an embodiment of the present invention.

Referring to FIG. 29, an NSTR AP MLD operates AP 1 and AP 2 on a primary link and a non-primary link, respectively, and AP 1 and AP 2 are associated with STA 1 and STA 2 of a non-AP STA MLD, respectively.

To change the non-primary link to a new channel, the NSTR AP MLD may include a per-STA profile corresponding to AP 2 (non-primary link) in a beacon frame transmitted via AP 1 on the primary link, and then transmit the beacon frame. The per-STA profile corresponding to AP 2 includes an (extended) channel switch announcement element and a max channel switch time element, and indicates information relating to a time point at which channel switching is started, and a time interval for which a TIM frame is transmitted on a new channel after the channel switching. The (extended) channel switch announcement element included in a first beacon frame (beacon #1 in FIG. 19) of the primary link shown in FIG. 19 has a channel switch count field configured to be 2 and in a second beacon frame (beacon #2 in FIG. 19), same is configured to be 1.

The non-AP STA MLD having received the first and/or second beacon frames through the primary link may identify the (extended) channel switch announcement element included in the per-STA profile (corresponding to AP 2) of the beacon frame, thereby recognizing that channel switching (to a new channel) of the non-primary link is started after reception of the second beacon frame and a TIM frame of AP 2 is to be received on a new channel within "x" TUs from a time point at which the second beacon frame is received.

The new channel may be a channel corresponding to a value indicated through a new channel number field included in the (extended) channel switch announcement element. The "x" TUs may be a time value indicated through a switch time field included in the max channel switch time element included in the per-STA profile (corresponding to AP 2).

\<Limitation on Operation of Non-AP STA MLD Associated with NSTR AP MLD\>

An NSTR AP MLD is an AP MLD having a primary link and a non-primary link as an NSTR link pair. Therefore, an AP of the non-primary link may be in a blind state while PPDU transmission is being performed via an AP of the primary link, and conversely, the AP of the primary link may be in a blind state when the AP of the non-primary link is performing transmission. In this case, an AP of the NSTR AP MLD having experienced the blind state may be required to configure MediumSyncDelay to be a pre-configured value.

MediumSyncDelay is a single timer commonly applied to all EDCA functions (EDCAFs) of an STA, and when MediumSyncDelay is not 0, additional constraints may be placed on the STA to obtain a TXOP. The additional constraints may be that (1) a first transmission attempting to obtain a TXOP is required to be an RTS frame, (2) only TXOP acquisition attempts, the number of which is equal to or smaller than a pre-configured number, are allowed while MediumSyncDelay is being applied (until same is reduced to 0), and (3) a stricter (lower, e.g., −72 dBm to −62 dBm) CCA energy detection (ED) threshold is used compared to when MediumSyncDelay is 0. More constraints to obtain a TXOP may be applied to an STA having MediumSyncDelay which is not 0, than to an STA having MediumSyncDelay of 0.

Therefore, even in a case of an NSTR AP MLD, MediumSyncDelay may be required to be applied to an AP when the AP has experienced a blind state, and under a situation where channel access of the AP is limited, providing a normal service to STAs in a BSS may be difficult. An NSTR AP MLD may determine one of links of an NSTR link pair on which the NSTR AP MLD operates APs as a primary link, so as to manage transmission performed on a non-primary link (a link other than the primary link) in a manner in which the primary link does not enter a blind state. For example, an NSTR AP MLD may perform transmission on a non-primary link only when performing transmission on a primary link, thereby managing the primary link not to enter a blind state. For this purpose, even if a frame requesting a response frame is received via an AP of a non-primary link, an NSTR AP MLD may not respond with the requested response frame. That is, even if a frame requesting a response frame is received via an AP of a non-primary link, an NSTR AP MLD may perform an operation of not responding with the response frame. A reason why the NSTR AP MLD does not respond to the response frame via the AP of the non-primary link may be to prevent an AP of a primary link from becoming a blind state.

As described above, an NSTR AP MLD may configure a primary link and manage an operation (transmission) of an AP operating on the primary link and/or a non-primary link so as to prevent the AP of the primary link from becoming a blind state. Similarly, non-AP STA MLDs associated with an NSTR AP MLD may need to operate with an understanding of a primary link management method of the NSTR AP MLD. For example, if a non-AP STA MLD recognizes that a response frame is not to be transmitted from an NSTR AP MLD on a non-primary link, the non-AP STA MLD may not transmit a frame requesting transmission of a response frame on the non-primary link. In addition, if a non-AP STA MLD has transmitted a frame requesting transmission of a response frame on a non-primary link and then has not received the response frame from an NSTR AP MLD, the non-AP STA MLD may not retransmit the frame requesting transmission of the response frame. For example, if a non-AP STA MLD transmits an RTS frame to an NSTR AP MLD over a non-primary link and fails to receive a CTS frame response, the non-AP STA MLD may not retransmit the RTS frame. The non-AP MLD may not attempt transmission to the NSTR AP MLD over the non-primary link until receiving a trigger frame over the non-primary link.

In addition, even if a non-AP MLD has completed a channel access procedure of a non-primary link to perform UL transmission, the non-AP MLD may defer transmission performed on the non-primary link until completing a channel access procedure of a primary link. A method of deferring transmission performed on the non-primary link by the non-AP MLD may be stopping a backoff procedure performed by an STA (more precisely, an EDCAF of the STA) of the non-primary link until a backoff procedure performed by an STA of the primary link is completed. A method of stopping, by the non-AP MLD, a backoff procedure performed by the STA of the non-primary link may be maintaining a backoff counter at 0.

According to the methods described above, a non-AP STA MLD having completed a channel access procedure on both a primary link and a non-primary link may perform simultaneous transmission (simultaneous UL PPDU transmission) on the primary link and the non-primary link. The meaning of "simultaneous transmission" above is that times at which respective transmissions are started are within a pre-configured time interval. However, if only a channel access procedure of a primary link is completed and a channel access procedure of a non-primary link is not yet completed, a non-AP MLD may start PPDU transmission only on the primary link or may start simultaneous transmission when the channel access procedure of the non-primary link is completed. In other words, when a non-AP MLD performs transmission to an NSTR AP MLD, the non-AP MLD may perform transmission using a primary link only, or may perform simultaneous transmission using the primary link and a non-primary link. However, a non-AP MLD may not be allowed to perform PPDU transmission to an NSTR AP MLD by using only a non-primary link.

In addition, when UL transmission to an NSTR AP MLD is performed using both a primary link and a non-primary link, a non-AP MLD may be required to match the termination times of transmissions performed on both of the links. The matching of the termination times of the transmissions may mean that the transmissions performed on both of the links are terminated together within a pre-configured time interval.

In addition, when UL transmission to an NSTR AP MLD is performed using both a primary link and a non-primary link, a non-AP MLD may be required to identically configure, for PPDUs transmitted on both of the links, whether the PPDU requests a response frame. More specifically, two UL PPDUs transmitted simultaneously by a non-AP MLD on a primary link and a non-primary link may be required to both request transmission of a response frame or both not request transmission of a response frame. This limitation may be applied because, if a response frame is transmitted only on a particular link as a result of UL transmission performed by a non-AP MLD by using both a primary link and a non-primary link, an AP operating on another link of an NSTR AP MLD may enter a blind state. However, if only one of two PPDUs, the reception of which is simultaneously completed (each PPDU is received over a primary link and a non-primary link) is a PPDU requesting response frame transmission, an NSTR AP MLD may not perform response frame transmission for both of the two PPDUs.

In addition, when transmission to an NSTR AP MLD is performed using a primary link and a non-primary link together, a non-AP MLD may be required to configure a TXOP of the non-primary link to be terminated equal to or earlier than a TXOP of the primary link. In other words, the non-AP MLD may need to configure a TXOP of the non-primary link to be terminated simultaneously with a TXOP of the primary link, or terminated earlier than same. However, a non-primary link TXOP of a non-AP STA MLD may be allowed to be terminated later than a TXOP of a primary link at a time point within a predetermined time interval.

In addition, a non-AP STA MLD may recognize that an NSTR AP MLD has experienced a BLIND state on an AP of a particular link, and may assist an operation of the AP. More specifically, when a non-AP STA MLD recognizes that an NSTR AP MLD has performed transmission over only one link among a primary link and a non-primary link, the non-AP STA MLD may recognize that an AP of the other link, which has not performed transmission, has experienced a blind state. In this case, the non-AP STA MLD may perform an operation of helping the AP having experienced the blind state to release MediumSyncDelay (reset same to 0) by considering that the AP is to be limited in channel access due to the MediumSyncDelay that is no 0. The operation performed by the non-AP STA MLD may be an operation using a feature wherein MediumSyncDelay is releasable when a PPDU (including a valid MPDU) for which NAV configuration is possible (a NAV-enabled PPDU) is received.

For example, a non-AP STA MLD may transmit a NAV-enabled assist frame (a type of PPDU) to an AP of an NSTR AP MLD determined to have a non-zero MediumSyncDelay after experiencing a blind state. The assist frame may be a frame included in a valid NAV-enabled MPDU regardless of the frame format thereof. In this case, a condition that the non-AP STA MLD transmits an assist frame to the NSTR AP MLD over a particular link may be that a state of the particular link identified by the non-AP STA MLD is an idle state. Another condition that the non-AP STA MLD transmits an assist frame to the NSTR AP MLD over a particular link may be that the non-AP STA MLD is a non-AP STA MLD that has been explicitly or implicitly requested (indicated) by the NSTR AP MLD to transmit the assist frame.

<ML Discovery (Multi-Link Operation (MLO) Discovery) and ML Setup (Association) Procedure Related to 6 GHz Band>

Wi-Fi before 6th generation Wi-Fi has supported operation in 2.4 GHz and 5 GHz, and a 6 GHz band recently incorporated in the ISM band is a Wi-Fi frequency band (unlicensed band) firstly used by an HE terminal (AP STA or non-AP STA). The IEEE 802.11ax task group (TG) having standardized HE terminals has defined an HE STA (AP STA or non-AP STA) operated in the 6 GHz band not to perform a backward compatibility operation for a previous generation Wi-Fi terminal, by considering that there are no conventional Wi-Fi terminals (terminals prior to Wi-Fi 6th generation) operated in the 6 GHz band. More specifically, the task group has defined that an HE STA operating at 6 GHz is restricted from transmitting an HT capabilities element, a VHT capabilities element, an HT operation element, a VHT operation element, and/or an HE operation element including a VHT operation information field, thereby excluding support for terminals before 6th generation Wi-Fi and reducing information included in beacon frames so as to reduce overhead.

That is, an AP and/or a non-AP STA operating in a particular band (e.g., the 6 GHz band) is unable to transmit a capability element and/or an operation element (e.g., an HT capabilities element, a VHT capabilities element, an HT operation element, a VHT operation element, and/or an HE operation element including a VHT operation information field) having a legacy format.

In another embodiment of the present invention, if an AP and/or a non-AP STA operates in a particular band and thus has not transmitted an HT capabilities element, a VHT capabilities element, an HT operation element, and/or a VHT operation element, which are capability elements and operation elements of the AP and/or the non-AP STA for 2.4 GHz/5 GHz, the AP and/or non-AP STA may transmit information on other APs and/or non-AP STAs included in the same MLD in addition to information on the AP and/or non-AP STA. The information on the other APs and/or non-AP STAs may include a capability element and an operation element for a band (e.g., 2.4 GHz/5 GHz) other than the particular band. That is, an AP and/or a non-AP STA may transmit a capability element and/or an operation element for a band in which multiple STAs each operates, and is unable to transmit a capability element and/or an operation element for a band in which each of the multiple STAs does not operate.

In other words, a beacon frame transmitted by an HE AP operated at 6 GHz, and an association request frame transmitted by a non-AP STA performing a setup at 6 GHz are incapable of including capability and operation information for operation as an HT and VHT STA (AP and non-AP STA). An HE STA operating at 6 GHz does not need to operate as an HT/VHT STA because there are no other HT/VHT STAs operating in the 6 GHz band, and thus capability and operation information of an HT/VHT STA operation described above may be unnecessary information. For this reason, the 11ax standard restricts an HE STA (AP STA and non-AP STA) operated at 6 GHz from transmitting an HT capabilities element, a VHT capabilities element, an HT operation element, a VHT operation element, and an HE operation element including a VHT operation information field, and the same restriction may also be applied to EHT STAs (MLDs) that inherit an operation of HE STAs.

In other words, an STA operating in the 6 GHz band is unable to transmit an HT capabilities element, a VHT capabilities element, an HT operation element, a VHT operation element, or an HE operation element including a VHT operation information field. That is, an STA operating in the 6 GHz band may not transmit a capability/operation element having a parameter legacy format to provide a parameter for capability and operation of the STA.

However, in this case, an STA operating in the 6 GHz band may transmit a basic multi-link element including information of other STAs. The basic multi-link element may include an STA profile field including a capability element and/or an operation element for the other STAs reported by the STA operating at 6 GHz. The STAs reported by the STA operating at 6 GHz may operate in the 2.4 GHz or 5 GHz band, and the STA profile field may be included in a per-STA profile subelement corresponding to a reported STA.

However, as considered in embodiments of the present invention described above, an EHT STA that is an MLD is required to perform ML setup by including not only information on the MLD, but also information on other STAs (operated on different links) in the same MLD in a beacon frame, an (ML) probe response frame, an association request frame, and/or an association response frame, and transmitting same. In other words, an AP operated at 6 GHz among APs in an AP MLD needs to indicate HT/VHT capability/ operation elements of 2.4 GHz and 5 GHz APs in an (ML) probe response frame and an association response frame, to provide information on other APs operated at 2.4 GHz and 5 GHz. Therefore, the restriction in 11ax that defines a 6 GHz STA (AP STA or non-AP STA) as unable to indicate an HT/VHT-related element needs to be modified. The (ML) probe response frame may refer to a response frame transmitted in response to an ML probe request frame.

In the following description of the present invention, APs operated at 2.4 GHz/5 GHz/6 GHz are described as a 2.4 GHz AP, a 5 GHz AP, and a 6 GHz AP, respectively, and STAs performing (attempting) ML setup at 2.4 GHz/5 GHz/6 GHz are described as a 2.4 GHz STA, a 5 GHz STA, and a 6 GHz STA (non-AP STA), respectively.

According to an embodiment of the present invention, a 6 GHz AP/STA (reporting STA) of an EHT MLD may transmit an HT capabilities element, a VHT capabilities element, an HT operation element, a VHT operation element, or an HE operation element including a VHT operation information field for 2.4 GHz and 5 GHz STAs (reported STA) in the same MLD. A frame in which the 6 GHz AP/STA is able to include HT/VHT-related information for the 2.4 GHz and 5 GHz STAs (AP STA or non-AP STA that is a reported STA) may be a management frame. The 6 GHz AP/STA includes the HT/VHT-related information for the 2.4 GHz and 5 GHz AP/STAs in a multi-link information element (ML IE) of the management frame. The 6 GHz AP/STA includes the HT/VHT-related information for the 2.4 GHz and 5 GHz AP/STAs in a per-STA profile subelement corresponding to each STA in the management frame.

Alternatively, the 6 GHz AP/STA may include HT/VHT capability/operation elements for the 2.4 GHz and 5 GHz AP/STAs (reported STAs) as common information indicated by an ML IE of a management frame.

More specifically, a (re)association response frame that a 6 GHz AP in an EHT AP MLD transmits to perform (accept) an ML setup for APs including 2.4 GHz and/or 5 GHz APs may include an HT/VHT capability/operation element.

Similarly, a (re)association request frame that a 6 GHz STA in an EHT non-AP MLD transmits to perform (request) an ML setup including 2.4 GHz and/or 5 GHz STAs may include an HT/VHT capability/operation element.

That is, a 6 GHz STA (of an MLD) includes an HT/VHT capability/operation element in a (re)association request frame and transmits same only when attempting an ML setup for STAs including 2.4 GHz and/or 5 GHz STAs of the same MLD.

In other words, a 6 GHz AP (of an MLD) includes an HT/VHT capability/operation element in a (re)association response frame and transmits same only when performing an ML setup including 2.4 GHz and/or 5 GHz APs of the same MLD.

For example, APs or non-AP STAs configuring an MLD may operate in various bands (6 GHz, 2.4 GHz, or 5 GHz), respectively. In this case, an MLD (a first MLD) including non-AP STAs may transmit or receive a frame to establish multiple links with an MLD (a second MLD) including APs. An STA (first STA) included in the first MLD and operating at 6 GHz may transmit an association request frame (or reassociation request frame) for multi-link configuration, and an AP (first AP) included in the second MLD and operating at 6 GHz may transmit an association response frame (or reassociation response frame) in response to the association request frame (or reassociation request frame).

The first STA may include information on the first STA and information (e.g., multi-link information (or element)) on other STAs included in the same MLD in the association request message, and transmit same.

The information on the first STA included in the association request message may be information on 6 GHz (e.g., HE capability information, HE operation information, EHT capability information, and/or EHT operation information). However, the association request message does not include information (e.g., an HT capabilities element, a VHT capabilities element, an HT operation element, a VHT operation element, or an HE operation element including a VHT operation information field) of the first STA for a band (e.g., 2.4 GHz or 5 GHz) other than the 6 GHz band. That is, the first STA is unable to transmit information on a band other than the band in which the first STA operates.

The information (e.g., multi-link information (or element)) on the other STAs included in the association request message may include information (e.g., an HT capabilities element, a VHT capabilities element, an HT operation element, a VHT operation element, or an HE operation element including a VHT operation information field) on a band (e.g., 2.4 GHz or 5 GHz) in which each of the other STAs operates.

The information on the other STAs may be included in a per-STA profile subelement corresponding to each STA.

In addition, the multi-link information (or multi-link element) of the association request message may include a multi-link element including respective per-STA profile subelements corresponding to the reported STAs, and the per-STA profile subelement may include a complete profile subfield indicating whether all pieces of information on a corresponding station among the reported at least one STA are requested.

If the complete profile subfield is configured to have a value indicating a request for all pieces of information or to have a particular value (e.g., "1"), all pieces of information of each STA corresponding to the complete profile subfield may be included in the multi-link element. Alternatively, a complete profile may indicate whether a corresponding per-STA profile includes complete information of a corresponding STA.

The first AP may include information on the first AP and information (e.g., multi-link information (or element)) on other APs included in the same MLD in the association response message, and transmit same.

The information on the first AP included in the association response message may be information on 6 GHz (e.g., HE capability information, HE operation information, EHT capability information, and/or EHT operation information). However, the association response message does not include information (e.g., an HT capabilities element, a VHT capabilities element, an HT operation element, a VHT operation element, or an HE operation element including a VHT operation information field) of the first AP for a band (e.g., 2.4 GHz or 5 GHz) other than the 6 GHz band. That is, the first AP is unable to transmit information on a band other than the band in which the first AP operates.

The information (e.g., multi-link information (or element)) on the other APs included in the association request message may include information (e.g., an HT capabilities element, a VHT capabilities element, an HT operation element, a VHT operation element, or an HE operation element including a VHT operation information field) on a band (e.g., 2.4 GHz or 5 GHz) in which each of the other STAs operates.

Additionally, the 6 GHz AP (of the MLD) is able to include and transmit an HT/VHT capability/operation element in an ML probe response frame in the same way as an association request frame or an association response frame described above. A condition for the 6 GHz AP to include and transmit (respond with) HT/VHT-related information in the ML probe response frame may be that a received probe request frame includes a multi-link element (which is a probe request variant). In this case, the probe request frame including the multi-link element may be considered to be an ML probe request (frame).

A more specific condition for the 6 GHz AP to transmit (respond with) an ML probe response frame including an HT/VHT capability element and/or an HT/VHT operation element may be that a received ML probe request frame includes a multi-link element and requests complete information or HE/VHT capability/operation element information for 2.4 GHz and/or 5 GHz APs.

Figure 30:
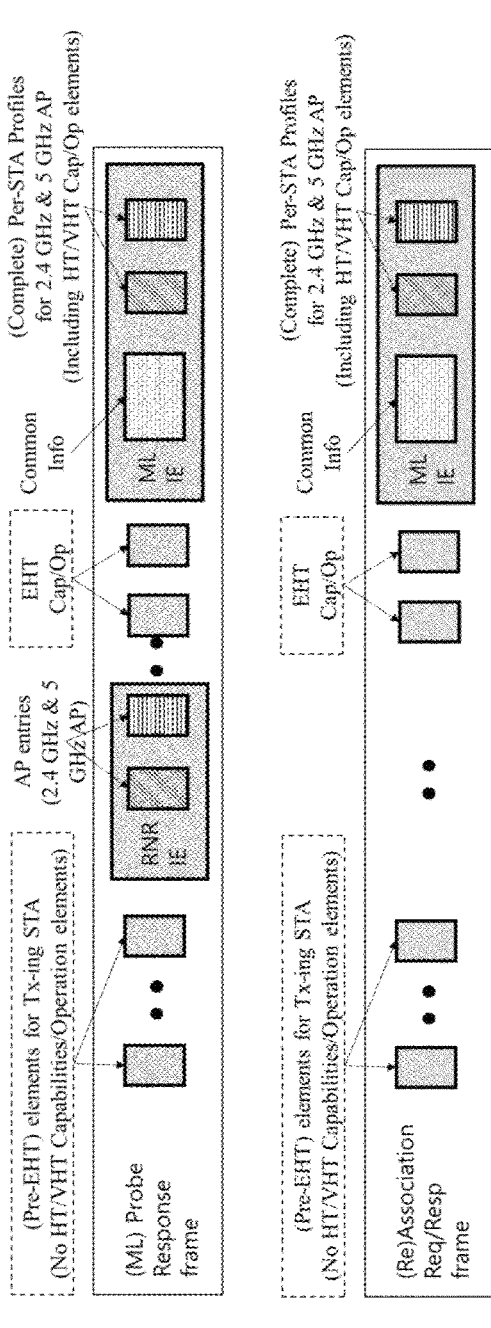
FIG. 30 illustrates an example a probe request frame, an association request frame, and an association response frame transmitted by a station operating in a particular bandwidth.

FIG. 30 illustrates an example a probe request frame, an association request frame, and an association response frame transmitted by a station operating in a particular bandwidth.

Referring to FIG. 30, a 6 GHz AP may transmit HT/VHT capability elements and HT/VHT operation elements in an ML IE of an (ML) probe response frame. The HT/VHT capability/operation elements may be elements for 2.4 GHz and 5 GHz APs operated by an MLD to which the 6 GHz AP belongs.

That is, although a 6 GHz band operating regulation restricts an 6 GHz AP from transmitting HT/VHT-related elements, the 6 GHz AP that is an STA of an AP MLD may transmit an (ML) probe response frame including HT/VHT-related elements in the 6 GHz band for the purpose of indicating complete information on the 2.4 GHz and 5 GHz APs.

In addition, an STA of a non-AP MLD and an AP of an AP MLD transmitting a (re)association request/response frame in the 6 GHz band may also transmit an (re)association Req/Resp frame including HT/VHT related elements in the 6 GHz band, according to a purpose.

A case where a 6 GHz STA includes and transmits an HT/VHT-related element in a (re)association request frame may be limited to when the 6 GHz STA intends to perform ML setup simultaneously at 6 GHz and 2.4/5 GHz through a (re)association request frame transmitted at 6 GHz.

A case where a 6 GHz AP includes and transmits HT/VHT-related elements in a (re)association response frame may be limited to when a non-AP STA has transmitted a (re)association request frame in the 6 GHz band and the 6 GHz AP accepts an ML setup request of the non-AP STA to establish setup on 2.4 GHz and/or 5 GHz as well.

As another method, a 6 GHz STA (AP STA or non-AP STA) may be restricted from including HT/VHT capability/operation elements in a frame transmitted in the 6 GHz band.

In this case, it may be possible for the 6 GHz AP to not include HT/VHT capability/operation elements even when the 6 GHz AP transmits an ML probe response frame including information (per-STA profiles) of 2.4 GHz and/or 5 GHz APs and an ML association response frame accepting setup of the 2.4 GHz and/or 5 GHz APs. Therefore, a non-AP MLD that to perform, via a 6 GHz AP, ML setup including 2.4 GHz and 5 GHz may need to transmit an ML probe request frame to an 2.4 GHz AP or 5 GHz AP to obtain additional information (included in HT/VHT-related elements) on the 2.4 GHz and/or 5 GHz APs.

In consideration of that transmission/acquisition of HT/VHT-related elements is impossible at 6 GHz, a non-AP EHT MLD that is to transmit an ML association request frame to a 6 GHz AP may be required to receive, at 2.4 GHz or 5 GHz in advance, an ML probe response frame including complete (or HT/VHT-related element) information of an AP to be subject to a setup. In other words, a non-AP EHT MLD that transmits an ML association request frame to a 6 GHz AP to perform ML setup simultaneously with 2.4 GHz and/or 5 GHz APs may be required to transmit an ML probe request frame at 2.4 GHz or 5 GHz and obtain complete information (or HT/VHT related elements) on the 2.4 GHz and/or 5 GHz APs before the setup is performed or after the setup is completed.

In addition, after completing ML setup at 6 GHz, a non-AP MLD may need to transmit, to an AP MLD, complete information (or HT/VHT-related elements) of STAs (a 2.4 GHz STA and a 5 GHz STA) operated on a 2.4 GHz link and a 5 GHz link for which the setup is performed. The non-AP MLD may transmit an HT/VHT capability/operation element of the 2.4/5 GHz STA in a PPDU transmitted first after association, in order to transmit the element of the 2.4/5 GHz STA for which the setup has been performed.

Figure 31:
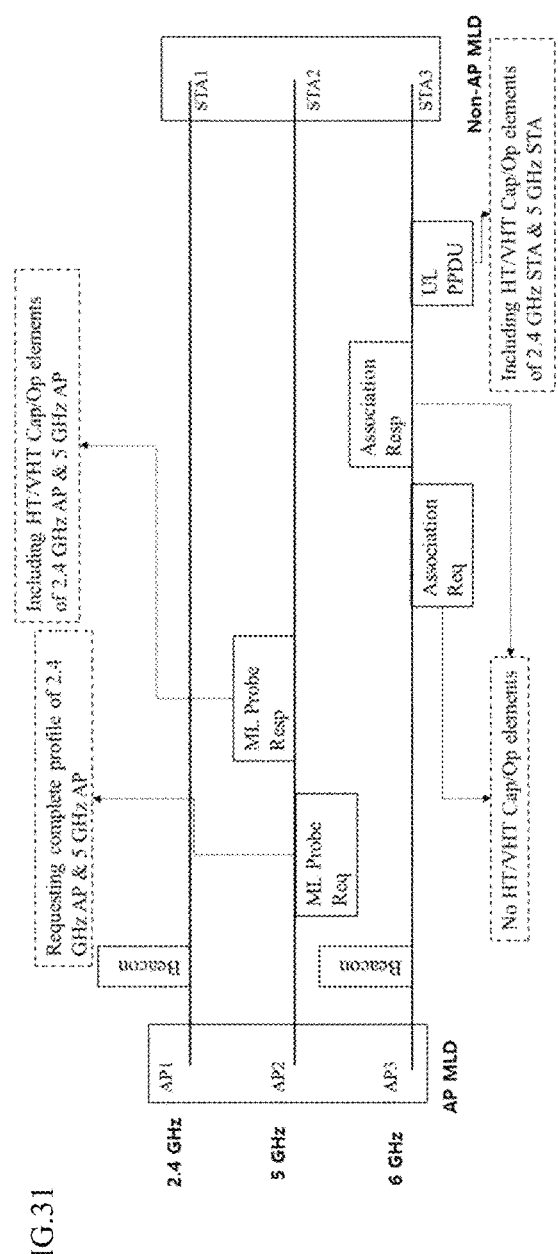
FIG. 31 illustrates an example of a method of performing a multi-link setup by exchanging high throughput (HT)/very high throughput (VHT)-related element information in a link not falling in a particular bandwidth according to an embodiment of the present invention.

FIG. 31 illustrates an example of a method of performing a multi-link setup by exchanging high throughput (HT)/very high throughput (VHT)-related element information in a link not falling in a particular bandwidth according to an embodiment of the present invention.

Referring to FIG. 31, an AP MLD may operate AP 1 to AP 3 at 2.4 GHz, 5 GHz, and 6 GHz, respectively. A non-AP MLD having received a beacon frame of AP 3, which is a 6 GHz AP, may exchange a (re)association Req/Res frame with the AP MLD by using the 6 GHz band, to perform an ML setup.

In this case, the non-AP MLD may intend to attempt an ML setup including a 2.4 GHz AP and a 5 GHz AP and, to this end, may transmit an ML probe request frame to the 5 GHz AP at 5 GHz before transmitting an association request frame at 6 GHz. The ML probe request frame transmitted by the non-AP MLD over the 5 GHz band may be an ML probe request frame requesting complete information (or HT/VHT-related elements) on the 2.4 GHz AP and the 5 GHz AP among APs for which an ML setup is to be performed.

The non-AP MLD having received an ML probe response frame from the 5 GHz AP may transmit, via a 6 GHz STA to the 6 GHz AP, an association request frame requesting an ML setup including 2.4 GHz/5 GHz. In general, complete information on an STA of a link for which ML setup is requested is required to be included in an association request frame. However, the association request frame transmitted by the 6 GHz STA may not include HT/VHT capability/operation elements for 2.4 GHz and 5 GHz STAs. Similarly, in general, an association response frame that is transmitted (transmitted as a response) to accept a setup for 2.4 GHz and/or 5 GHz is required to include complete information on an AP of a link for which an ML setup is accepted. However, the association response frame transmitted by the 6 GHz AP may not include HT/VHT capability/operation elements for the 2.4 GHz and 5 GHz APs.

As described above, the non-AP MLD having performed setup with the AP MLD at 2.4 GHz and/or 5 GHz through an association request/response frame not including an HT/VHT element for 2.4/5 GHz may transmit, to the AP MLD, an HT/VHT capability/operation element for the 2.4/5 GHz STA for which the setup has been performed, through a first PPDU transmitted after receiving the association response frame.

<Configuration of Management Frame and Inheritance Rule>

EHT STAs (AP STAs or non-AP STAs) included in the same MLD are likely to have similar capabilities and operational parameters even if the EHT STAs are operated on different links. Therefore, some elements of an STA (reporting STA) that transmits a management frame (beacon, (ML) probe Req/Resp, (ML) association Req/Resp frames, etc.) may include the same information as some elements of another STA (reported STA) in the MLD.

As discussed in embodiments of the present invention described above, an EHT STA (reporting STA) may include complete information of other STAs (reported STAs) in the same MLD in a management frame and transmit same, and in consideration of that the MLD is able to operate multiple STAs, a management frame including all pieces of complete information of respective STAs is likely to cause significant overhead.

Therefore, a management frame including complete information on another STA in an MLD in a per-STA profile subelement may omit an element of a reporting STA including the same information as an element of a reporting STA. In other words, in a management frame including complete information on a particular STA (reported STA), if some elements are not indicated in a per-STA profile subelement corresponding to the particular STA, the unindicated some elements may be interpreted as inheriting, without change, from information of the same elements (the same elements as the some elements) corresponding to an STA (reporting AP) having transmitted the management frame. The management frame including the complete information on the particular STA (reported STA) may mean a management frame including information having the same level (same amount) as that of the STA (reporting STA) having transmitted the management frame. Interpretation of a per-STA profile subelement by using the inheritance rule may be limited to when the per-STA profile is a complete profile. The per-STA profile being a complete profile may imply that a complete profile subfield of the per-STA profile subelement is indicated as 1.

As described above, an STA of an MLD may configure a management frame by using the inheritance rule, so as to reduce the size of the management frame while including complete information on another STA in the MLD in the management frame. Furthermore, it is possible for an MLD having received a management frame from an STA of an MLD to obtain (interpret or recognize) omitted information of a reported STA by using the inheritance rule.

Whether a management frame includes complete information of each reported STA may be indicated by whether a complete profile subfield (of an STA control field) is indicated as 1 in a per-STA profile subelement corresponding to each reported STA. That is, a reported STA corresponding to a per-STA profile having a complete profile subfield indicated as 1 may be an STA, the complete information of which is indicated by a corresponding management frame.

<Inheritance Rule Applied to Element, in Management Frame, not Indicated as Element of Reporting STA>.

A reporting STA transmitting a management frame may not have particular element information. For example, when a reporting STA is a 6 GHz STA (AP STA or non-AP STA), the 6 GHz STA that is the reporting STA may not have an HT/VHT-related element. In this case, if complete information on 2.4 GHz and 5 GHz STAs is required to be included in a corresponding management frame, HT/VHT-related information (HT/VHT capability/operation elements) required to be indicated to the 2.4 GHz and 5 GHz STAs are unable to be indicated/interpreted through the inheritance rule. This is because the 6 GHz STA that is the reporting STA does not have HT/VHT-related information, and thus a management frame of a 6 GHz STA as the reporting STA is unable to apply the inheritance rule to elements only indicated for reported STAs. That is, in a case where complete information of multiple 2.4 GHz and 5 GHz STAs are required to be indicated in a management frame transmitted by a 6 GHz STA, even if the multiple reported STAs (2.4/5 GHz STAs) all have the same HT/VHT capability/operation element values, each element may need to be repeatedly indicated in a per-STA profile of a corresponding reported STA. This means that, if a reporting STA transmitting a management frame does not include information on a particular element, the use of the inheritance rule in the management frame may be limited, resulting in a larger management frame size.

Therefore, a new inheritance rule for preventing a management frame size from increasing may be needed due to the limitation that the inheritance rule is unapplicable to an element not indicated for a reporting STA.

According to an embodiment of the present invention, information (element) of a reported STA indicated through a management frame (e.g., beacon, (ML) probe response, (ML) association request, (ML) association response frames, etc.) is able to inherit information other than information on a reporting STA.

More specifically, if a management frame is indicated to include complete information on a particular reported STA, but a particular element corresponding to the particular reported STA is not indicated, the particular element may be considered to inherit an element other than an element of a reporting STA. A condition that the particular element is considered to inherit the element other than the element of the reporting STA may be that the particular element is not indicated (included) for the reporting STA (in a corresponding management frame). A method of indicating/interpreting information of a reported STA as inheriting an element other than an element of a reporting STA may be applied only when the reporting STA is a 6 GHz STA.

According to an embodiment of the present invention, if a particular element of a reported STA for which complete information (profile) is indicated is not indicated through a management frame, the value of an element (having the same element ID and the same extended element ID) that is identical to the particular element and is indicated through the management frame may be considered to be equally applied (indicated) to the particular element of the reported STA. The identical element being inherited to the particular element of the reported STA may not be an element for a reporting STA.

That is, an identical element (having with the same element ID and the same extended element ID as the particular element) being inherited to a particular element for a reported STA may be not an element for a reporting STA.

That is, an identical element (having with the same element ID and the same extended element ID as the particular element) being inherited to a particular element for a reported STA may be an element for another reported STA. In the same way, even though a management frame of a 6 GHz STA as a reporting STA does not indicate an HT/VHT capability/operation element for the 6 GHz STA, HT/VHT capability/operation elements indicated in a per-STA subelement of a reported STA may be inherited to another reported STA.

Alternatively, an identical element (having with the same element ID and the same extended element ID as the particular element) being inherited to a particular element for a reported STA may be an additional element indicated for inheritance. The additional element indicated for inheritance may be an element that corresponds to a reporting STA or does not directly correspond to the reporting STA.

However, if the particular element (not included in a management frame) is indicated through a non-inheritance element of a per-STA profile subelement corresponding to a reported STA, the particular element for the reported STA does not inherit any value and may be considered as not being indicated in the management frame.

For example, in a case where a particular element for STA 1, for which complete information is indicated through a management frame, is not indicated, if the same element indicated for STA 2 exists, a value indicated through the same element may be considered (i.e., inherited) to be the same as that indicated through the particular element of STA 1. In this case, STA 2 may not be a reporting STA.

In addition, an identical element (having with the same element ID and the same extended element ID as a particular element) being inherited to a particular element of STA 1 may be an additional element indicated for inheritance rather than an element for a reporting STA or a reported STA.

According to an embodiment of the present invention, if a particular element of a reported STA for which complete information (profile) is indicated is not indicated through a management frame, the value of an element (having the same element ID and the same extended element ID) that is identical to the particular element and is indicated through the management frame may be considered to be equally applied (indicated) to the particular element of the reported STA. The element being inherited to the particular element of the reported STA may be determined according to the inheritance rule.

As an example of selecting an element being inherited, another element (having with the same element ID and the same extended element ID as a particular element) being inherited to a particular element for a reported STA may be determined to be an identical element indicated first in a management frame.

More specifically, when a particular element of a reported STA is not indicated in a management frame in which complete information (profile) for the reported STA is necessarily included, the value of an element indicated first (in element order) among other elements having the same element ID and the same extended element ID as that of the particular element may be considered as being inherited to the particular element. That is, if the same element as the particular element is indicated for a reporting STA (the same element is indicated in the first order among the same elements), the particular element may be considered to inherit the value of the same element of the reporting STA.

As another example of selecting an element being inherited, another element (having with the same element ID and the same extended element ID as a particular element) being inherited to a particular element for a reported STA may be determined to be an identical element indicated most recently (in element order) in a management frame.

More specifically, when a particular element of a reported STA is not indicated in a management frame in which complete information (profile) for the reported STA is necessarily included, the value of an element indicated most recently (in element order) among other elements having the same element ID and the same extended element ID as that of the particular element may be considered as being inherited to the particular element. That is, if the same element as the particular element has been indicated for preceding three STAs, the particular element may be considered to inherit the same element value indicated for the third time.

Figure 32:
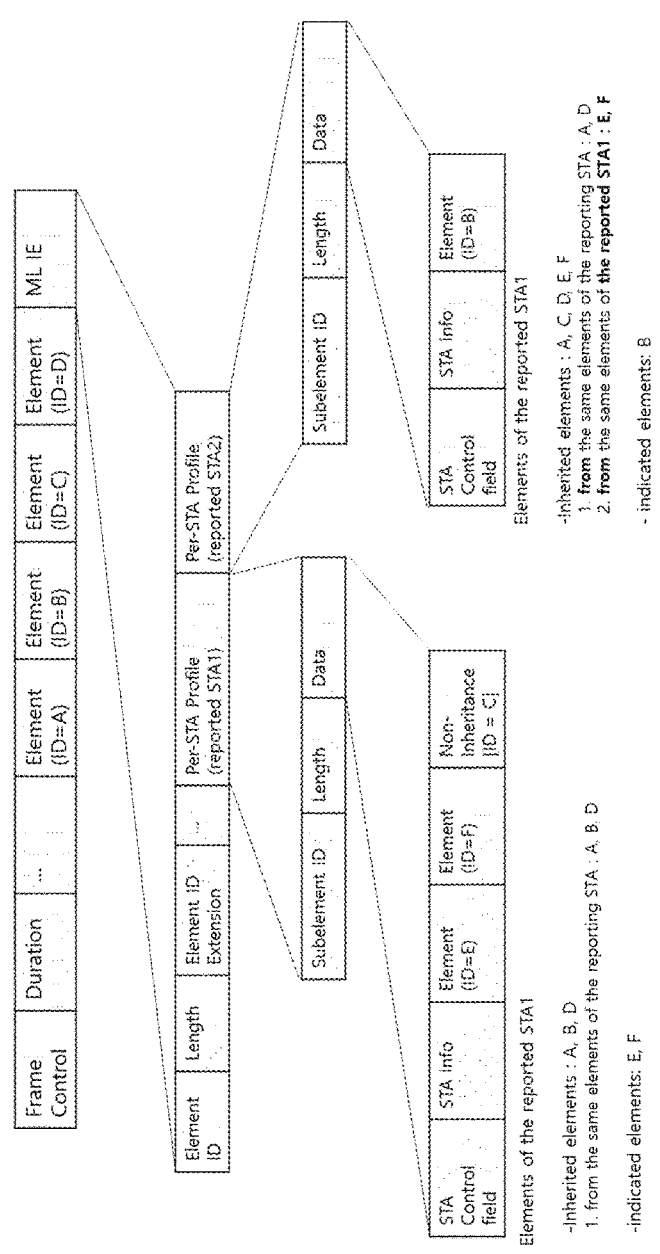
FIG. 32 illustrates an example of a partial configuration of a management frame for description of an inheritance method of a complete per-STA profile according to an embodiment of the present invention.

FIG. 32 illustrates an example of a partial configuration of a management frame for description of an inheritance method of a complete per-STA profile according to an embodiment of the present invention.

Referring to FIG. 32, a management frame includes four elements for a reporting AP (elements having element ID A to element ID D in FIG. 22) and includes an ML IE for indicating complete information of the reporting STA.

The multi-link element (ML IE) is configured by an element ID subfield, a length subfield, an element ID extension subfield, and two per-STA profile subelements. A per-STA profile indicated first in the sequence is a per-STA profile that is included to indicate the complete information (profile) on reported STA 1, and a per-STA profile indicated later in the sequence is a per-STA profile that is included to indicate complete information (profile) on reported STA 2. That is, the per-STA profile indicated first in the sequence is a per-STA profile for reported STA 1, and a per-STA profile indicated later is a per-STA profile for on reported STA 2.

The per-STA profile corresponding to reported STA 1 includes two elements (having element IDs E and F, respectively) not indicated as the elements for the reporting STA. The per-STA profile corresponding to reported STA 1 is a complete per-STA profile having a complete profile subfield indicated as 1. Therefore, three elements (having element IDs A, B, and D) remaining by excluding an element (having element ID C) indicated in a non-inheritance from the elements (having element IDs A to D) for the reporting STA may be considered as being equally indicated for reported STA 1. The values of the three elements considered as being equally indicated as those of the reporting STA are also considered to be the same as the elements for the reporting STA, respectively.

Consequently, even though the per-STA profile for reporting STA 1 has a configuration including only two elements (element IDs E and F), five elements being indicated as a complete profile for reported STA 1 may be interpreted in consideration of that three elements (element IDs A, B, D) of the reporting STA are inherited.

The per-STA profile corresponding to reported STA 2 includes an element having element ID B having been indicated as an element for the reporting STA. This may indicate that an element value (of the element having an element ID of B) indicated for reported STA 2 is different from an element value (element ID B) indicated for the reporting STA, so that the element of the reporting STA is not inherited and a new element value for reported STA 2 is be indicated.

The per-STA profile corresponding to reported STA 2 is a complete per-STA profile having a complete profile subfield indicated as 1. Therefore, remaining elements (having element IDs A, C, and D except for B) for the reporting STA is considered as being equally indicated for reported STA 2. The values of the three elements considered as being equally indicated as those of the reporting STA are also considered to be the same as the elements for the reporting STA, respectively.

In addition, the per-STA profile corresponding to the reported STA 2 may inherit not only the elements indicated for the reported STA, but also the elements of reported STA 1 indicated first in the sequence. That is, the two elements (having element IDs E and F) indicated in the per-STA profile of reported STA 1 may also be inherited for elements of reported STA 2. In other words, elements for reported STA 1 may also be inherited as elements of reported STA 2. That is, the two elements (having element IDs E and F) indicated through the per-STA profile of reported STA 1 may be considered as being equally indicated for reported STA 2.

<Implicit Non-Inheritance Rule>

As described above, complete information on a reported STA (profile) may be indicated through a management frame transmitted by a reporting STA, and the inheritance rule may be applied to prevent the same element having the same value from being indicated repeatedly in the management frame.

A non-inheritance element included in a per-STA profile subelement of a reported STA has a function of explicitly indicating elements, among elements not indicated for the reported STA, which does not apply inheritance. In other words, if a particular element is indicated through a non-inheritance element included in a per-STA profile subelement of a particular STA, the fact that the particular element not being indicated for the particular STA does not inherit a value of another element may be explicitly indicated. In this case, an MLD having received a management frame may consider (interpret) that the particular element for the particular STA does not exist.

In other words, the non-inheritance element may be used to resolve ambiguity regarding whether a particular element of a reported STA not indicated in a management frame has been omitted using the inheritance rule or has not originally existed.

However, only in certain cases, an MLD having received a management frame may recognize that some elements not indicated for a reported STA are elements having not originally existed for the reported STA.

For example, a non-AP STA MLD that includes a 6 GHz AP as a reported STA and has received a (re)association response frame may be aware of in advance that HT/VHT capability/operation elements for the 6 GHz AP are unable to be indicated in the (re)association response frame. In this case, even if an AP MLD transmitting the (re)association response frame does not specifically indicate the fact that no HT/VHT-related elements are inherited, through a non-inheritance element (of a per-STA profile subelement) corresponding to the 6 GHz AP, the STA MLD may not interpret an HT/VHT-related element for the 6 GHz AP according to the inheritance rule.

According to an embodiment of the present invention, even if no HT/VHT capability/operation elements are indicated (listed) in a non-inheritance element corresponding to a 6 GHz AP that is a reported STA, the elements may not be inherited for the 6 GHz AP. Not being indicated in a non-inheritance element may mean both the non-inheritance element not being present (included) in a per-STA profile subelement, and not being indicated by the non-inheritance element.

For example, in a case where complete information (profile) for a 6 GHz AP is indicated through a management frame (e.g., a (re)association response frame) transmitted by a 2.4 GHz AP, although an HT capability element for the 6 GHz AP is not indicated and a non-inheritance element is not included in a per-STA profile, an HT capability element for the 2.4 GHz AP is not inherited to the HT capability element for the 6 GHz AP.

Figure 33:
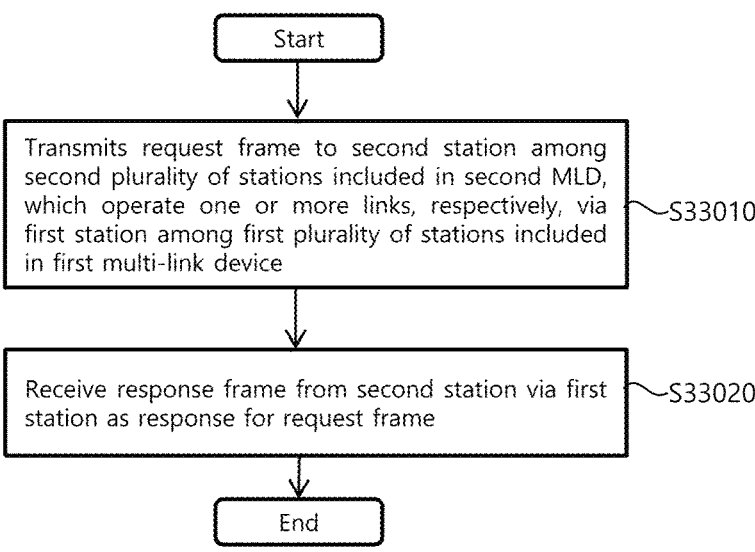
FIG. 33 is a flowchart illustrating an example of an operation of a non-AP MLD according to an embodiment of the present invention.

FIG. 33 is a flowchart illustrating an example of an operation of a non-AP MLD according to an embodiment of the present invention.

Referring to FIG. 33, an MLD configured by a plurality of STAs may transmit information on STAs operating in different bands via an STA operating in a particular band.

Specifically, a first multi-link device (MLD) including a first plurality of stations operating on a plurality of links, respectively, transmits a request frame to a second station among a second plurality of stations included in a second MLD, which operate one or more links, respectively, via a first station among the first plurality of stations included in the first multi-link device (S3310).

The first station and the second station may operate in a particular band (e.g., 6 GHz).

Thereafter, the first station may receive a response frame from the second station as a response for the request frame (S3320).

The second station may transmit the response frame after including, in the response frame, a capability element and an operation element of the second station for the particular band, except for a capability element and/or an operation element of the second station in a particular legacy format for other bands.

The response frame may include multi-link information for associating first one or more stations remaining after excluding the first station from the first plurality of stations with a second at least one station remaining after excluding the second station from the second plurality of stations.

The multi-link information may include respective capability elements and/or operation elements of the second at least one station, the elements having a legacy format and corresponding to the other bands, respectively.

In addition, in the present invention, each of the respective capability elements and/or operation elements of the second at least one station is at least one of a high throughput (HT) capability element, a very high throughput (VHT) capability element, an HT operation element, a VHT operation element, or a high efficiency (HE) operation element including VHT operation information.

The particular band may be 6 GHz, and the other bands may be 2.4 GHz and/or 5 GHz.

The request frame (e.g., ML probe request frame) may include a multi-link element including per-STA profile subelements corresponding to the second at least one station, respectively, and each of the per-STA profile subelements may include a complete profile subfield indicating whether all pieces of information on a corresponding station among the second at least one station are requested.

When the complete profile subfield indicates a request for all the pieces of information, the multi-link information of the response frame may include a capability element and/or an operation element of a station, among the second at least one station, corresponding to the complete profile subfield indicating the request for all the pieces of information.

Based on the multi-link information, a multi-link configuration procedure for configuring a link between the second MLD, the first one or more stations, and the second at least one station may be performed.

The request frame (e.g., association request frame) may include a multi-link element including one or more per-STA profile subelements corresponding to the first one or more stations, respectively, and each of the one or more per-STA profile subelements of the multi-link element may include a capability element and/or an operation element in a legacy format for a corresponding particular station among the first one or more stations.

The particular station may be a station operating in at least one band among the other bands, and the first station may transmit the request frame after including, in the request frame, a capability element and an operation element of the first station for the particular band, except for a capability element and/or an operation element of the first station in a particular legacy format for the other bands.

The response frame is one of an association response frame and a multi-link (ML) probe response frame.

The above description of the present invention is used for exemplification, and a person who has common knowledge in the technical field to which the present invention belongs would understand that the present invention can be easily modified to other detailed forms without changing the technical idea or an essential feature thereof. Thus, it is to be appreciated that the embodiments described above are intended to be illustrative in every sense, and not restrictive. For example, each element described as a single type may be implemented to be distributed and similarly, elements described to be distributed may also be implemented in an associated form.

The scope of the present invention is represented by the claims to be described below rather than the detailed description, and it is to be interpreted that the meaning and scope of the claims and all the changes or modified forms derived from the equivalents thereof fall within the scope of the present invention.

The invention claimed is:

1. A first multi-link device (MLD) comprising:
a first plurality of stations operating on a plurality of links, respectively; and
a processor configured to:
transmit a request frame to a second station among a second plurality of stations included in a second MLD, which operate one or more links, respectively, via a first station among the first plurality of stations included in the first MLD,
wherein the first station and the second station operate in a particular band; and
receive a response frame from the second station via the first station as a response for the request frame,
wherein the second station transmits the response frame including a capability element and an operation element of the second station for the particular band, except for at least one of a capability element or an operation element of the second station in a particular legacy format for other bands, and
wherein the response frame comprises multi-link information for associating a first at least one station of the first plurality of stations other than the first station with a second at least one station of the second plurality of stations other than the second station.

2. The MLD of claim 1,
wherein the multi-link information includes at least one or capability elements or operation elements of a legacy format for each of the second at least one station corresponding to each of the other bands.

3. The MLD of claim 2,
wherein each of the at least one of the capability elements or the operation elements of the second at least one station is at least one of a high throughput (HT) capability element, a very high throughput (VHT) capability element, an HT operation element, a VHT operation element, or a high efficiency (HE) operation element comprising VHT operation information.

4. The MLD of claim 1,
wherein the particular band is 6 GHz, and
wherein the other bands are at least one of 2.4 GHz or 5 GHz.

5. The MLD of claim 1, wherein:
wherein the request frame includes a multi-link element including a Per-STA profile subelement corresponding to each of the second at least one station, and
wherein the Per-STA profile subelement includes a complete profile subfield indicating whether to request all information for a corresponding station among the second at least one station.

6. The MLD of claim 5,
wherein the multi-link information of the response frame includes at least one of a capability element or an operation element of a station corresponding to the complete profile subfield indicating a request for all of the information among the second at least one station when the complete profile subfield indicates the request for all of the information.

7. The MLD of claim 1, wherein the processor is configured to perform a multi-link setup procedure to establish a link between the first at least one station and the second at least one station based on the multi-link information.

8. The MLD of claim 1,
wherein the request frame includes a multi-link element including at least one Per-STA profile sub-element corresponding to each of the first at least one station, and
wherein each of the at least one Per-STA profile sub-element of the multi-link element includes at least one of a capability element or an operation element of a legacy format for a corresponding specific station among the first at least one station.

9. The MLD of claim 8,
wherein the corresponding specific station is a station operating in at least one band among the other bands, and
wherein the first station transmits the request frame including a capability element and an operation element of the first station for the particular band, except for at least one of a capability element or an operation element of the first station in a particular legacy format for the other bands.

10. The MLD of claim 1,
wherein the response frame is one of an association request frame, an association response frame, or a multi-link (ML) probe response frame.

11. A method performed by a first multi-link device (MLD) comprising a plurality of stations operating in a plurality of links in a wireless communication system, respectively, the method comprising:
transmitting a request frame to a second station among a second plurality of stations included in a second MLD, which operate one or more links, respectively, via a first station among the first plurality of stations included in the first MLD,
wherein the first station and the second station operate in a particular frequency band; and
receiving a response frame from the second station via the first station as a response for the request frame,
wherein the second station transmits the radio frame including a capability element and an operation element of the second station for the particular band, except for at least one of a capability element or an operation element of the second station for other bands, and wherein the radio frame comprises multi-link information for associating a first one or more stations of the first plurality of stations other than the first station with a second at least one station of the second plurality of stations, other than the second station.

12. The method of claim 11, wherein the multi-link information includes at least one of capability elements or operation elements of a legacy format for each of the second at least one station corresponding to each of the other bands.

13. The method of claim 12, wherein each of the at least one of the capability elements or the operation elements of the second at least one station is at least one of a high throughput (HT) capability element, a very high throughput (VHT) capability element, an HT operation element, a VHT operation element, or a high efficiency (HE) operation element comprising VHT operation information.

14. The method of claim 11, wherein the particular band is 6 GHz, and wherein the other bands are at least one 2.4 GHz or 5 GHz.

15. The method of claim 11, wherein the request frame includes a multi-link element including a Per-STA profile subelement corresponding to each of the second at least one station, and wherein the Per-STA profile subelement includes a complete profile subfield indicating whether to request all information for a corresponding station among the second at least one station.

16. The method of claim 15, wherein the multi-link information of the response frame includes at least one of a capability element or an operation element of a station corresponding to the complete profile subfield indicating a request for all of the information among the second at least one station when the complete profile subfield indicates the request for all of the information.

17. The method of claim 11, further comprising:

performing a multi-link setup procedure to establish a link between the second MLD and the first at least one station and the second at least one station based on the multi-link information.

18. The method of claim 11, wherein the response frame is one of an association request frame, an association response frame, or a multi-link (ML) probe response frame.

19. The method of claim 11, wherein the request frame includes a multi-link element including at least one Per-STA profile sub-element corresponding to each of the first at least one station, and wherein each of the at least one Per-STA profile sub-element of the multi-link element includes at least one of a capability element or an operation element of a legacy format for a corresponding specific station among the first at least one station.

20. The method of claim 19, wherein the corresponding specific station is a station operating in at least one band among the other bands, and wherein the first station transmits the request frame including a capability element and an operation element of the first station for the particular band, except for at least one of a capability element or an operation element of the first station in a particular legacy format for the other bands.

* * * * *